(12) United States Patent
Nagasawa et al.

(10) Patent No.: US 9,191,645 B2
(45) Date of Patent: Nov. 17, 2015

(54) STEREOSCOPIC VIDEO AND AUDIO RECORDING METHOD, STEREOSCOPIC VIDEO AND AUDIO REPRODUCING METHOD, STEREOSCOPIC VIDEO AND AUDIO RECORDING APPARATUS, STEREOSCOPIC VIDEO AND AUDIO REPRODUCING APPARATUS, AND STEREOSCOPIC VIDEO AND AUDIO RECORDING MEDIUM

(75) Inventors: Masato Nagasawa, Tokyo (JP); Yuichiro Haruyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 893 days.

(21) Appl. No.: 12/765,513

(22) Filed: Apr. 22, 2010

(65) Prior Publication Data

US 2010/0272417 A1 Oct. 28, 2010

(30) Foreign Application Priority Data

Apr. 27, 2009 (JP) ................. 2009-107742

(51) Int. Cl.
*H04N 13/00* (2006.01)
*H04N 19/597* (2014.01)

(52) U.S. Cl.
CPC ......... *H04N 13/0048* (2013.01); *H04N 13/007* (2013.01); *H04N 13/0033* (2013.01); *H04N 13/0055* (2013.01); *H04N 13/0066* (2013.01); *H04N 19/597* (2014.11); *H04N 2213/002* (2013.01)

(58) Field of Classification Search
CPC .......... H04N 13/0033; H04N 13/0048; H04N 13/0055; H04N 13/0066; H04N 13/007; H04N 19/597; H04N 2213/002
See application file for complete search history.

(56) References Cited

U.S. PATENT DOCUMENTS 6,009,433 A * 12/1999 Kurano et al. ................ 1/1
6,072,831 A 6/2000 Chen
6,574,423 B1 6/2003 Oshima et al.

(Continued)

FOREIGN PATENT DOCUMENTS

EP 0 847 197 A1 6/1998
EP 0 944 269 A1 9/1999

(Continued)

OTHER PUBLICATIONS

Reality Audio Acoustic Communication Technology, NTT DOCOMO Technical Journal, vol. II, No. 1.

*Primary Examiner* — Thai Tran
*Assistant Examiner* — Stephen Smith
(74) *Attorney, Agent, or Firm* — Birch, Stewart, Kolasch & Birch, LLP

(57) ABSTRACT

The object of the present invention is to provide a stereoscopic video and audio recording method, a stereoscopic video and audio recording medium, a stereoscopic video and audio reproducing method, a stereoscopic video and audio recording apparatus, and a stereoscopic video and audio reproducing apparatus. An audio information storage region for three-dimensional video is arranged in advance, separately from audio information for ordinary two-dimensional video, in a media recording format for recording stereoscopic video and audio. Therefore, when stereoscopic reproduction is selected, an audio can be reproduced with realistic sensation in a depth direction in sound-image processing or surround processing.

11 Claims, 44 Drawing Sheets

(56) References Cited

U.S. PATENT DOCUMENTS

| | | | |
|---|---|---|---|
| 6,829,018 B2 * | 12/2004 | Lin et al. | 348/738 |
| 2003/0179283 A1 * | 9/2003 | Seidel et al. | 348/14.01 |
| 2004/0101290 A1 * | 5/2004 | Seo et al. | 386/125 |
| 2004/0239685 A1 | 12/2004 | Kiyokawa et al. | |
| 2005/0041960 A1 | 2/2005 | Oh | |
| 2005/0248561 A1 * | 11/2005 | Ito et al. | 345/419 |
| 2006/0050383 A1 | 3/2006 | Takemoto et al. | |
| 2006/0192851 A1 * | 8/2006 | Sugahara et al. | 348/51 |
| 2006/0209183 A1 | 9/2006 | Mashitani et al. | |
| 2007/0081716 A1 * | 4/2007 | Ha et al. | 382/154 |
| 2008/0292287 A1 | 11/2008 | Oshima et al. | |
| 2009/0220213 A1 * | 9/2009 | Ogawa et al. | 386/95 |
| 2009/0326960 A1 * | 12/2009 | Breebaat | 704/500 |
| 2010/0260483 A1 * | 10/2010 | Strub | 386/97 |
| 2010/0309287 A1 * | 12/2010 | Rodriguez | 348/43 |
| 2011/0181696 A1 | 7/2011 | Oshima et al. | |
| 2012/0213491 A1 * | 8/2012 | Ikeda et al. | 386/241 |

FOREIGN PATENT DOCUMENTS

| | | |
|---|---|---|
| EP | 1 734 766 A2 | 12/2006 |
| JP | 62-236294 | 10/1987 |
| JP | 6-105400 A | 4/1994 |
| JP | 8-110868 A | 4/1996 |
| JP | 9-46630 A | 2/1997 |
| JP | 10-69755 A | 3/1998 |
| JP | 10-174110 A | 6/1998 |
| JP | 10-191393 A | 7/1998 |
| JP | 10-243419 | 9/1998 |
| JP | 11-191895 A | 7/1999 |
| JP | 11-261943 A | 9/1999 |
| JP | 11-289555 A | 10/1999 |
| JP | 2001-160945 A | 6/2001 |
| JP | 2001-197441 A | 7/2001 |
| JP | 2003-132624 A | 5/2003 |
| JP | 2003-185967 A | 7/2003 |
| JP | 2003-319419 A | 11/2003 |
| JP | 2004207772 A * | 7/2004 |
| JP | 2004-336701 A | 11/2004 |
| JP | 2005-094168 A | 4/2005 |
| JP | 2005-202037 A | 7/2005 |
| JP | 2006-128816 A | 5/2006 |
| JP | 2006-128818 A | 5/2006 |
| JP | 2006-325165 A | 11/2006 |
| JP | 2007-503751 A | 2/2007 |
| JP | 2007-166651 A | 6/2007 |
| JP | 3935507 B2 | 6/2007 |
| JP | 4036239 B2 | 11/2007 |
| JP | 4124268 B2 | 5/2008 |
| JP | 2008-236757 A | 10/2008 |
| JP | 4321658 B2 | 8/2009 |
| JP | 2009-296420 A | 12/2009 |
| WO | WO 03/092303 A1 | 11/2003 |
| WO | WO 2004/071102 A1 | 8/2004 |

* cited by examiner

F I G . 1
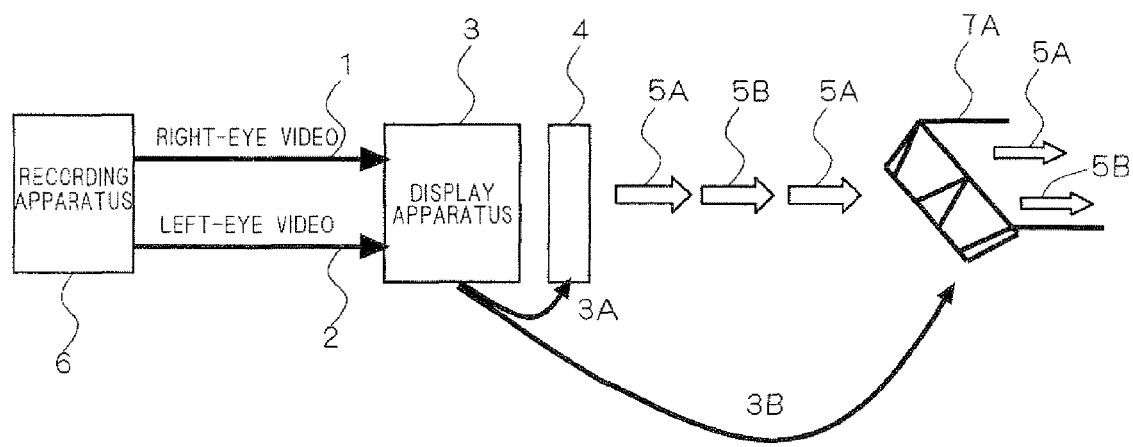
F I G . 2
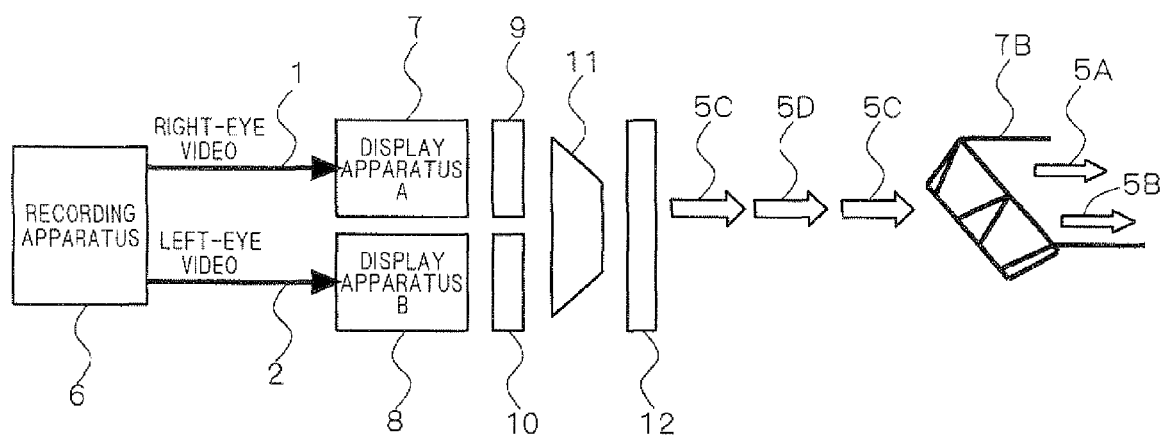

F I G . 6
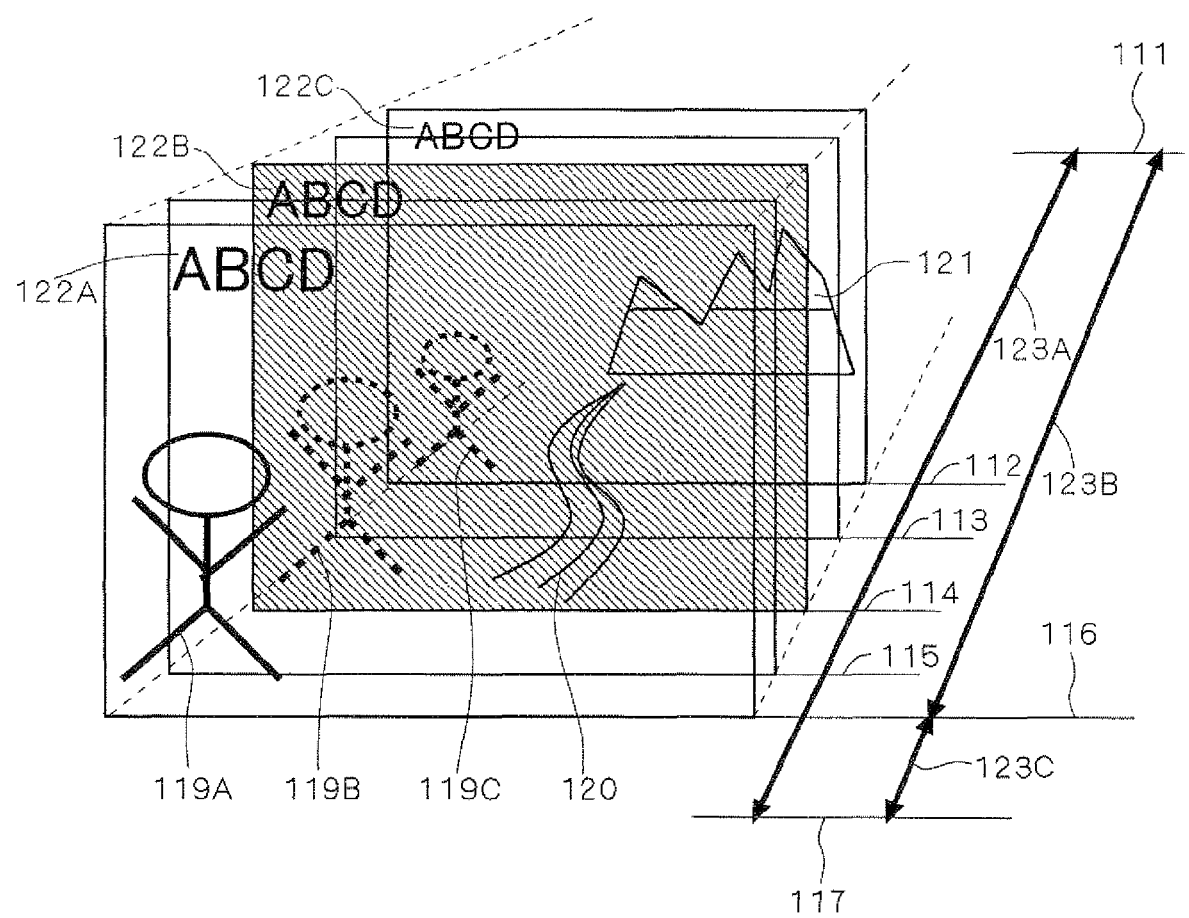

F I G . 1 8
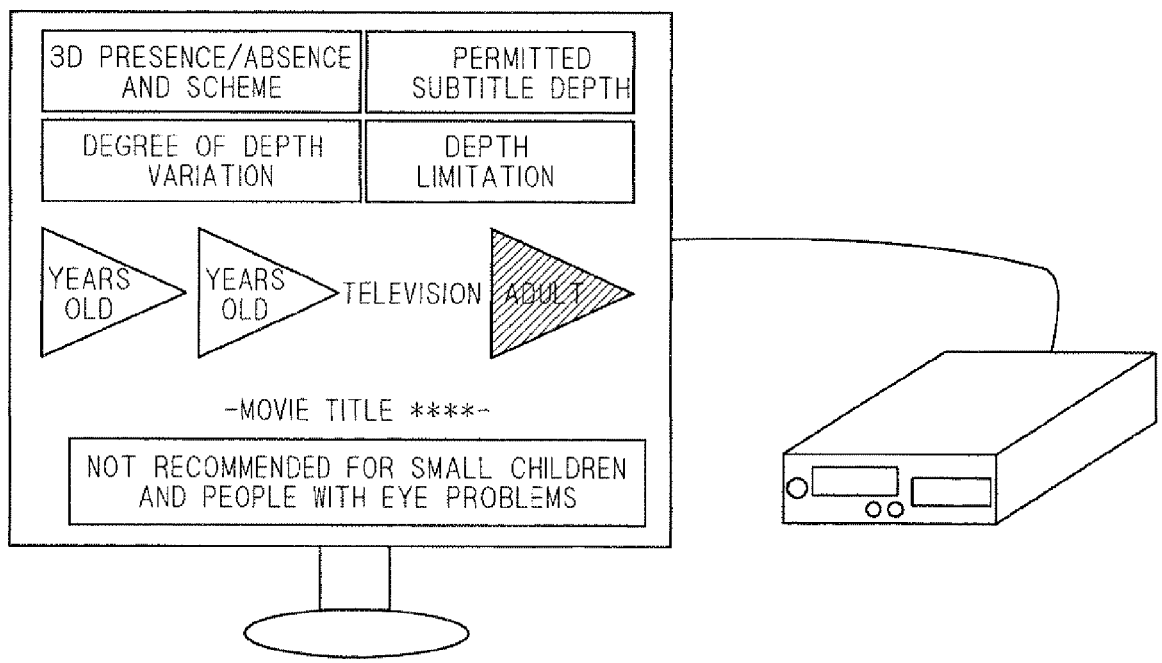

F I G . 2 6
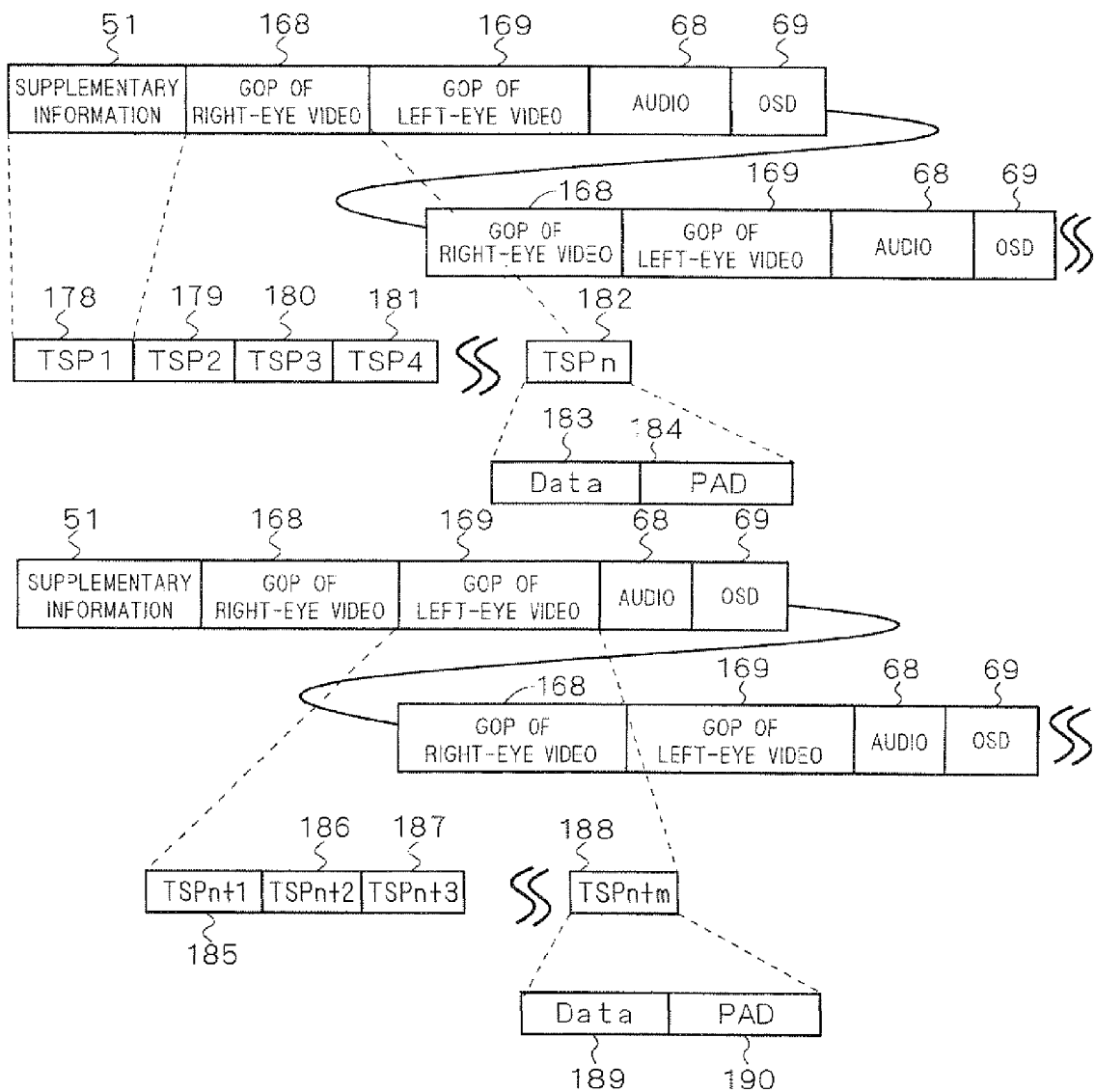

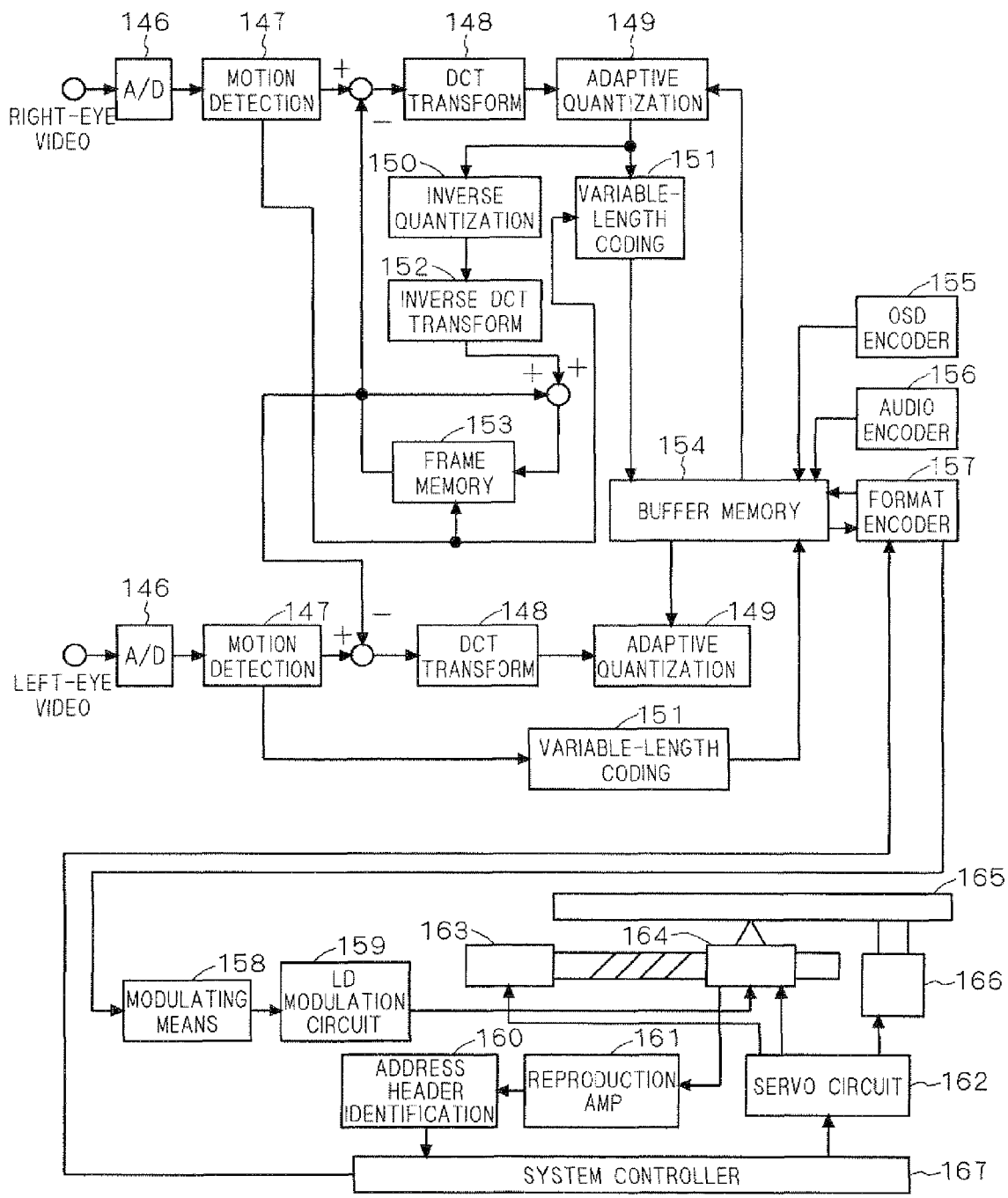
F I G . 2 7

F I G . 2 8 A
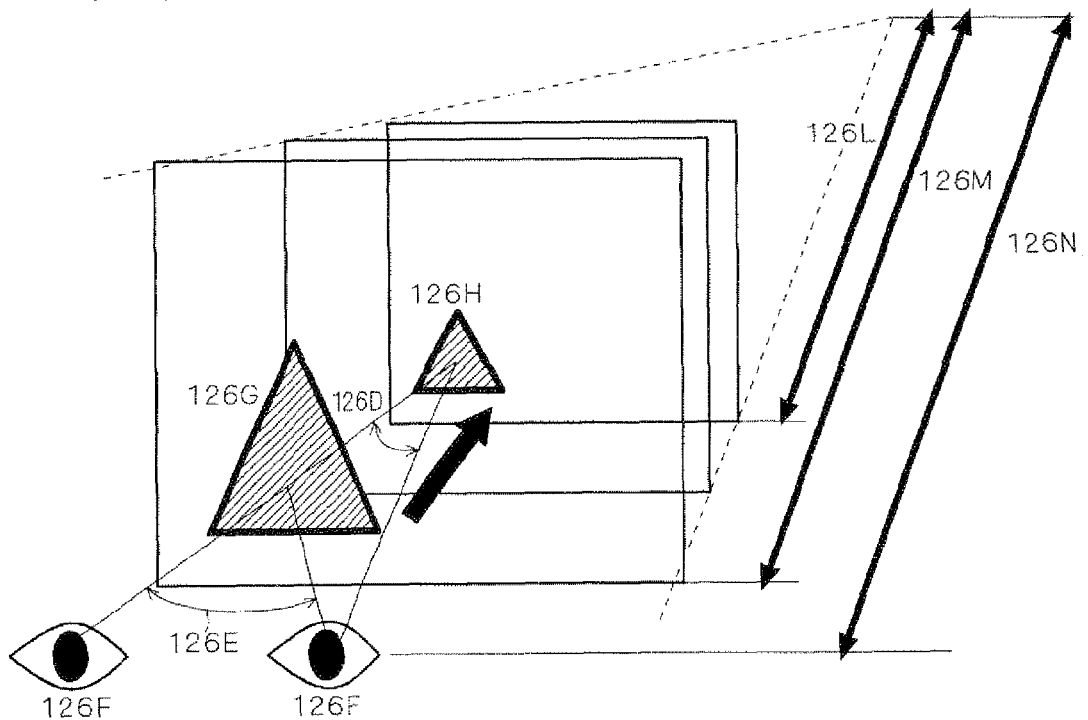
F I G . 2 8 B
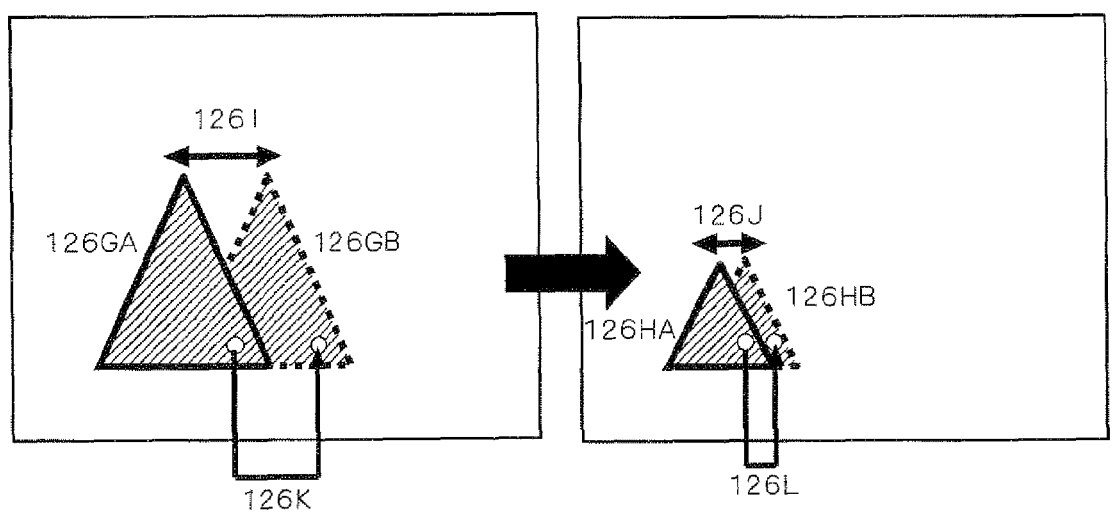

F I G . 3 7
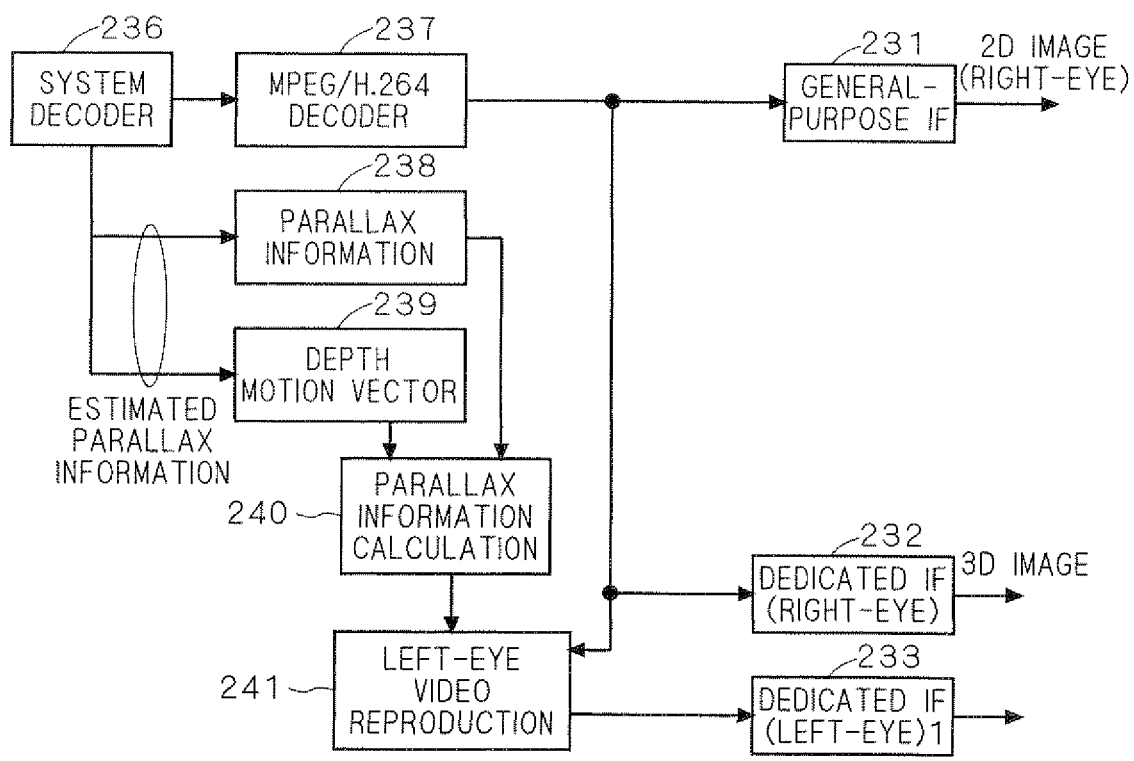

FIG. 41
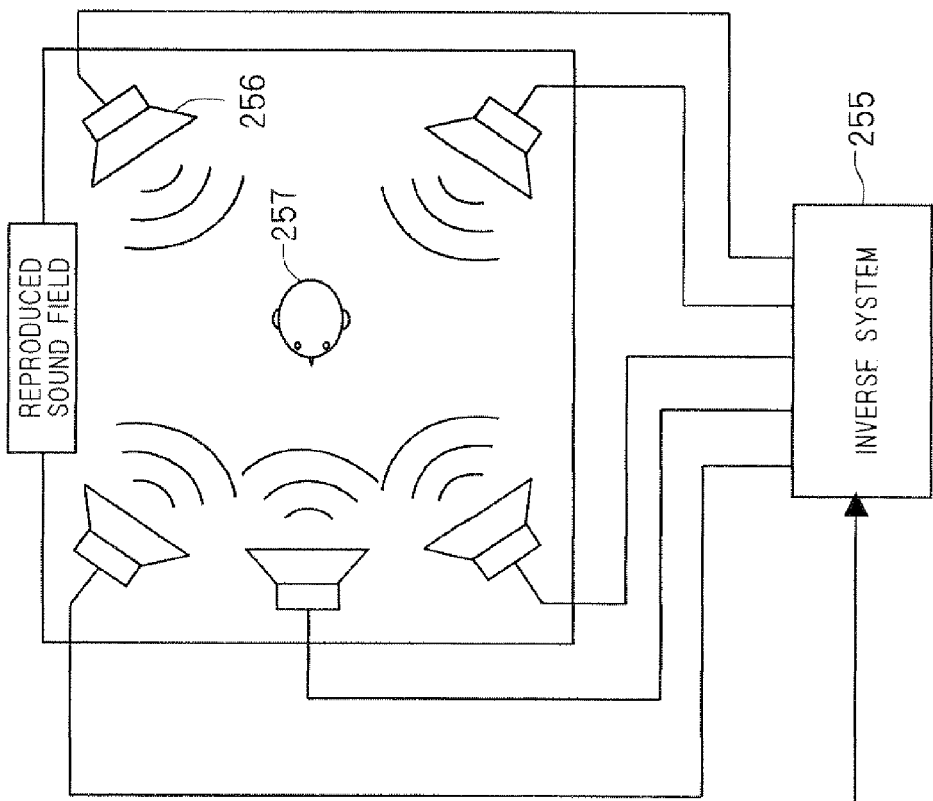
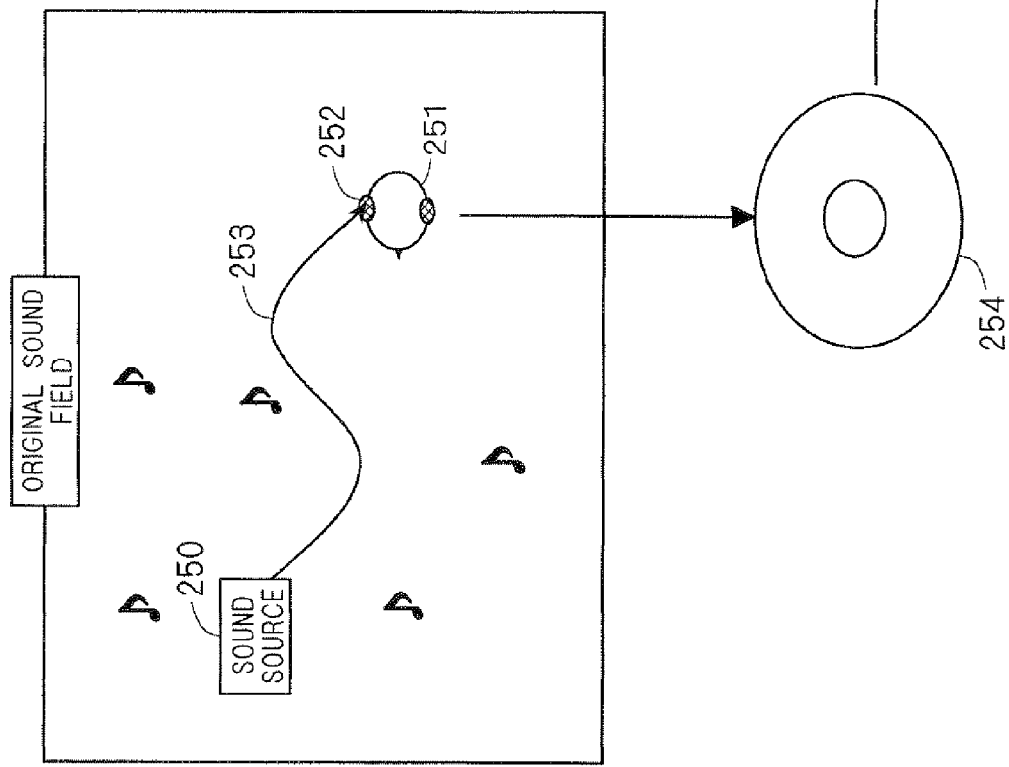

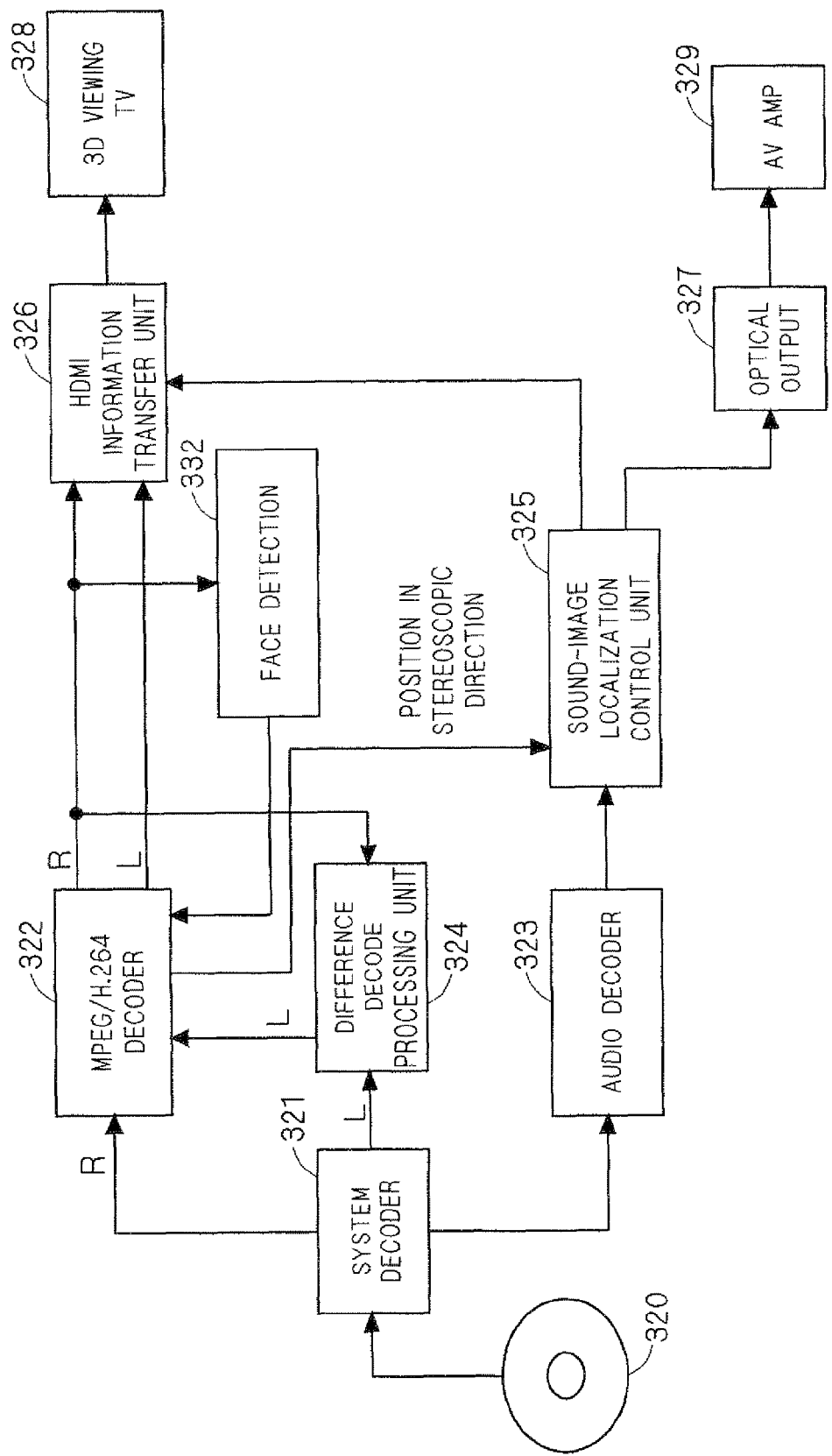

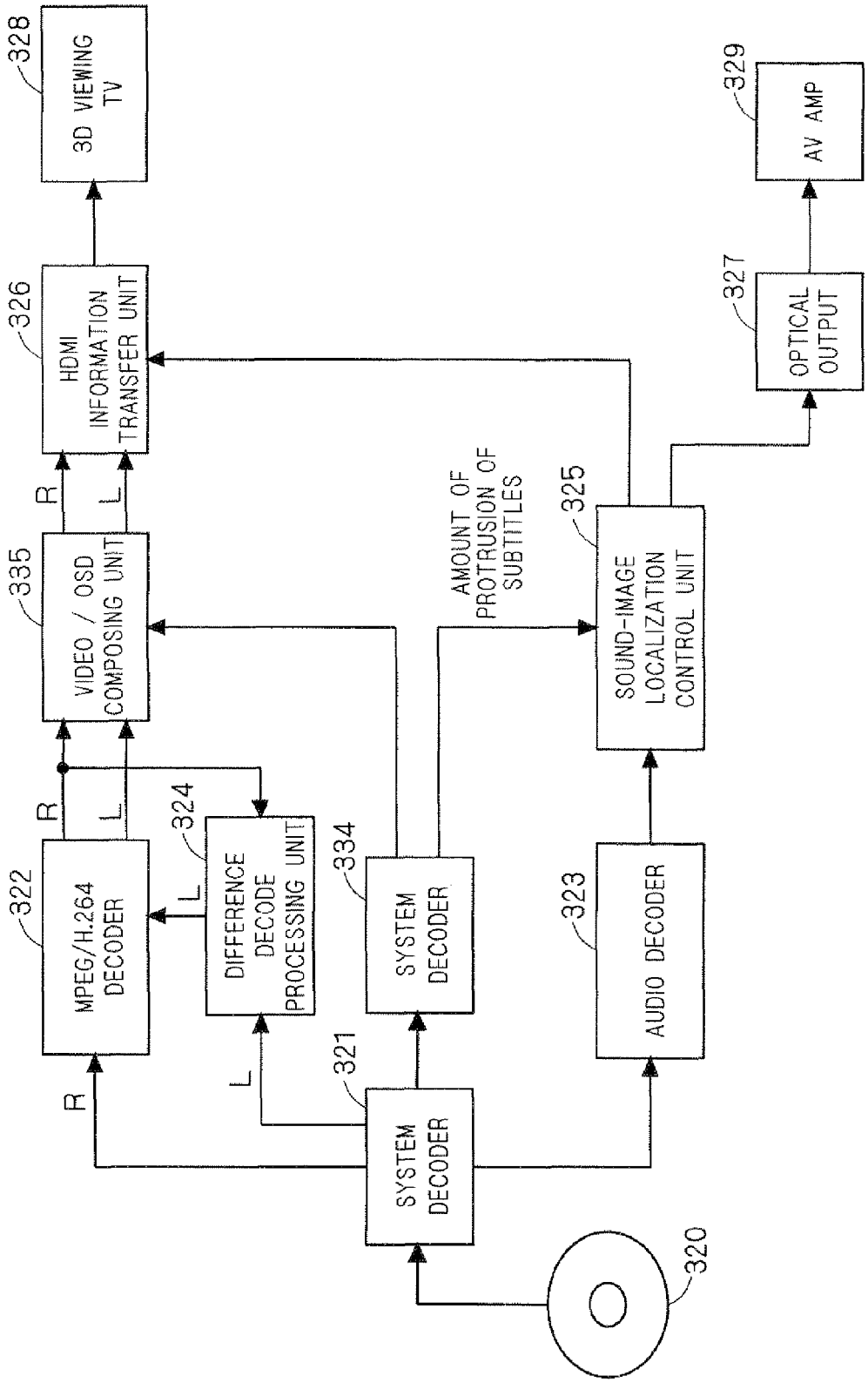

STEREOSCOPIC VIDEO AND AUDIO RECORDING METHOD, STEREOSCOPIC VIDEO AND AUDIO REPRODUCING METHOD, STEREOSCOPIC VIDEO AND AUDIO RECORDING APPARATUS, STEREOSCOPIC VIDEO AND AUDIO REPRODUCING APPARATUS, AND STEREOSCOPIC VIDEO AND AUDIO RECORDING MEDIUM

BACKGROUND OF THE INVENTION

1. Field of the Invention

The present invention relates to a stereoscopic video and audio recording method, a stereoscopic video and audio reproducing method, a stereoscopic video and audio recording apparatus, a stereoscopic video and audio reproducing apparatus, and a stereoscopic video and audio recording medium.

2. Description of the Background Art

Along with the progress of encoding techniques for compressing digital video signals, the record of compressed video signals to an optical disk have enabled implementation of an optical disk apparatus with excellent searchability and operability. Since such an optical disk apparatus records video as a digital signal, the optical disk apparatus is free from deterioration in dubbing compared with recording of an analog video signal, and achieves a higher reliability with its non-contact optical recording and reproduction.

Examples of encoding methods for compressing data of such a digital video signal include the MPEG (Moving Picture coding Experts Group) method. This MPEG compression method achieves improved compression efficiency as compared with intra compression methods such as motion JPEG, but the MPEG compression method is still restricted by the following constrained conditions. For example, since the MPEG compression method uses a motion-compensated prediction in the temporal direction, the MPEG compression method allows searching only in units of videos consisting of group of pictures (GOPs), and in order to access a disk, it is necessary to initially access one picture made by the intraframe compression.

At least in terms of audio information, Japanese Patent No. 3935507, Japanese Patent Application Laid-Open No. H11-191895, Japanese Patent No. 4036239, Japanese Patent No. 4124268, and Japanese Patent Application Laid-Open No. 2008-236757 use the same data format as that used for a conventional two-dimensional planar video. In this respect, a method for allowing sound-video localization in synchronization with viewing of a stereoscopic video is disclosed in Japanese Patent Application Laid-Open No. 2006-128818 or Japanese Patent Application Laid-Open No. 2006-128816, but Japanese Patent Application Laid-Open Nos. 2006-128818 and 2006-128816 merely relate to a method for selectively reproducing something that has been recorded with a plurality of microphones. Meanwhile, Japanese Patent Application Laid-Open No. H6-105400 describes a method for allowing stereoscopic sound-video localization, but is silent on a format made with special consideration paid to recording and reproduction of a medium.

For example, NTT DOCOMO Technical Journal, VOL II, No. 1, relates to stereoscopic sound-video of sound, and explains, e.g., a mechanism of surround techniques for enhancing realistic sensation. However, Journal, VOL II, No. 1, does not describe sound processing performed in synchronization with stereoscopic videos. Accordingly, it has been desired to achieve a method for enhancing realistic sensation in an acoustic system used to see stereoscopic video. It is to be noted that the above cited patent publications, i.e., Japanese Patent No. 3935507, Japanese Patent Application Laid-Open No. H11-191895, Japanese Patent No. 4036239, Japanese Patent No. 4124268, Japanese Patent Application Laid-Open No. 2008-236757, Japanese Patent Application Laid-Open No. 2006-128818, Japanese Patent Application Laid-Open No. 2006-128816, and Japanese Patent Application Laid-Open No. H6-105400 describe neither a later-described stereoscopic-viewing audio file easily generated during content production nor a medium format made with consideration paid to viewing-safety, and do not describe a more specific method for, e.g., how to determine a portion of a video and an OSD to which sound-video localization in synchronization with videos should be focused on.

As screens become larger and attain a higher resolution, more realistic viewing has been achieved. Meanwhile, in the field of audio processing, pseudo surround techniques have emerged, which allow listening of more realistic audio even in a case of 5.1 ch surround or 2 ch audio. With the advent of a TV capable of showing stereoscopic videos, it has been desired to reproduce the sound in such a manner to allow a user to perceive audio-video sensations differently for each of a two-dimensional video and a three-dimensional video, because the two-dimensional video and the three-dimensional video appear differently in terms of perception of persons and objects in the depth direction. Especially, when a medium or distributed content information includes both of two-dimensional videos and three-dimensional videos but includes only one set of audio information that is shared by both of two-dimensional video and three-dimensional video, there is a problem in that the audio information cannot be optimized in order to provide realistic sensation suitable for listening of audio with each of the two-dimensional video and the three-dimensional video.

In addition, there is a problem in that a user cannot view stereoscopic videos with sound localization and sound-video being in synchronization with the amount of depth perception of videos in accordance with the stereoscopic videos.

Further, in a case where localization in the depth direction is performed in synchronization with a stereoscopic video in sound-video processing, it is impossible to determine a portion of the stereoscopic video to which a position of sound should be determined in the depth direction, which causes a problem in that a user cannot listen to realistic sounds.

Further, in a case where localization in the depth direction is performed in sound-video processing in synchronization with a stereoscopic video upon determining a position of the face or the mouth of a person appearing in a stereoscopic screen, it takes a long time to perform the processing for determining the position of the face or the mouth of the person appearing in the stereoscopic screen, and this processing is likely to fail to catch up with real-time process.

Further, in a case where audio information suitable for a stereoscopic video is further added to a medium including a stereoscopic video stream, it is necessary to have a format that allows an apparatus to immediately determine the content of audio information suitable for the stereoscopic video and recognize the sequence of menu operation and reproduction based on disk information management information.

Further, in a case where audio information suitable for a stereoscopic video is further added to a video and audio distribution stream including a stereoscopic video stream, it is necessary to have a format that allows an apparatus to immediately determine the content of audio information suitable for the stereoscopic video.

SUMMARY OF THE INVENTION

It is an object of the present invention is to provide a stereoscopic video and audio recording method, a stereoscopic video and audio recording medium, a stereoscopic video and audio reproducing method, a stereoscopic video and audio recording apparatus, and a stereoscopic video and audio reproducing apparatus that take into consideration a depthwise and protruding sensation of a person and an object that is different between 2D video and 3D video and allow the user to listen to audio with realistic sensation.

The present invention is a stereoscopic video and audio recording medium for recording, to a recording medium, surround audio information and a stereoscopic video including a left-eye video and a right-eye video utilizing parallax video.

Video content that contains stereoscopic video is constituted by digital video information including an I picture that is data-compressed within a frame, a P picture that is data-compressed with motion compensation from the I picture in a preceding direction in time, and a B picture that is data-compressed with motion compensation from the I picture or P picture in a preceding/following direction in time. The video content includes a flat video constituted by only one of the left-eye video and the right-eye video and a stereoscopic video using both of the left-eye video and the right-eye video, which are present in a mixed manner in the digital video information.

In the video and audio recording medium according to the present invention, the surround audio information related to stereoscopic video information of the stereoscopic video includes both of a surround audio for viewing the flat video and a surround audio for stereoscopic viewing.

In the above constitution, since the surround audio information has both of the surround audio for viewing the flat video and the surround audio for stereoscopic viewing, an operation of only selecting an reproduction file by the apparatus allows video and audio viewing with realistic sensation, which is suitable for reproduction of a three-dimensional video that is different during viewing the flat video.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a conceptual diagram of a stereoscopic video display system using a shutter according to a first embodiment of the present invention;

FIG. 2 is a conceptual diagram of a stereoscopic video display system using polarizing filters according to the first embodiment of the present invention;

FIG. 6 is a schematic diagram illustrating a stereoscopic video including display of subtitles according to the first embodiment of the present invention;

FIG. 18 is a conceptual diagram illustrating a TV display using the supplementary information according to the second embodiment of the present invention;

FIG. 26 is a diagram illustrating the structure of a video stream according to the third embodiment of the present invention;

FIG. 27 is a block diagram of a stereoscopic video recording apparatus according to the third embodiment of the present invention;

FIGS. 28A and 28B are conceptual diagrams of parallactic images used to illustrate the principles of compression with difference information according to the third embodiment of the present invention;

FIG. 37 is a block diagram of a stereoscopic video reproducing apparatus according to the fourth embodiment of the present invention;

FIG. 41 is a diagram for illustrating the principle of virtual surround according to a fifth embodiment of the present invention;

FIG. 49 is a block diagram for illustrating the stereoscopic video and audio reproducing apparatus according to the sixth embodiment of the present invention; and FIG. 50 is a block diagram for illustrating the stereoscopic video and audio reproducing apparatus according to the sixth embodiment of the present invention.

DESCRIPTION OF THE PREFERRED EMBODIMENTS

First Embodiment

Figure 3:
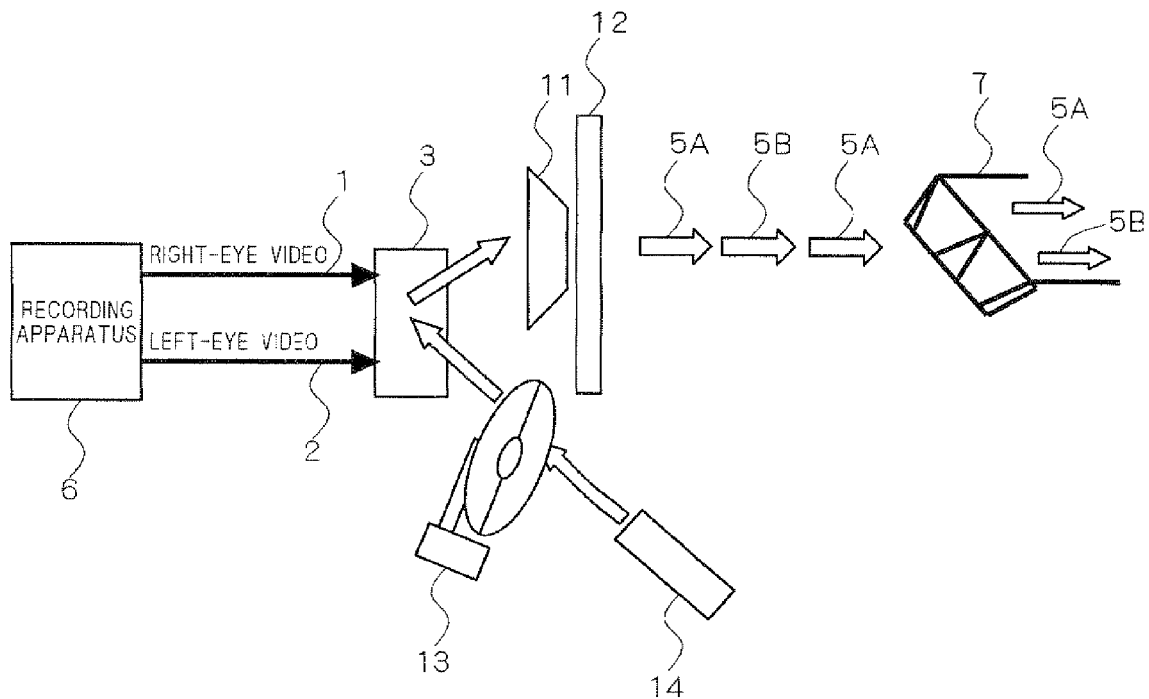
FIG. 3 is a conceptual diagram of a stereoscopic video display system using a rotary polarizing filter according to the first embodiment of the present invention.

The first embodiment of the present invention will be hereinafter described with reference to the figures. FIG. 1 is a block diagram showing the overall configuration of a stereoscopic video system according to the present embodiment. The stereoscopic video system shown in FIG. 1 includes a stereoscopic video recording apparatus 6 (hereinafter simply referred to as recording apparatus 6) for outputting right-eye videos 1 and left-eye videos 2 upon reproducing a medium recording stereoscopic videos, a display apparatus 3 such as a TV or a projector, a shutter 4 that is made of liquid crystal and the like and can switch two transmissive polarized lights, and eyeglasses 7A including right and left liquid crystal shutters or right and left polarizing plates, each being different from each other, in order to view a frame sequence of videos 5A and 5B via the shutter 4. FIG. 2 shows another example of configuration of the stereoscopic video system according to the first embodiment. The stereoscopic video system shown in FIG. 2 is different from that of FIG. 1, and it has two display apparatuses A and B, polarizing plates 9 and 10 that allow passage of particular polarization light components each being different in direction from each other. In addition, the stereoscopic video system shown in FIG. 2 includes an optical system 11 for projecting light onto a display panel 12 and eyeglasses 7B including right and left polarizing plates, each being different from each other, in order to view a frame sequence of videos 5C and 5D via the polarizing plates 9 and 10.

Figure 4:
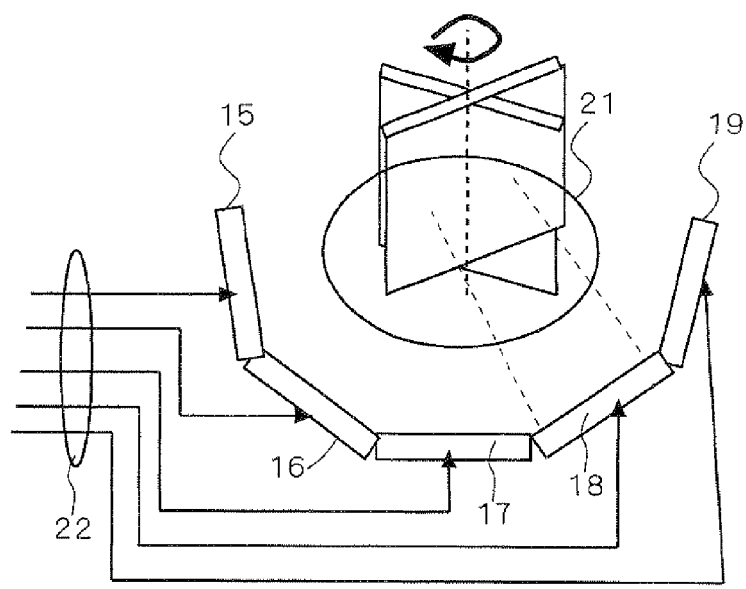
FIG. 4 is a conceptual diagram of a stereoscopic video display system using multiple information according to the first embodiment of the present invention.

FIG. 3 shows still another example of configuration of the stereoscopic video system according to the first embodiment. The stereoscopic video system shown in FIG. 3 is different from that of FIG. 1, and it includes a synchronous rotating member 13 having a circular rotary disk made of semicircular polarizing plates attached with each other so as to allow passage of lights having particular polarization components each being different in the direction, and a light source 14 for projecting light onto the synchronous rotating member 13. FIG. 4 shows still another example of configuration of the stereoscopic video system according to the first embodiment. The stereoscopic video system shown in FIG. 4 is different from that of FIG. 1, and it includes display devices 15 to 19 for projecting a plurality of videos based on a video signal 22 and a rotational mirror 21 for reproducing the projected stereoscopic videos.

Figure 5:
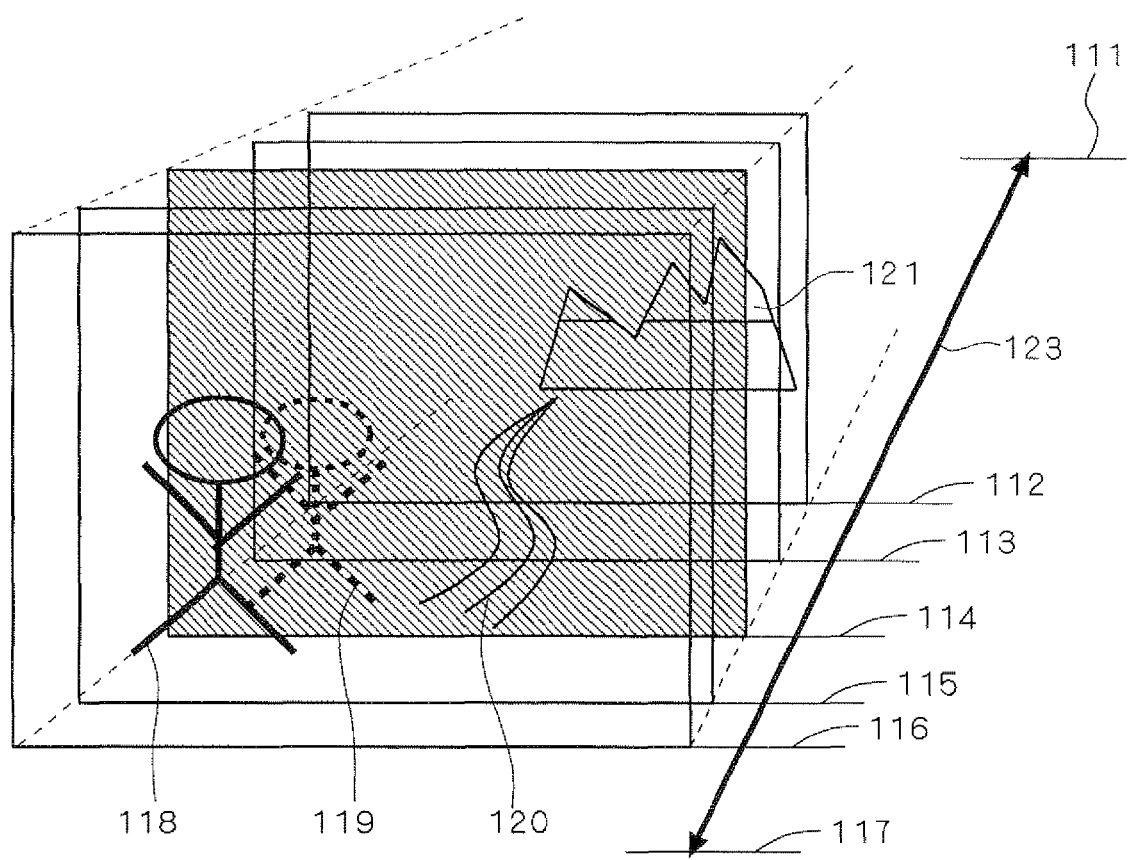
FIG. 5 is a schematic diagram illustrating a stereoscopic video according to the first embodiment of the present invention.

FIG. 5 schematically shows a stereoscopic video perceived by a person. In FIG. 5, depth positions 112 to 117 are arranged in order from a infinite direction 111, and an depth position 117 is arranged at the most protruding position (nearest to the eyes). FIG. 5 also shows a person 118 displayed on the depth position 115, a person 119 displayed on the depth position 114, a river 120 flowing from a distance, and a mountain 121 viewed at a distance FIG. 6 shows the video shown in FIG. 5 to which subtitles are added. FIG. 6 shows subtitles 122A to 122C displayed at the respective depth positions and subtitle depth ranges 123A to 123C.

Figure 7A:
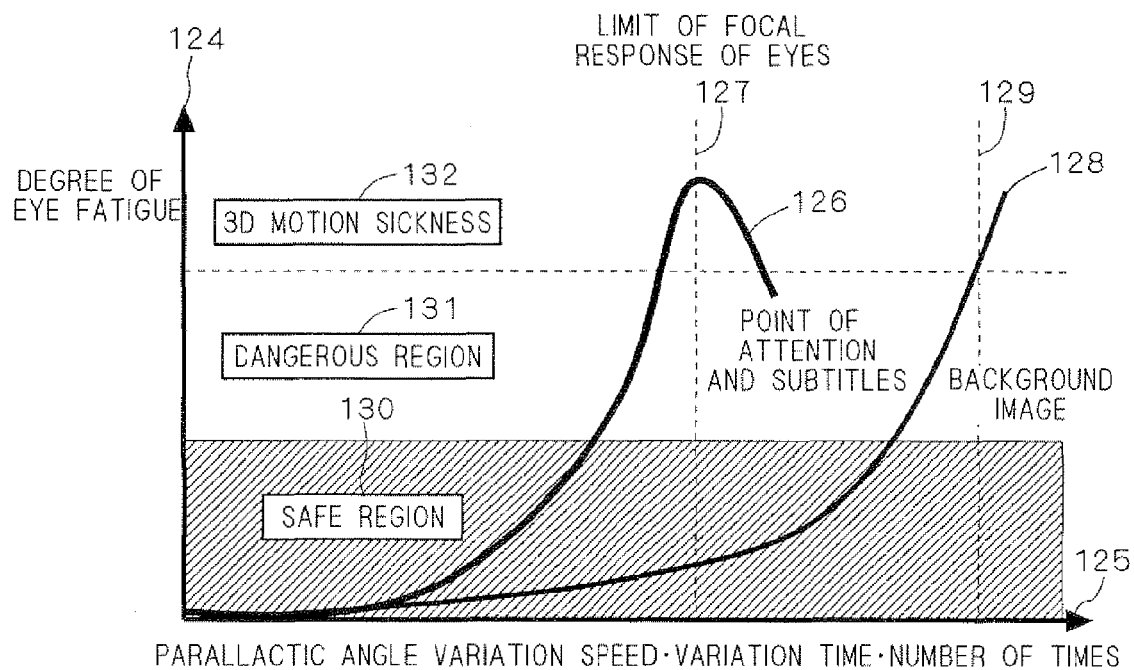
FIGS. 7A and 7B are diagrams used to illustrate the degree of eye fatigue according to the first embodiment of the present invention.
Figure 7B:
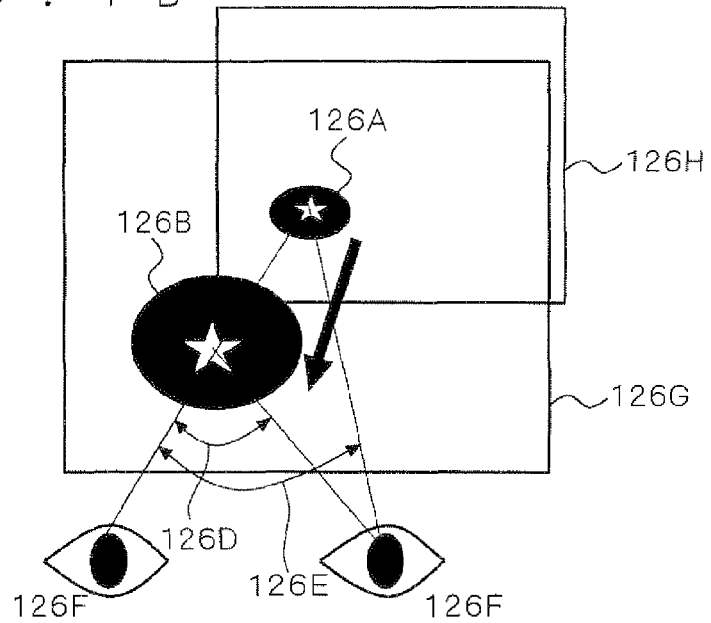

FIG. 7A and FIG. 7B show the degree of eye fatigue with respect to: acceleration of parallactic angle variation; a time taken for variation; and the number of times of variation. In FIG. 7A, the degree of eye fatigue 124 is adopted as a vertical axis, and a product 125 of angular variation acceleration and variation is adopted as a horizontal axis. FIG. 7A shows the degree of eye fatigue 126 about a point of attention and subtitles, a maximum-fatigue point 127 about the point of attention and subtitles, the degree of eye fatigue 128 about a background video, a limit 129 over which motion sickness is caused by the background video, a safe region 130 for human eyes, a dangerous region 131 for human eyes, and a region 132 in which human eyes suffer 3D motion sickness. FIG. 7B is a schematic diagram showing the parallactic movement of the eyes. FIG. 7B shows a far video 126A on which the point of attention is placed, a near video 126B to which the point of attention is placed, a vision line angle 126D where the point of attention is near, a vision line angle 126E where the point of attention is far away, human eyes 126F, a depth 126G at which the video 126B is displayed, and a depth 126H at which the video 126A is displayed.

Figure 8:
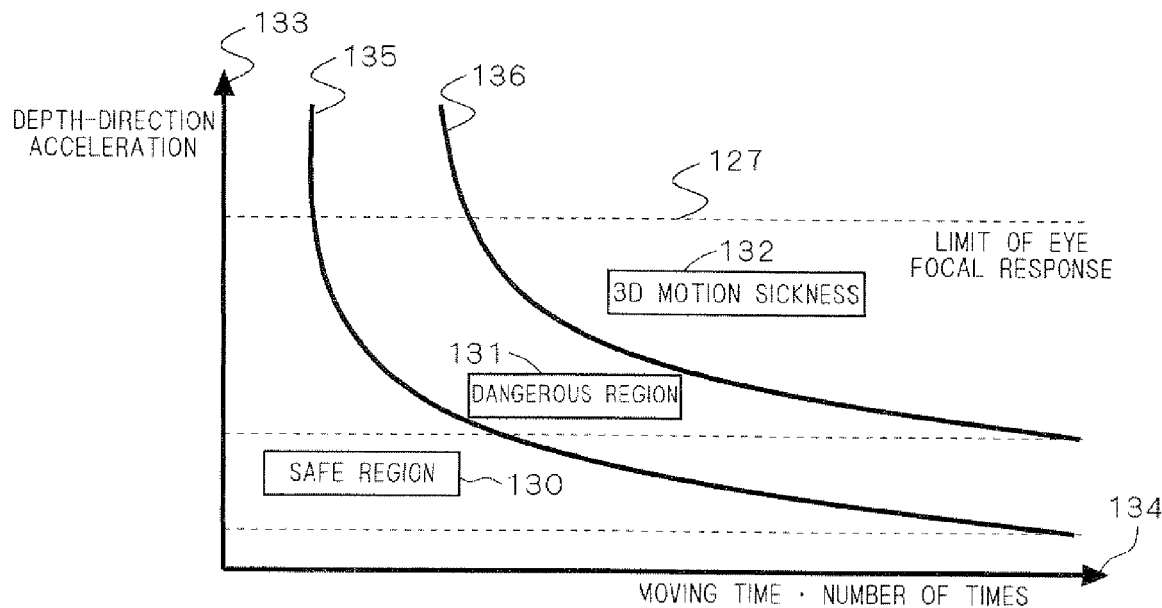
FIG. 8 is a diagram used to illustrate the degree of eye fatigue and depth-direction acceleration according to the first embodiment of the present invention.
Figure 9:
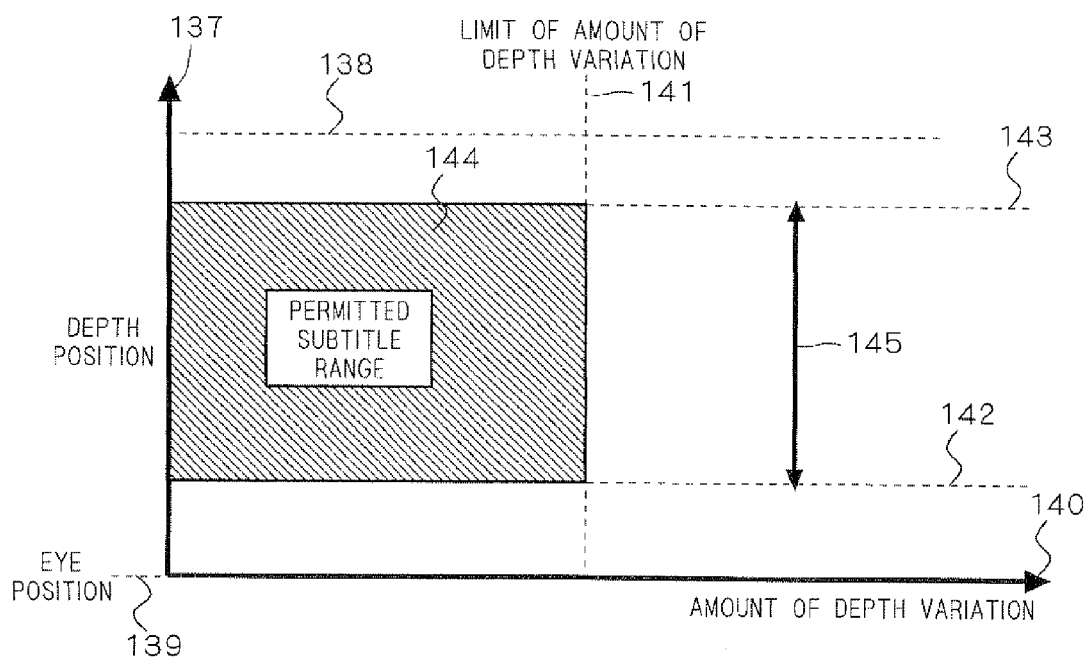
FIG. 9 is a diagram illustrating a range of display of subtitles according to the first embodiment of the present invention.

FIG. 8 is a graph showing relationship between an acceleration of the point of attention in the depth direction and the product of a moving time and the number of times. In the graph in FIG. 8, an acceleration 133 of the point of attention in the depth direction is adopted as a vertical axis, and a product 134 of the moving time and the number of times (the moving time multiplied by the number of times) is adopted as a horizontal axis. The graph of FIG. 8 shows a boundary 135 between the safe region 130 and the dangerous region 131, and a boundary 136 between the dangerous region 131 and the 3D motion sickness occurrence region 132. Further, FIG. 9 shows relationship between the amount of depth position variation and a depth position of subtitle displays. In FIG. 9, the depth position 137 is adopted as a vertical axis, and a depth variation amount 140 is adopted as a horizontal axis. FIG. 9 shows an infinite distance position 138, an eye position (closest to the viewer) 139, a limit 141 on the amount of depth variation, a depth limit 142 on the viewer-side (a limitation of protrusion), and a depth limit 143 on the far side.

As shown in FIG. 1 to FIG. 3, many of stereoscopic video systems using a TV and a projector generally make use of parallactic information of human eyes. In such stereoscopic video systems, video information is respectively projected onto right and left eyes through eyeglasses, so that the viewer perceives a stereoscopic video. In general, when videos are taken, two cameras are used to take videos that are input to the right and left eyes, which result in two streams. In such stereoscopic video systems, the right and left video information stored in the recording apparatus 6 is first input to a display apparatus such as a TV and a projector. At this occasion, when an analog method is used as information interface between the recording apparatus 6 and the display apparatus, it is necessary to separately transmit right and left information. However, when a digital interface such as HDMI is used, right and left information can be transmitted alternately as a serial transmission. Alternatively, the information may be compressed by the recording apparatus 6 side, and the compressed information may be transmitted to a TV side, so that the TV decompresses the information. By the way, when a television display is used, the right and left video information is displayed thereon in such a manner that the right and left videos are switched field by field. In this regard, a recently-available TV with a double-speed scan display can solve the problem of flickering that occurs when a reproduced video is separated field by field into right and left, thus achieving a smooth reproduction of stereoscopic videos.

As shown in FIG. 1, when the shutter 4 is arranged that is made of liquid crystal and the like and can switch two transmissive polarized lights, the shutter 4 can be controlled to switch field by field the polarizing angle of light, so that, for example the field video 5A passing through the shutter 4 is polarized vertically, and the video 5B is polarized horizontally. In this case, the eyeglasses 7A may be attached with polarizing plates, which are different for right and left (vertical polarization and horizontal polarization), and a cable 3B is not necessary. The cable 3B provides, from the display apparatus 3 to the eyeglasses 7A, a signal corresponding to the timing by which the display apparatus 3 controls the shutter 4 via a cable 3A. Alternatively, when the shutter 4 is not used, it is necessary to arrange a liquid crystal shutter on the eyeglasses 7A side, and the cable 3B, i.e., a field synchronization signal cable, is necessary. When the eyeglasses 7A side has the liquid crystal shutter, any polarization is not used. Therefore, even when, e.g., the user inclines his/her head to cause the angle of the eyeglasses to change, stereoscopic display is hardly affected.

In the method of FIG. 2, there are two display devices having PLD devices or a transmitting liquid crystal type, and different videos are displayed separately on right and left. In this case, the front surfaces of display apparatuses (A, B) 7, 8 are attached with polarizing plates 9, 10 having different polarizing directions. Accordingly, the lights emitted from the display light emitting sections have respectively different polarizations. When these lights are projected onto the display panel 12 via the optical system 11, the right eye can see, for example, the vertically-polarized video 5C, and the left eye can see the horizontally-polarized video 5D. In this case, the polarizing eyeglasses 7B are used to input parallactic video information into each eye.

In the method of FIG. 3, a polarization switching mechanism is arranged at a light-source section for emitting light to an optical devices such as PLD. The polarization switching mechanism has a synchronous rotating member 13 that rotates in synchronization with the timing of field display of the TV. In the method of FIG. 3, a light whose polarization is adjusted according to the timing of field display is input to the PLD device and the like. In this case, videos polarized differently for each field are projected onto the video display panel. When the viewer sees this with the polarizing eyeglasses 7 having the same method as that of FIG. 2, videos with parallax can be perceived by the eyes. Alternatively, there is another method as shown in FIG. 4 for reproducing a stereoscopic video by causing a plurality of display devices 15 to 19 to project videos taken from a plurality of angles. In this case, the number of stereoscopic video streams is not two. Instead, it is necessary to store and reproduce a plurality of streams.

In addition, the right and left videos may be perceived by the respective eyes as follows: the synchronous rotating member 13 rotating in synchronization with the timing of field display of the TV is made of optical filters that allow passage of only particular wavelengths of RGB; the half of the disk is used for the left eye, and the remaining half is used for the right eye; the wavelength of the light for the right eye and the wavelength of the light for the left eye are changed by shifting the wavelength of each of RGB; and the eyeglasses 7 are made of optical filters that respectively allow passage of only the wavelength for the right eye and the wavelength for the left eye. In this case, the shifts of right and left RGBs can be adjusted by color adjustment performed on the television display side, so that there is no disadvantage in color reproduction. Further, in the method for shifting the RGB wavelengths for right and left, the light from the eyeglasses 7 does not attenuate even when the eyeglasses are inclined.

In the method using the rotational mirror 21 of FIG. 4, the videos taken from the plurality of viewpoints are projected as the stereoscopic video onto the rotational mirror 21 by the display devices 15 to 19. Therefore, even when the viewer's viewpoint is changed, the actual stereoscopic video appears to be real (in an extreme case, the viewer can even see a section that could not be seen because the section is on the back side).

Subsequently, the actual stereoscopic video will be explained. Even in a case of video reproduction utilizing parallax, the human eyes perceive the video as shown in FIG. 5. In this case, when the depth from the infinite distance 111 in the depth position to the eye position 117 is expressed in an exploded manner, the videos are found to be displayed on depth planes from the depth position 112 to the depth position 115. For example, when a person, i.e., a point of attention, is close to the viewer, the person appears to be big and accordingly appears to be the person 118. When the person goes away from the viewer, the person appears to be the person 119. When, the river 121, i.e., background information, is closer to the viewer, the river 121 appears to be larger, and when the river 121 is away from the viewer, the river 121 appears to be smaller. The large mountain 121 appears to be big even though it is a background. For example, when subtitles are displayed on the stereoscopic video as shown in FIG. 5, they are shown as in FIG. 6. A subtitle 122A located close to the viewer goes away from the viewer little by little to be the subtitles 122B and 122C. In a case where the depth position of the person, i.e., the point of attention, is assumed to change between the persons 119A to 119C according to the scenes, the position of the subtitle is caused to change according to the position of the person, so that the movement of the eyes is reduced, and accordingly the eyes are less likely to be fatigued. Therefore, it is desirable to display the subtitle 122A in the scene of the person 119A, to display the subtitle 122B in the scene of the person 119B, and the subtitle 122C in the scene of the person 119C. This is because stereoscopic video, even though utilizing parallax, requires eye movements in accordance with the parallax, while conventional 2D video involves no movements of eye muscles in the focus direction because the depth position originally does not vary and the distance between the user and the TV corresponds to the focus of human eyes.

As shown in FIG. 7A, as a point of attention, e.g., a person appearing in the video, moves in the focal direction, eye fatigue occurs in proportion to the acceleration of parallactic angle variation, the time the variation takes, and the number of times that the variation occurs. Especially, a point of attention causes intensive eye fatigue because the eyes have to follow it, and it is thought that the fatigue reaches a peak before the speed of parallactic angle variation, the time of variation, and the number of times become too large. In particular, as shown in FIG. 7B, a near object involves a larger parallactic angle as shown by the viewing angle 126D, while a distant object involves a smaller parallactic angle as shown by the viewing angle 126E. Parallactic angle varies as the distance varies, and then both eyes 126F have to focus to the target at an appropriate angle, in order to follow the variation of parallactic angle caused by the variation of distance. Conventional TVs for displaying flat video do not provide images that vary in the distance direction, and therefore the parallactic angle required for eye perception in the depth direction always remains constant. However, stereoscopic video requires eye movements not only in a flat plane but also in the depth direction (with parallactic angle), resulting in an increased burden on the eyes. However, it is estimated that, when the video has movements faster than eye response, the degree of eye fatigue varies as shown by the curve 126, because the eyes cannot follow the movements and the fatigue decreases. Also, as to the background information, though the eyes originally do not follow it, it is estimated that the fatigue increases as the speed of parallactic angle variation, the time of variation, and the number of times increase as the distance varies. FIG. 8 illustrates this with a relation between the depth-direction acceleration and the product of moving time and the number of times. Even at lower depth-direction accelerations, a dangerous region exists and motion sickness occurs as the number of times and distance increase, but it is estimated that the fatigue does not occur below a certain level even when the product of moving time and number of times increases.

With respect to the degree of eye fatigue, larger-sized screens require increased eye movements in the plane direction and therefore cause increased eye fatigue. Two evaluation functions are possible accordingly, one with screen-size consideration and the other with no screen-size consideration. First, with an evaluation function 1, a value "a" at which the eyes' following movements can be ignored<parallactic angle variation speed of a point of attention<a range "b" of the eyes' following movements, and the evaluation value (the degree of eye fatigue) is proportional to the product of parallactic angle variation speed; variation time; and the number of times. With an evaluation function 2, a value "a" at which the eyes' following movements can be ignored<parallactic angle variation speed of a point of attention<a range "b" of the eyes' following movements, and the evaluation value (the degree of eye fatigue) is proportional to the product of: parallactic angle variation speed; variation time; the number of times; and screen size. The evaluation function 2 is used when the TV screen size is detectable, and the evaluation function 1 is used when it is not detectable. In the second and following embodiments, the evaluation value (the degree of eye fatigue) is described as the degree of depth variation.

In the production of one piece of stereoscopic video, "the amount of variation of parallactic angle", "the time that the variation takes", and "the number of times that the variation occurs" are provided as evaluation factors for the stereoscopic video in that one piece of video content, and it is then possible to make stereoscopic video content by re-encoding it so that the value does not enter the dangerous region 131 of FIG. 7. Also, the degree of depth variation, i.e., an evaluation function, is described in the stereoscopic video content, and it is then possible to present the degree of eye fatigue before the user views the movie, so as to prompt the user to select between 2D reproduction and 3D reproduction. In this case, examples of the re-encoding include: a filming scheme in which parallactic images are filmed with cameras located at a reduced parallactic interval (the distance between the two cameras is reduced); an image-processing scheme in which parallax is reduced by pixel conversion processing using parallax information, as will be described later; and a scheme in which the amount of protrusion (the degree of three-dimensionality) is limited in the production of content by CG for animation etc.

As to the display of subtitles that the user necessarily has to read to understand the story of the movie or the like, it is necessary to place a limitation on the amount of depth-direction variation as shown in FIG. 9. This is because of the fact that, as shown in FIGS. 7 and 8, eye fatigue increases and 3D motion sickness is likely to occur when the eyes follow very fast in the focal direction. Also, it seems that a limitation should be placed also on the distant position of subtitles, because very distant subtitles cause an unnatural impression due to the subtitle size with respect to the background as shown in FIG. 6. A limitation will be necessary also on the near side close to the eyes. This is because positions very near to the eyes involve larger amounts of angular variations of the eyes due to the viewing angle, resulting in an increased degree of eye fatigue. Also, a larger amount of protrusion (in this sense, a representation that is seen as if it protruded very close to the viewer, for example) may "surprise" or "startle" the viewer. Also, it is desirable to place stricter limitations when the TV display has a larger screen, because the eyes have to move more busily in the plane direction, and also because the psychological effects like "surprising" and "startling" also increase. When the reproducing apparatus and the TV are connected in a linked manner, information about the TV screen size is exchanged with the reproducing apparatus, so as to increase the limitations on the range of protrusion of subtitles etc. When a plurality of streams with different amounts of protrusion are provided, the system may be configured such that a stream with a smaller amount of protrusion can be selected when the TV screen is larger, and a stream with a larger amount of protrusion can be selected when the TV screen is smaller, for example. Also, when the amount of protrusion can be varied by a setting on the equipment side, as will be described later, the setting may be automatically made by considering TV size information, the user's conditions (age etc.) and the like.

It is then possible to define stereoscopic video parental levels based on the above-described evaluation value and the maximum amount of protrusion that corresponds to the viewing angle, and then an age limit for viewing may be set, or a warning against danger may be given to elderly or sick people, according to the stereoscopic video parental level. For example, the stereoscopic video parental levels may include Level 1 indicating severe fatigue and danger, with the evaluation value (the degree of eye fatigue)>c, the amount of maximum protrusion>d, and the ordinary parental level being high. Level 2 would indicate relatively severe fatigue and danger, with the evaluation value (the degree of eye fatigue) >c, the amount of maximum protrusion>d, and the ordinary parental level being normal or lower, or with the evaluation value (the degree of eye fatigue)>e, the amount of maximum protrusion>f, and the ordinary parental level being high. Level 3 would indicate intermediate fatigue and danger, with the evaluation value (the degree of eye fatigue)>e, the amount of maximum protrusion>f, and the ordinary parental level being normal or lower. Level 4 would indicate no fatigue and no danger, with the evaluation value (the degree of eye fatigue)>g, the amount of maximum protrusion>h, and the ordinary parental level being normal or lower.

In the above-described example of stereoscopic video parental levels, there is a relation of c>e>g and a relation of d>f>h, and the ordinary parental levels (flat-video parental levels) indicate the restrictions on viewing for ensuring safety that are defined about horror movies and the like in existing 2D video DVDs etc. It will be useful when the setting of such stereoscopic video parental levels can be determined or changed at the time of purchase or at the time of initialization, and can be cancelled and changed at a later time by using an identification number etc.

Second Embodiment

Next, a second embodiment will be described referring to the drawings. When stereoscopic images utilizing parallax information, as shown in FIGS. 1 to 3, are intactly broadcasted on television, they are displayed like superimposed images. They cannot be viewed without a dedicated stereoscopic display apparatus constructed as described above. Thus, the broadcasting of stereoscopic video is limited by infrastructural facilities of equipment on the viewer side, and it is necessary to provide a dedicated channel that is not intended to be seen by people in general, or to superimpose a flag on the broadcasted information to indicate that it is 3D. Accordingly, it is generally convenient to distribute such stereoscopic video in the form of a recording medium, and to reproduce it with a dedicated player or with a player having this function. Considering such circumstances, methods and formats for storing stereoscopic video in a recording medium will now be described.

Figure 10:
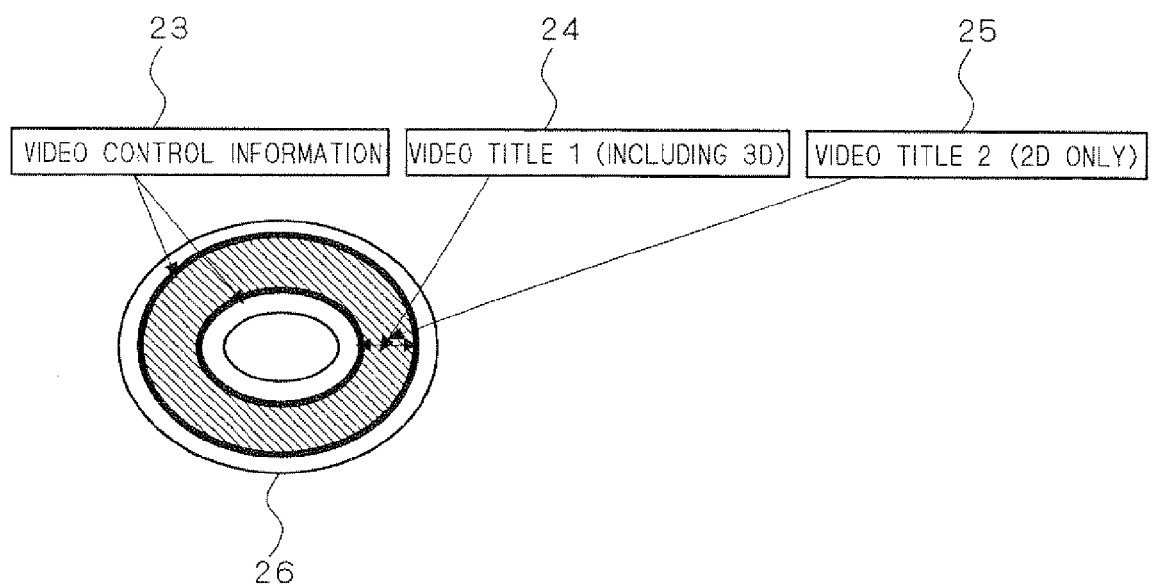
FIG. 10 is a diagram illustrating information recording regions on a recording medium according to a second embodiment of the present invention.

FIG. 10 shows a recording medium 26 according to the second embodiment. The recording media (video media) of this invention can be optical disk media, such as DVDs, BDs, HD-DVDs, MOs, etc., and can also be HDD media, of course. HDDs are usually not portable themselves, but are advantageous in terms of capacity when recording broadcasted stereoscopic video information. On the other hand, optical disk media, such as ROM media, are advantageous for the distribution of stereoscopic killer content before broadcasted or for the distribution of chargeable stereoscopic content. The disk-like recording medium 26 shown in FIG. 10 is divided into a region that stores control information about the video information (video control information 23), a region that stores a stereoscopic video (a video title 24), and a region that stores an ordinary 2D video (a video title 25).

Figure 11:
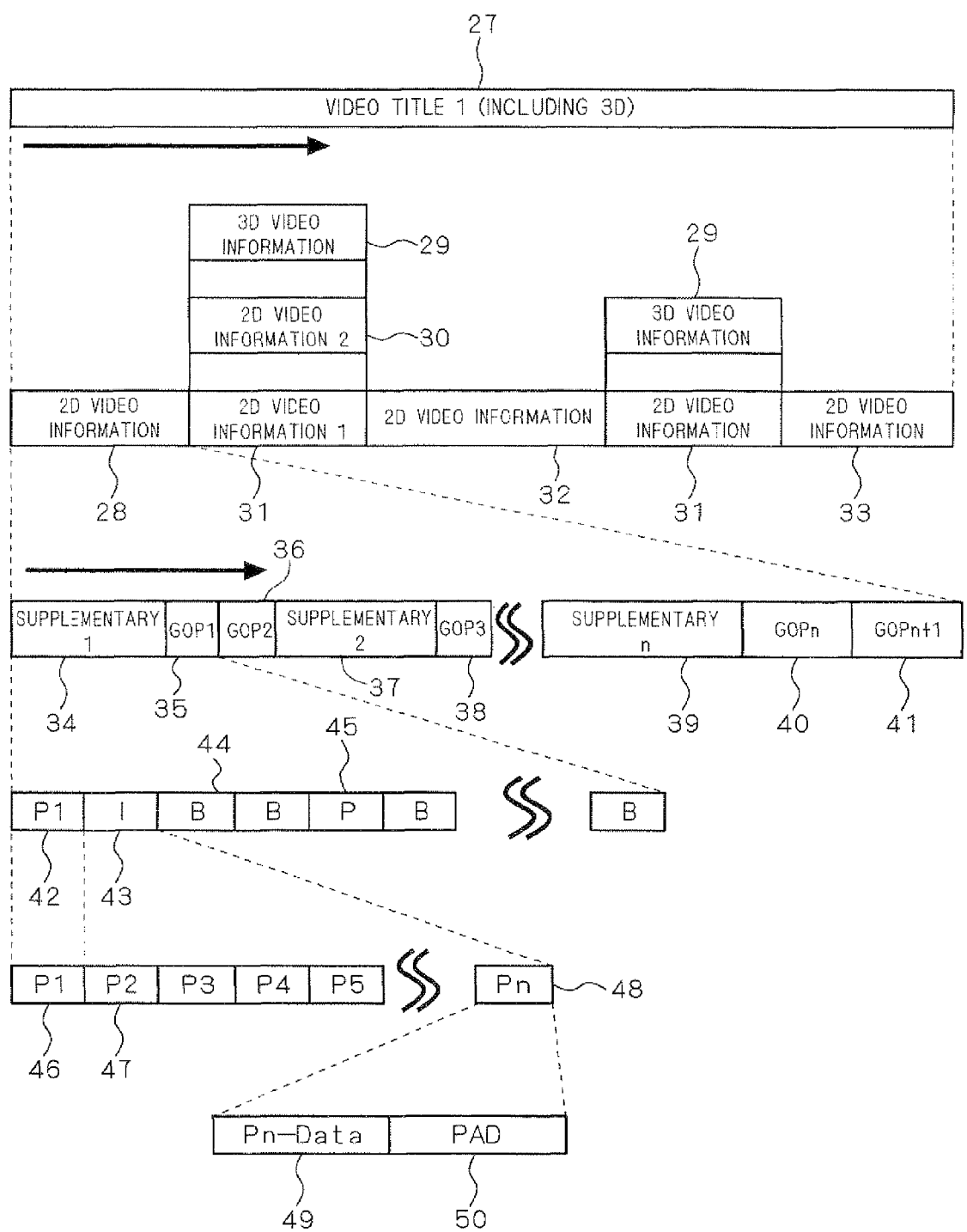
FIG. 11 is a diagram illustrating the structure of a video stream of a video title according to the second embodiment of the present invention.

FIG. 11 is a diagram showing an exemplary structure of the video stream in the region of the video title (video content) 24 of FIG. 10. The video title 27 shown in FIG. 11 includes 2D video information 28, user-selectable 2D video information 30 and 31, 3D video information 29 that is automatically selected or user-selected when the display apparatus is capable of displaying stereoscopic images, 2D video information 32 that is reproduced following the video information 29 to 31, and 2D video information 33 provided at the end of the video title 27. FIG. 11 also shows GOP-layer stream information including a supplementary information region 34 that is located at the head of the following GOP video information 35 and 36 and that describes supplementary information related to the GOP video information, a supplementary information region 37 that is located at the head of GOP video information 38 and that describes supplementary information related to the GOP video information, and a supplementary information region 39 that is located at the head of GOP video information 40 and 41 and that describes supplementary information related to the GOP video information.

FIG. 11 also shows picture-layer stream information including a packet data portion 42 that describes supplementary information, I picture data 43 composed of intra-encoded data, a B picture 44 as encoded data predicted from the I picture data 43 and a P picture 45 in the temporal direction, and the P picture 45 as encoded data predicted from the I picture data 43 only in one temporal direction. FIG. 11 also shows a transport packet data layer including a packet 46 as a transport packet data portion that describes supplementary information and that is identical to the packet data portion 42, a first packet 47 carrying the I picture data 43 divided into transport packets, a transport packet 48 storing the last data piece of the I picture data 43, a last portion 49 of the I picture data in the transport packet 48, and a padded portion 50 in the transport packet 48.

Figure 12:
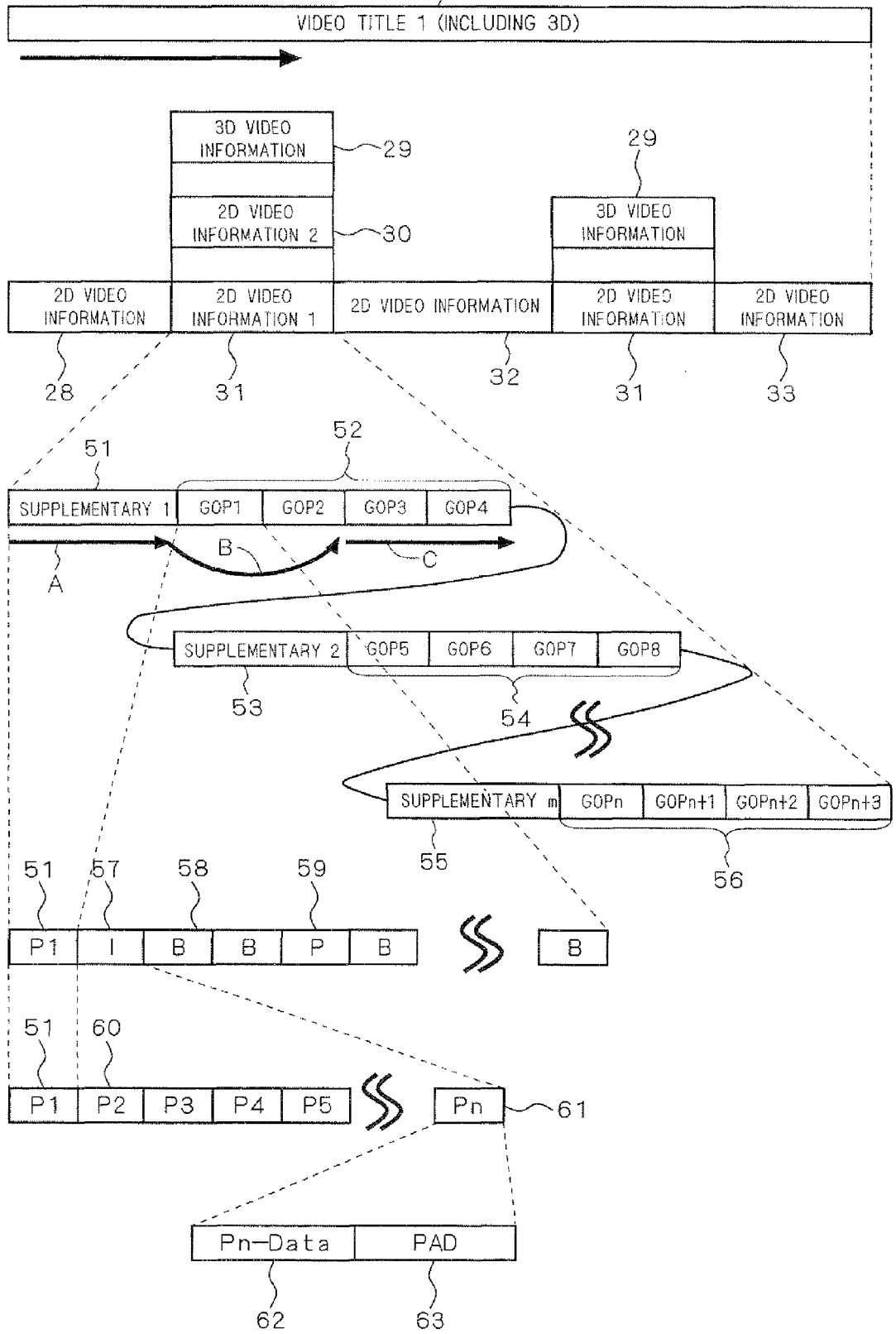
FIG. 12 is a diagram illustrating the structure of the video stream of the video title according to the second embodiment of the present invention.

FIG. 12 illustrates the hierarchical data structure of the region of the video title (video content) 27 where a selection can be made among the 3D video information 29 and the 2D video information 30 and 31. FIG. 12 shows supplementary information 51 that is located at the head of the region where the 3D video information 29 and 2D video information 30 and 31 are selectable and that stores information related to the video sequence, a GOP video information sequence 52 in this region, supplementary information 53 that stores information related to a GOP video information sequence 54, and supplementary information 55 that stores information related to the GOP video information sequence 56 at the last of this region. FIG. 12 also shows picture layer stream information including I picture data 57 composed of intra-encoded data, a B picture 58 as encoded data that is predicted from the I picture data 57 and a P picture 59 in the temporal direction, and the P picture 59 as encoded data that is predicted from the I picture data 57 only in one temporal direction.

Figure 13:
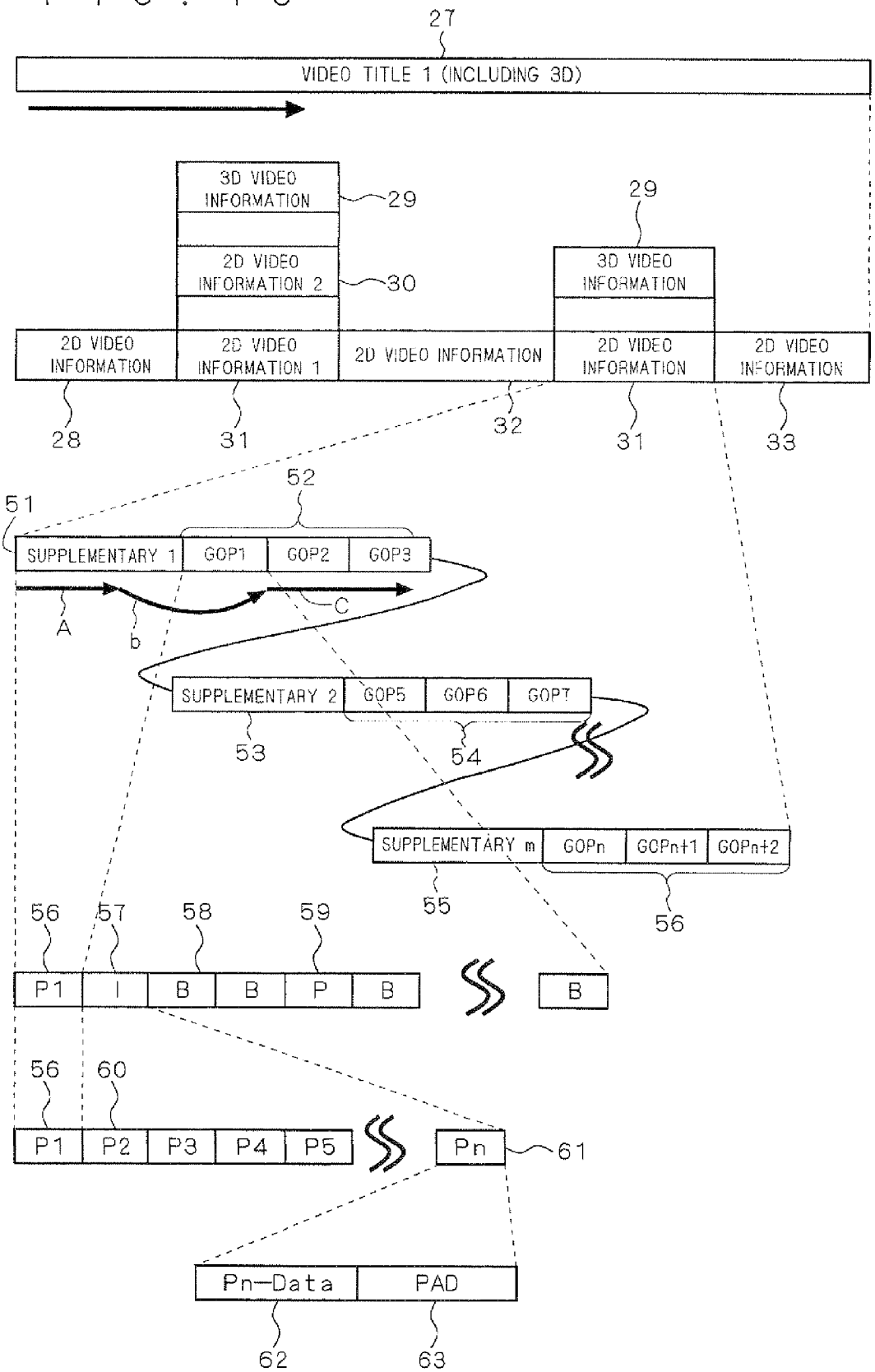
FIG. 13 is a diagram illustrating the structure of the video stream of the video title according to the second embodiment of the present invention.

FIG. 12 also shows a transport packet data layer including a first packet 60 carrying the I picture data 57 divided into transport packets, a transport packet 61 storing the last data piece of the I picture data 57, a last portion 62 of the I picture data in the transport packet 61, and a padded portion 63 in the transport packet 61. Also, in FIG. 12, the arrow A indicates a reproduced portion, the arrow B indicates a portion that is skipped when 3D reproduction is performed, and the arrow C indicates a portion that is reproduced for 3D reproduction, where right-eye GOP video information and left-eye GOP video information are provided. FIG. 13 illustrates the hierarchical data structure of the region of the video title 27 where a selection can be made between the 3D video information 29 and the 2D video information 31. This structure is basically the same as that of FIG. 12, and therefore like components are designated by like reference characters and not described again here.

Now, as shown in FIG. 10, the structure of data recorded in an optical disk or HDD medium includes a region for the video control information 23 for recording video-related supplementary information, sequences, etc., and a region for actual video titles (video content) 24, 25. In this case, 3D video is not always totally 3D from the beginning to the end, but it may be a mixture of 3D and 2D, or such video streams may be switchable by user selection. In particular, DVD standards allow for display of user-selectable and switchable video information streams, such as multi-angle, and 3D video information is produced by supplementaryly constructing a 3D video stream on a 2D video stream, since users' facilities are not always 3D-compatible. When a user's display equipment is compatible with 3D, it may be automatically recognized, e.g., by the link function of HDMI terminal, and a 3D video stream may be displayed selectively, or the user may operate a button to select and display 3D video. Needless to say, some content may be totally 2D or 3D, but consideration should be given to such composite formats.

It is desired that supplementary information regions about the video information stream of the video title 24 be provided also on the video information stream, so as to allow access to the information, management of the information, switching of settings of equipment, etc. In particular, when content includes a mixture of 2D and 3D video streams, it is necessary on the TV side to detect whether the video stream is 2D or 3D. When supplementary information regions are provided on the stream, the settings on the TV side can be readily and automatically changed on the basis of the information. When a player/recorder for reproducing/recording a recording medium controls all settings in a closed manner, it will be satisfactory to describe the control information only in the video control information 23 where the control information is collectively recorded in a part of the disk. However, when it is connected to a TV, especially when the TV is switched in the course of reproduction, superimposing necessary minimum control information on the video information itself allows the settings on the TV side to be automatically switched. When such control information is absent in the video information, the procedure requires detecting the switching of TV, separately sending control information from the player/recorder, changing the settings on the TV side, and then sending the video information. Needless to say, as to the change of settings on the TV side, it is necessary to provide a mechanism for quickly changing the settings of the display apparatus, since the stereoscopic video reproduction processing itself, like the switching of polarized light, is conducted on the display apparatus side.

The supplementary information 51 can be used also for access and management of information, and it has become established as Navi information in DVD standards. When both 2D video and 3D video exist in a mixed manner, they exist in parallel in the time sequence of the content, as shown by the 3D video information 29 and 2D video information 30 and 31 in FIG. 11. Accordingly, the first supplementary information 34 should be located at the head of the GOP data information group. Then, by reading the contents of the supplementary information first, it is possible to know whether the information of the next GOP sequence is 2D or 3D, and if it is 3D, it is possible to know whether it is for the left eye or for the right eye, and to know their locations in the GOP video information group (where to access). The GOP video information group having the supplementary information 51 at the head is defined as a video unit that is larger than the GOP video information.

In the case of video information data that is compressed also in the temporal direction, such as MPEG, the information exists in units of GOP information having an I picture at the beginning, and therefore access to the video data has to be made in units of GOP video information. Also, the supplementary information, which has to be read in the first place, should be located at the head of the GOP video information group. For example, when a 3D video information portion is reproduced as shown in FIG. 12, the supplementary information 51 is reproduced first (the arrow A in the diagram), and the 2D video information 30 and 31 are skipped, and then the 3D video information 29 is reproduced. In this way, the 2D video information 30 and 31 are skipped as shown by the arrow B so that the memory of the reproducing equipment does not capture unnecessary information (the 2D video information 30 and 31 in this case) and an increase of unwanted storage is avoided, and then the 3D video information 29 is reproduced as shown by the arrow C without interruption of video.

At the picture layer underneath, the supplementary information 51 at the beginning of GOP video information is located before the I picture 57. Also, in the lowermost-layer data, the compressed video data is divided into transport packets 60, 61 as shown in FIG. 12, since dividing compressed video data into transport packets is convenient to provide compatibility with digital broadcasts such as groundwave, satellite, and cable digital broadcasts. In this case, too, the supplementary information 51 is described in the transport packet at the head of the GOP video information group 52. Needless to say, a private packet that has been newly defined for transport packets is used. In the transport packet 61 at the end of the I picture 57, the data does not always end to fit the fixed transport packet unit, and so it is preferable to pad the last portion 63 with "00" or "FF" so that the packet data completes to fit the GOP video information unit. When the sequence branches out into two streams including one 2D video stream 31 and one 3D video stream 29 as shown in FIG. 13, the arrow B skips a smaller amount of GOP video information than in FIG. 12, but the operation is basically the same as that shown in FIG. 11.

The contents of the supplementary information will be described in more detail. The supplementary information 51 shown in FIG. 14 includes content information 64, time code 65, arrangement information 66, information 67 about video information, information 68 about audio information, and information 69 about OSD information. The content information 64 shown in FIG. 14 includes content name 70, copyright 71, encryption information 72, presence/absence of 3D images 73, and available region information 74.

Figure 15:
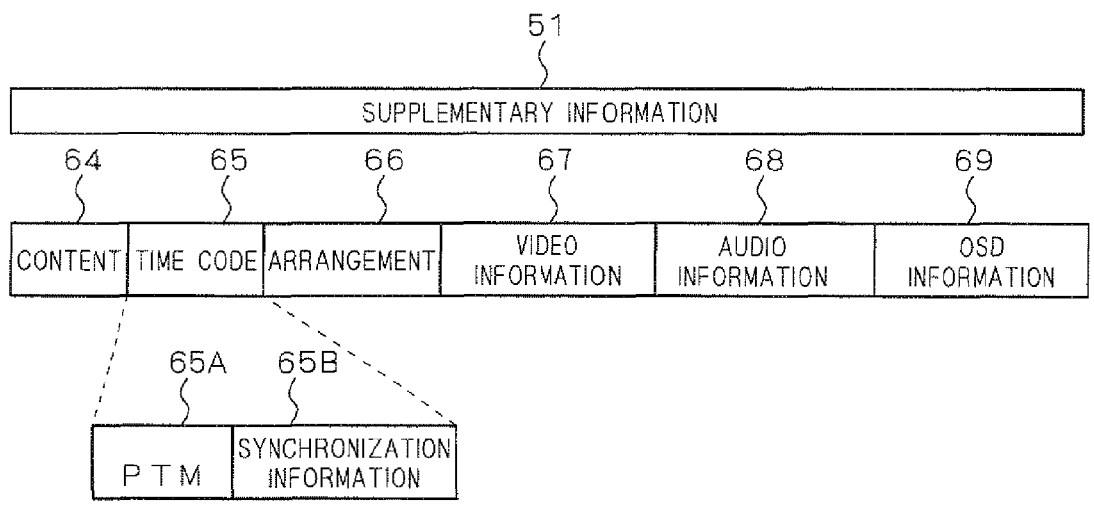
FIG. 15 is a diagram illustrating time code information in the supplementary information according to the second embodiment of the present invention.

The time code information region 65 shown in FIG. 15 includes presentation time 65A and synchronization information 65B. The arrangement information 66 shown in FIG. 16 includes seamless information 75, jump destination information 76, angle information 77, and in-GOP arrangement information 78. The video information 67 shown in FIG. 17 includes resolution information 79, frame rate information 80, 3D video information 81, parental information 82, angle information 83, encryption information 84, information 85 about a 3D video scheme and presence/absence, 3D video frame rate information 86, the number of 3D video information 87, information 88 about depth resolution, information 89 about the degree of depth variation, information 90 about permitted subtitle depth, information 100 about depth limitations, and information 101 about parallax limitations.

Figure 14:
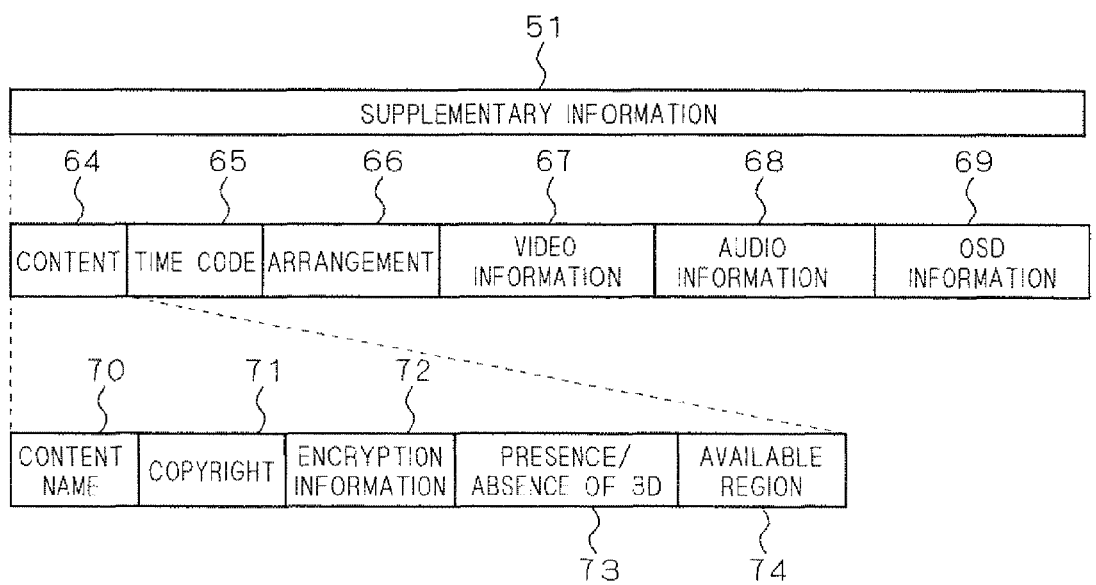
FIG. 14 is a diagram illustrating content information in the supplementary information according to the second embodiment of the present invention.
Figure 19A:
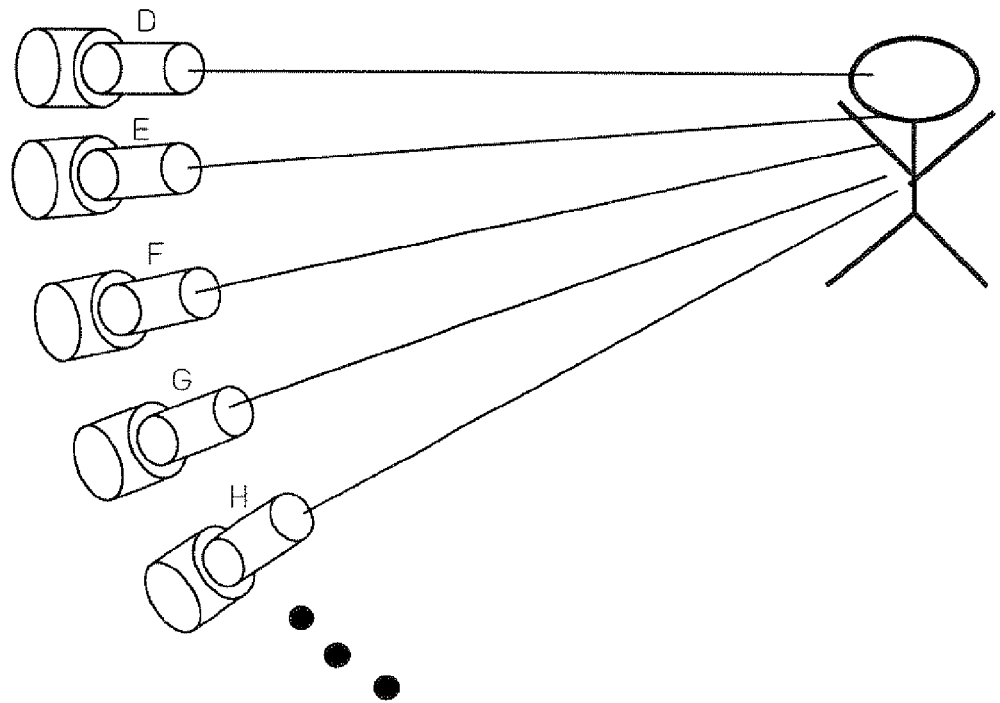
FIGS. 19A and 19B are schematic diagrams used to illustrate multi-angle information according to the second embodiment of the present invention.
Figure 19B:
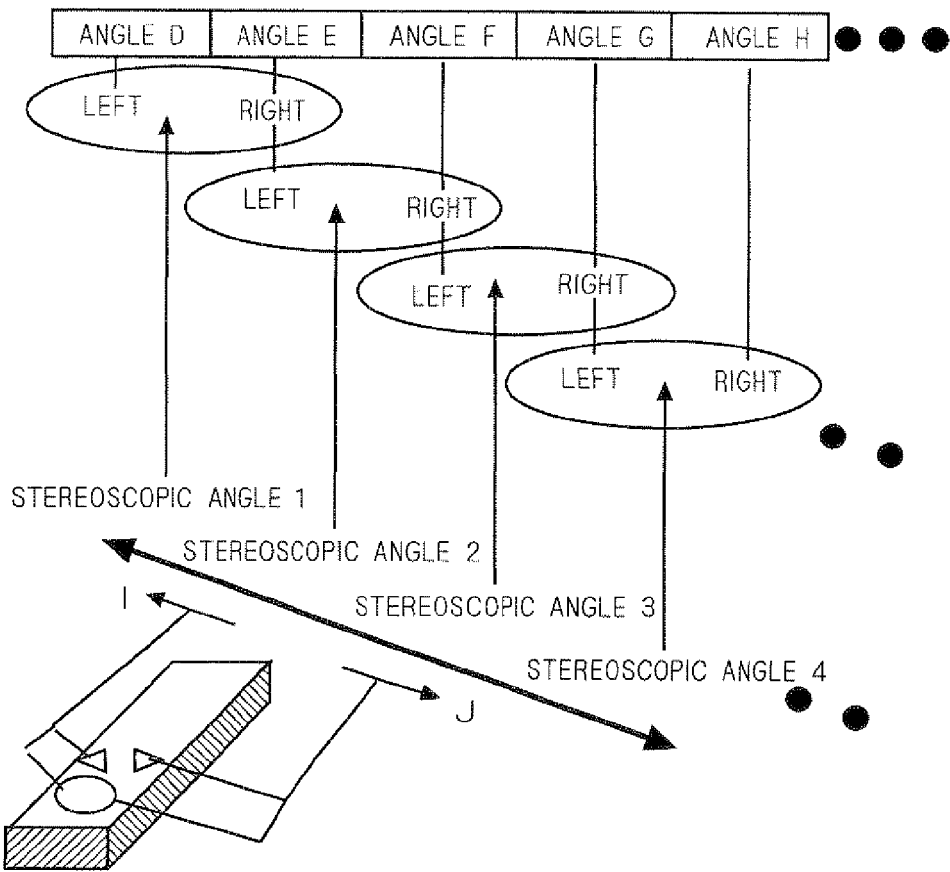

FIG. 18 is a schematic diagram illustrating display of the supplementary information on a TV as a display apparatus. FIGS. 19A and 19B are schematic diagrams illustrating a multi-angle filming with a plurality of cameras. The OSD information 69 shown in FIG. 20 includes OSD arrangement information 69A, OSD storage arrangement information 69B, font and character size designation 69C, in-plane OSD arrangement information 69D, depth-direction OSD arrangement information 69E, depth position 69F, permitted-depth limitation 69G, and depth zooming speed 69H Now, the supplementary information 51 shown in FIG. 14 is first described for each GOP video information group on the stream, and it is sent together with the video information in HDMI transmission to a TV etc. Accordingly, needless to say, it includes information necessary for settings on the TV side, especially about 3D video display.

Next, the content information 64 shown in FIG. 14 will be described. The content name information 70 may be displayed as OSD information on the TV side, including (1) content name, (2) cast, (3) time of production, (4) distributor, (5) names of relevant works, and (6) summarized story. When the supplementary information 51 superimposed on the video stream is included, it is possible to display the contents of the content name information 70 even when the input on the TV side is switched to 3D video information in midstream.

The copyright information 71 shown in FIG. 14 describes (7) copyright owner, (8) distributor, (9) importer, and (10) capital participant, whereby the information about the copyright owner of the video stream can be distributed at the same time, allowing the copyright owner to claim against illegal use of the reproduced data. Also, since this information is superimposed on the video stream, it is always distributed to the TV side and the copyright information can be displayed even when the TV is changed.

The encryption information 72 shown in FIG. 14 includes (11) presence/absence of encryption and (12) encryption scheme, whereby the destination equipment can be informed whether the information is encrypted and requires a high level of security, or the information requires no security, like commercials.

The 3D video information 73 shown in FIG. 14 describes (13) whether ready for 3D, (14) whether ready for totally 2D display (whether it can be reproduced to the end only with 2D video display), and (15) when 3D-ready, whether 3D video reproduction has priority, whereby information can be displayed to the user of a 3D-imcompatible TV to let the user know that the user TV is 3D-incompatible. Also, when link-connected with a TV by HDMI, it is possible to automatically switch the TV side to 3D (for example, to automatically display two video streams field by field as shown in FIGS. 1 to 3). When the TV side does not have a 3D video function, measures can be taken by indicating, on the TV or reproducing apparatus side, that the TV is incompatible, or by ejecting the disk, for example.

The available region 74 shown in FIG. 14 can describe (16) a 2D video reproduction permitted region and (17) a 3D video reproduction permitted region, whereby it is possible to permit the reproduction of this disk only in a limited region, and also to permit 2D only and permit 3D compatible display only in a limited region. This is because, in some cases, 2D video reproduction only is permitted in a particular region when the conditions for license about 3D video reproduction are not established. In a region where 3D video reproduction is not permitted, measures can be taken by allowing even a 3D video display apparatus to reproduce 2D video only, or by ejecting the disk, for example.

Next, the time code information 65 shown in FIG. 15 will be described. With video content that contains a mixture of 2D and 3D, even when the user gives an instruction for switching in midstream (from 3D to 2D, for example), it is necessary to continuously reproduce the video information without interruption or omission. Also, the user may give an instruction for a time search to move forward or backward, e.g., to 10 minutes before. It is therefore necessary to record the presentation time 65A at the beginning of the GOP video information group, so as to provide reproduction time information from the start of the video title. It is possible to display the remaining time on the TV side, by recording information about the remaining time to the end of the reproduction of the title, or the total title reproduction time.

Also, 3D video is likely to cause eye fatigue etc., as described in the first embodiment. Accordingly, it is possible to give an instruction to take a break to prevent eye fatigue, or to warn about the danger, by displaying a time code from the start of 3D video reproduction (how long 3D video has been viewed continuously), or by displaying how long 3D video has been viewed in total in this video content. Also, when there are right-eye and left-eye GOP video information for 3D, it is possible to make field designation corresponding to the order of reproduction. That is, the presentation time 65A describes (18) a time code from the start of the title (presentation time), (19) information about the remaining time to the end of the reproduction of the title, or a total title reproduction time, (20) a time code from the start of 3D video reproduction (3D presentation time), (23) total 3D reproduction time, and (24) the order of reproduction of right-eye and left-eye videos or field designation. The synchronization information 65B defines the synchronization of the video content, by the order of reproduction of right and left images or by field designation.

Figure 16:
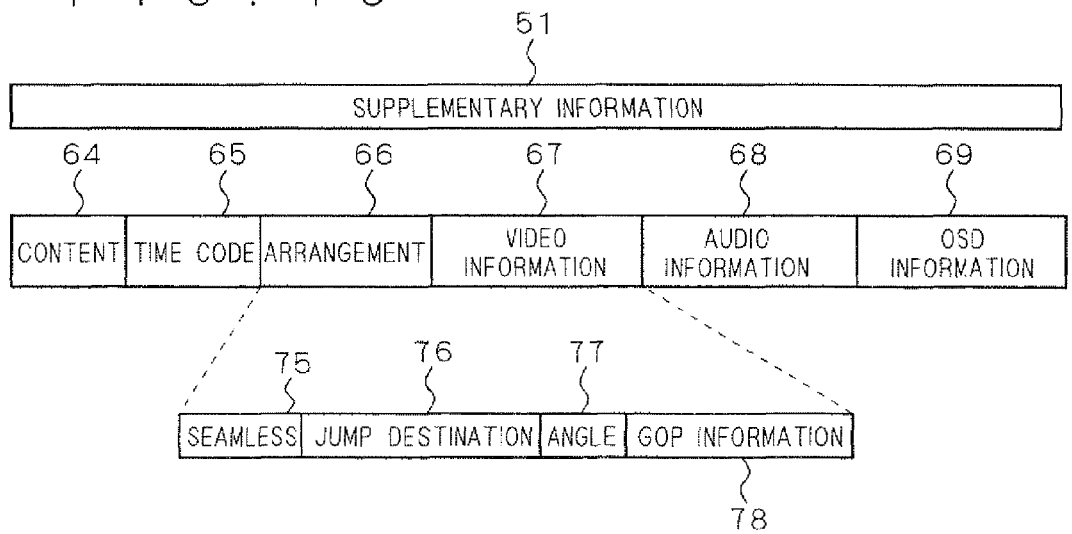
FIG. 16 is a diagram illustrating arrangement information in the supplementary information according to the second embodiment of the present invention.

Next, the arrangement information 66 shown in FIG. 16 will described. In particular, when video content includes both 2D and 3D contents in a mixed manner, it is necessary to describe arrangement information about GOP video information groups, in order to skip information unnecessary for reproduction or to move to the beginning of required data. Also, in the case of special reproduction operation, it is necessary to consider the requirement that access has to be first made to an intra-compressed picture, because of the characteristics of temporally-compressed video, such as MPEG. Accordingly, the seamless information 75 records (25) absence/presence of seamless reproduction (to the next GOP video information group). Also, the jump destination information 76 records (26) jump destinations' (forward and backward) address 1, address 2, etc., (27) jump destinations' time code information 1, time code information 2, etc. (having multiple pieces of jump destination information as table information), and (28) presence/absence of 3D video information at jump destinations. When the information of (28) presence/absence of 3D video information at jump destinations indicates the absence of 3D video information at the jump destination, the setting of the TV can be returned to 2D during the reproduction of the stream.

The angle information 77 records (29) GOP video information address 1, address 2, etc., that correspond to a plurality of angles, and (30) time code information 1, time code information 2 etc., about the GOP video information corresponding to a plurality of angles. The in-GOP arrangement information 78 records (31) address information 1, address information 2 etc., as arrangement information about P pictures in each GOP. Thus, the presence of the seamless information 75 enables sequential reproduction by connecting necessary angles, and the arrangement information in GOPs enables fast forward and fast reverse reproduction by reproducing I pictures only or I and P pictures only.

Figure 17:
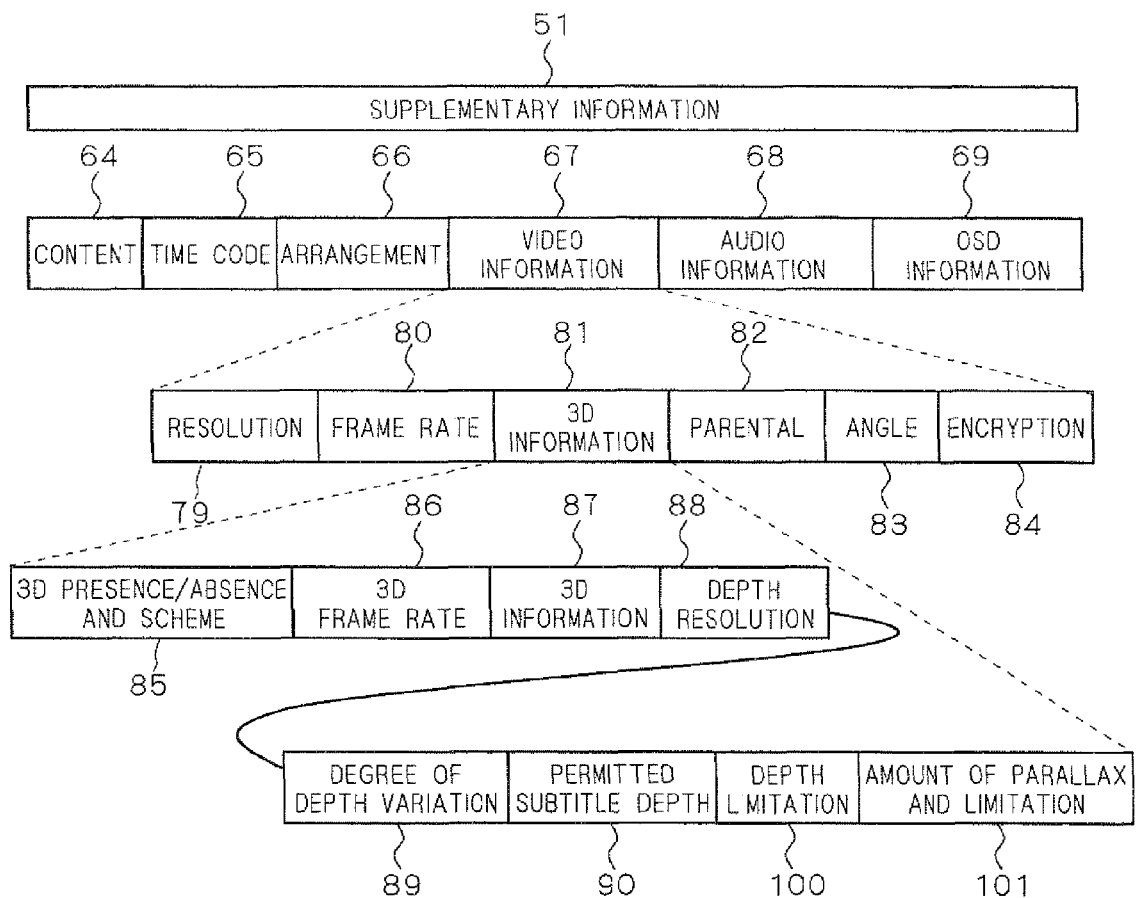
FIG. 17 is a diagram illustrating video information in the supplementary information according to the second embodiment of the present invention.

Next, the video information 67 shown in FIG. 17 will be described. In the video information 67, the pieces of information shown below are especially necessary as stereoscopic video information. First, the resolution information 79 records (32) a resolution of 2D video reproduction (in-plane direction), a resolution of P in P images (in-plane direction), and (33) a resolution of 3D reproduction (in-plane direction). The 3D video presence/absence and scheme 85 records (34) presence/absence of 3D and (35) designation about the 3D video scheme (scan-doubling rate designation, presence/absence of the use of polarizing eyeglasses, presence/absence of the use of a liquid-crystal shutter mechanism). The 3D frame rate 86 records (36) a 2D video reproduction frame rate and a 3D video reproduction frame rate.

The number of 3D video information 87 records (37) the number of independent 3D video information streams that are reproduced in parallel. When there are n different angles, it is described as n=angle number. On the basis of this information, the number of angles is displayed during reproduction, and it is possible to switch the angle by user selection, and to recognize the angle numbers through display. The number of 3D video information 87 also records (38) the number of video streams and camera information about right and left images that are sequentially switched. For example, as shown in FIG. 19A, when images are taken by using cameras D to H having five shifted parallaxes, or when an animation is recorded by CG as five pieces of parallactic video information, this number and the intervals between the cameras or their angles are described. For example, the supplementary information is described as "general information—the number of video streams is five—the camera interval is ** mm", "camera D's image 1—angle 1", "camera E's image 2—angle 2", "camera F's image 3—angle 3", "camera G's image 4—angle 4", and "camera H's image 5—angle 5".

When there are five video streams with shifted parallaxes, it is possible, as shown in FIG. 19B, to reproduce four stereoscopic angle video streams with slightly different angles with the five pieces of parallactic video information, with the angle D as the left image of the image 1 and the right image of the image 2, the angle E as the left image of the image 2 and the right image of the image 3, the angle F as the left image of the image 3 and the right image of the image 4, and the angle G as the left image of the image 4 and the right image of the image 5. It is also possible to rotate images by sequentially shifting the angle information. Thus, one video stream does not indicate one angle information, but new angle information can be constructed by combining images having adjacent parallactic angles. In recent years, with the progress of CG techniques, it is easy to produce stereoscopic images in animation, and the point of view can be changed by shifting the angle, by preparing parallactic information of multiple angles and accessing the information according to the user's indication from a remote controller.

The depth resolution 88 records (39) 3D video depth resolution 1, resolution 2, etc. When there are a plurality of 3D video streams, it describes a plurality of depth-direction resolutions. For example, in CG video, when the depth resolution is extremely low and the image does not move smoothly in time, the depth can be complemented in the temporal direction on the basis of this information so as to produce smooth display. The degree of depth variation 89 records (40) the degree of 3D video depth variation 1, the degree of variation 2, etc. When there are a plurality of 3D video streams, a plurality of depth-direction variation degrees are described. In particular, the degree of variation is closely related to the fatigue of human eyes as described in the first embodiment, and it is recorded to ensure safety, and can be utilized to give a warning to the user, or to instruct the user to take a break, for example.

The permitted subtitle depth 90 records (41) the range of permitted subtitle depths (maximum viewing angle 1, minimum viewing angle 1, maximum viewing angle 2, minimum viewing angle 2, etc.). When there are a plurality of 3D video streams, a plurality of depth-direction variation degrees are described. Subtitle information is likely to affect eye fatigue, because the focus must be frequently adjusted alternately to the subtitles' focus position and the point of attention during the viewing of stereoscopic video as described later, and it is therefore necessary to sufficiently limit the range of display. Also, when the depth information is described in terms of real distance, it is difficult to represent it in numerical form because the far side is at an infinite distance, and therefore it is desirable to describe it in terms of viewing angle information. Also, it has no meaning to represent near-infinite distances with detailed numerals, and therefore a lower limit may be set, e.g., by omitting viewing angles of 1 degree or less. The player sets the depth positions of subtitles in OSD display on the basis of these pieces of information.

The depth limitation 100 records (42) depth limitation (maximum viewing angle 1, maximum viewing angle 2, etc.). When a stereoscopic image protrudes or moves extremely forward, it will cause a psychological impression like "surprising". Accordingly, the amount of protrusion of stereoscopic images, not of subtitles, is limited, so that the images are soft for the eyes or so that the images will not surprise the viewer too much. In this case, in the player, viewing angles corresponding to the maximum amounts of protrusion are previously recorded in the video content as shown in FIG. 17, making it possible, as shown in FIG. 18, to give a warning to young children, or to indicate restrictions on the viewing.

The parallax limitation 101 describes (43) limitations of the amount of parallax (for filming, maximum viewing angle 1, minimum viewing angle 1, maximum viewing angle 2, minimum viewing angle 2, etc.). When there are a plurality of 3D video streams, a plurality of depth-direction variation degrees are described. This information corresponds to the distance between two cameras during filming. The amount of reference parallax differs depending on the interval between human eyes, and this information defines the range of reference angles. It is thus possible to previously grasp the degree of discomfort that a small child, having a short interval between the eyes, would feel when viewing the video.

Thus, it is possible to alleviate discomfort by preparing video content that contains a plurality of stereoscopic video streams with different reference parallax values so that a selection can be made on the basis of the interval between the viewer's eyes. In animation and the like, recent innovative CG techniques are capable of easily changing the reference parallax value with a computer. In this case, such parallax value limitation information is described in the supplementary information, whereby the player can provide select buttons, e.g., indicating " (age)", " (age)", and "adult", as shown in FIG. 18, and then a selection can be made with the buttons so that the reference parallax value of the original video content can be adapted to the viewer to present proper stereoscopic viewing. It is also possible to avoid eye fatigue etc., that would be caused by the viewing of video with improper parallax for a long time. Also, the parental 82 defines a stereoscopic video parental level for 3D viewing, as well as an ordinary flat-video 2D parental level. The parental 82 records (44A) a flat video parental level (a parental level like those defined for existing DVDs) and (44B) a stereoscopic video parental level (a stereoscopic video parental level as described in the first embodiment).

Figure 20:
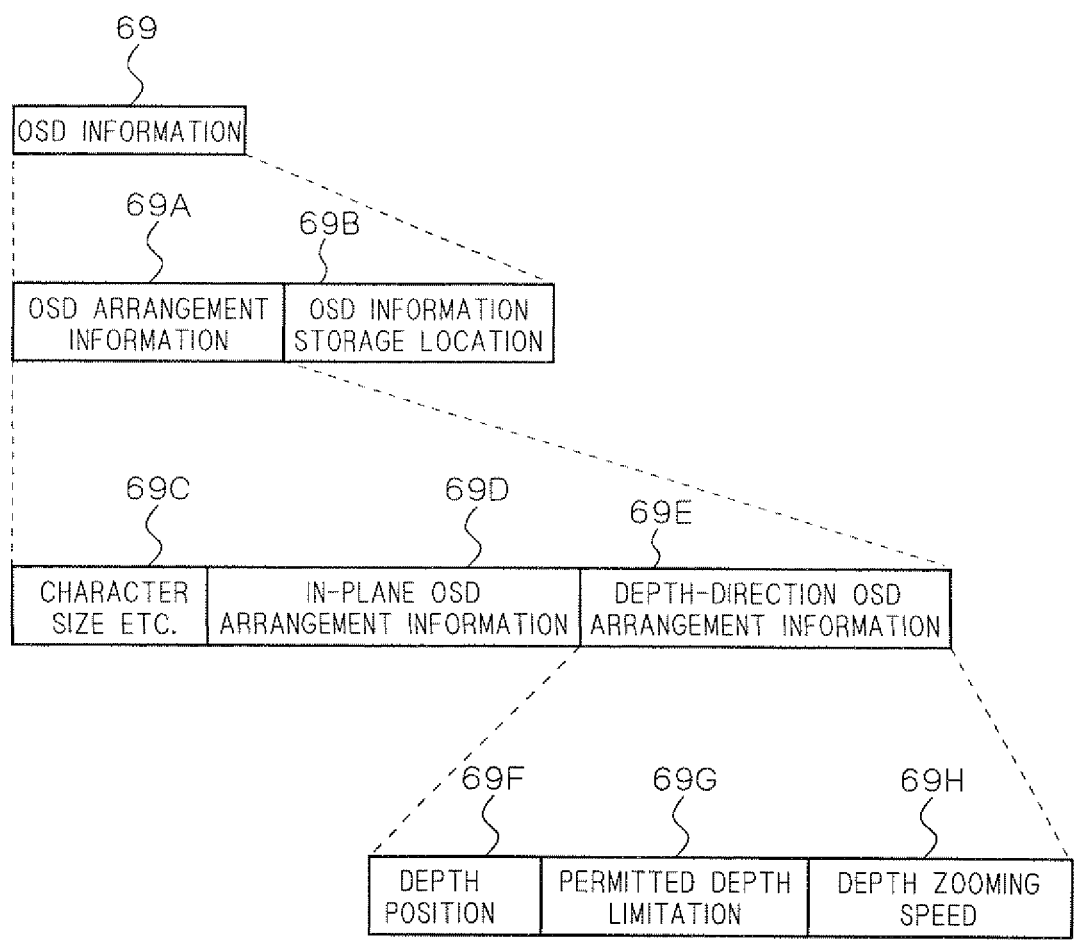
FIG. 20 is a diagram illustrating OSD information according to the second embodiment of the present invention.

As shown in FIG. 20, the OSD information 69 records, first, arrangement information 69A as supplementary information about the OSD itself, and OSD information storage location 69B describing addresses where the information about the OSD itself is stored. With the OSD display 69, the supplementary information is first captured and understood by a microcomputer etc., and then the actual OSD is obtained and displayed on the basis of the storage arrangement information.

The information 69C about character size etc., records (45) character font, character size. The in-plane arrangement information 69D records (46) character arrangement information (X position, Y position).

The depth-direction OSD arrangement information 69E records (47) depth position 69F, (48) permitted-depth limitation 69G (limitations for alleviating eye fatigue as described in the first embodiment, such as a far-side limit position, a near-side limit position, a limitation on the amount of depth variation, etc.), and (49) depth zooming speed 69H (presence/absence of zooming, zooming speed). The depth zooming speed 69H defines zooming to alleviate eye fatigue, by gradually zooming from a certain subtitle to the next subtitle, instead of instantaneously varying the depth position.

The above-described pieces of supplementary information from (1) to (43) about 3D video information are superimposed on the video information stream and distributed together with the video information, and similar descriptions can be recorded also in the video control information 23 in a region separate from the video information itself, as described below. This allows all information to be read at the time when the player is started, and thus enables various initializations to be made. This also enables descriptions of more detailed control information, since a larger amount of information can be described regardless of bit rate and memory limit, than when it is superimposed on the video information.

Figure 21:
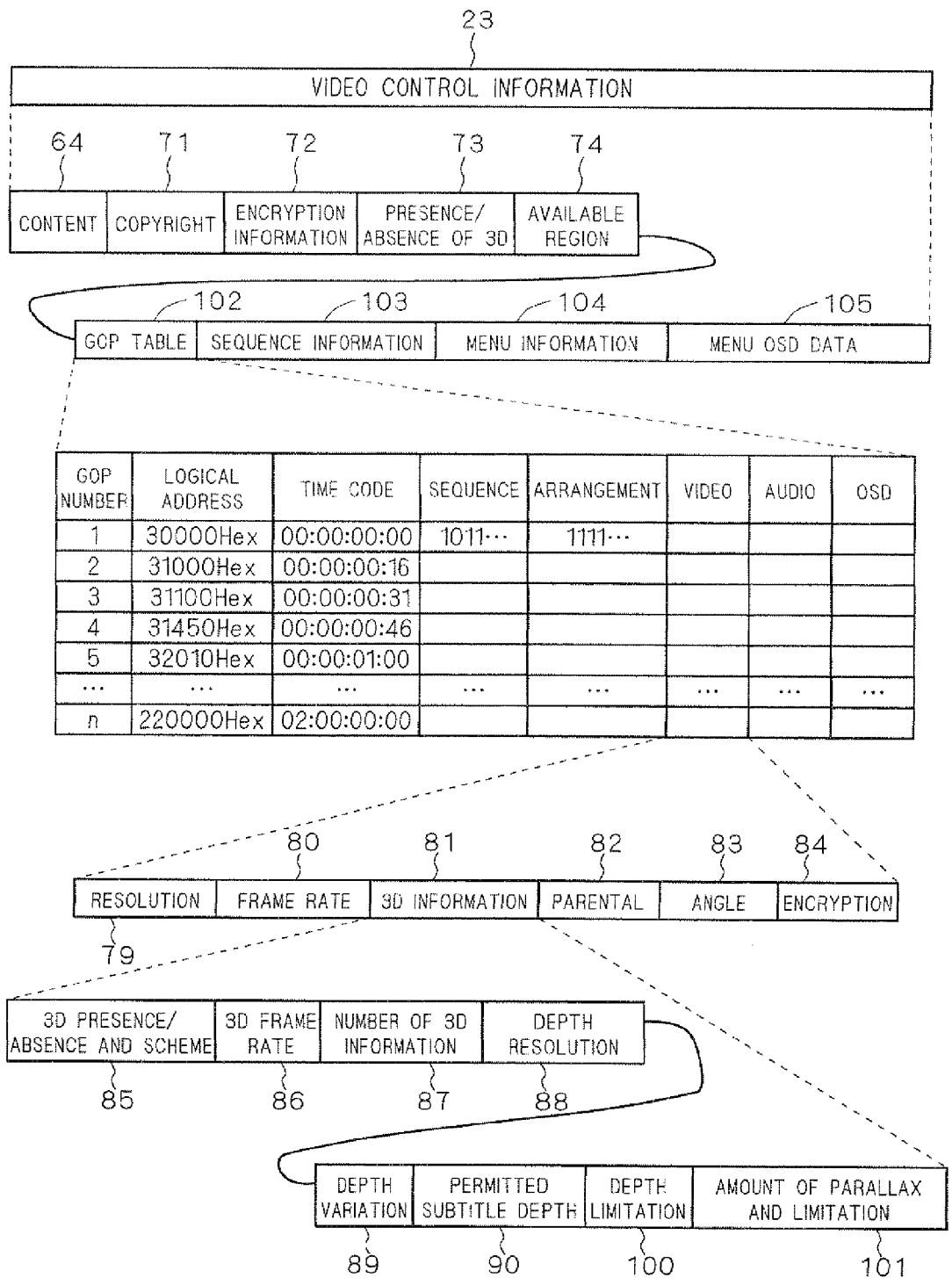
FIG. 21 is a diagram illustrating GOP table information in video control information according to the second embodiment of the present invention.

Next, the structure of control information recorded in a certain region on the recording medium separately from the video information will be described. FIG. 21 is a diagram illustrating the details of a GOP table portion of collectively recorded video control information 23, and FIG. 21 also shows the video-related information recorded therein. The video control information 23 shown in FIG. 21 includes content information 64, copyright 71, encryption information 72, presence/absence of 3D images 73, available region information 74, GOP table information 102, sequence information 103, menu information 104, and menu OSD data 105. The GOP table information 102 is described in the form of a table as shown in FIG. 21, having sections for GOP number, logical address, time code, sequence, location, video, audio and OSD.

In particular, FIG. 21 shows the structure of the video section, which includes resolution information 79, frame rate information 80, 3D video information 81, parental information 82, angle information 83, and encryption information 84. FIG. 21 also shows that the 3D video information 81 includes 3D scheme and presence/absence information 85, 3D video frame rate information 86, the number of 3D video information 87, depth resolution information 88, depth variation degree information 89, permitted subtitle depth information 90, depth limitation information 100, and parallax limitation information 101.

Figure 22:
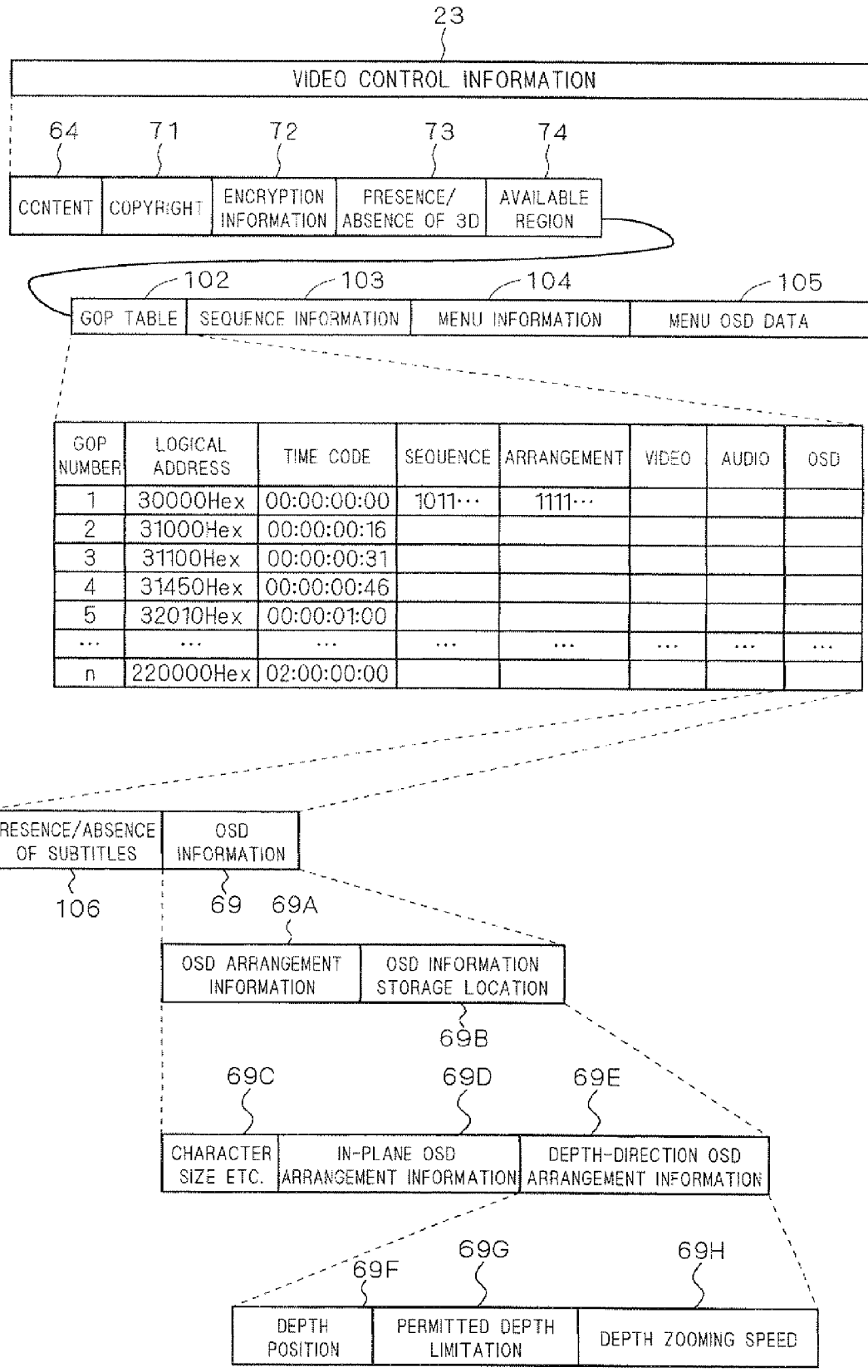
FIG. 22 is a diagram illustrating the GOP table information and OSD information in the video control information according to the second embodiment of the present invention.

FIG. 22 is also a diagram illustrating the GOP table portion of the collectively recorded video control information 23, and FIG. 22 shows the details of the video-related information recorded therein. In particular, FIG. 22 shows the structure of the OSD section, including presence/absence of subtitles 106 and OSD information 69. The OSD information 69 includes OSD arrangement information 69A and OSD storage arrangement information 69B, where the OSD arrangement information 69A includes font and character size designation 69C, in-plane OSD arrangement information 69D, and depth-direction OSD arrangement information 69E, and the depth-direction OSD arrangement information 69E includes depth position 69F, permitted-depth limitation 69G, and depth zooming speed 69H.

Figure 23:
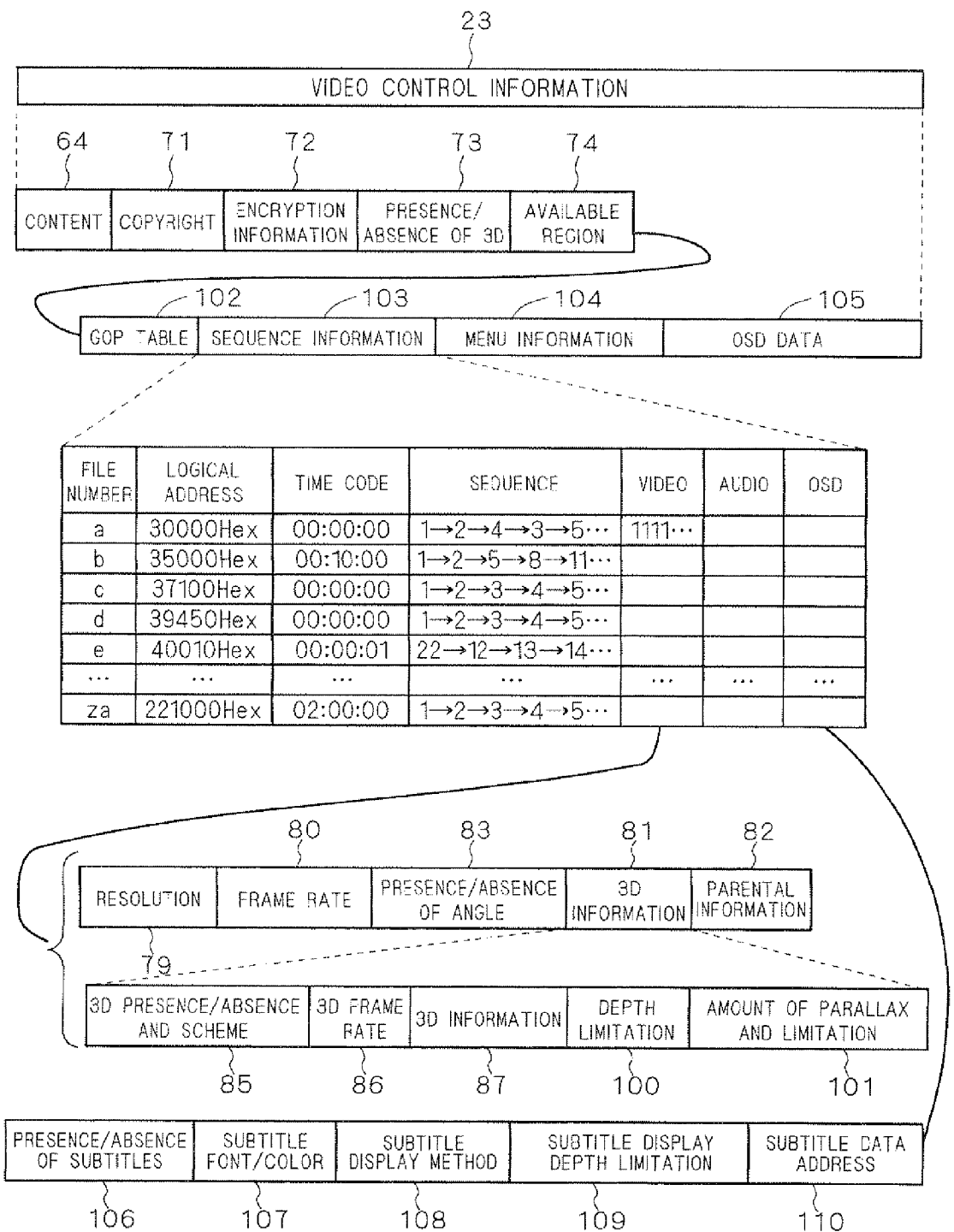
FIG. 23 is a diagram illustrating sequence information, OSD information, and video attribute information in the video control information according to the second embodiment of the present invention.

FIG. 23 illustrates the structure of the sequence information in the video control information collectively recorded in a region of the recording medium separately from the video information, and FIG. 23 illustrates that the sequence information 103 is recorded in the form of a table. The video section of FIG. 23 includes resolution information 79, frame rate information 80, angle information 83, 3D video information 81, and parental information 82. The 3D video information 81 includes 3D video scheme and absence/presence information 85, 3D video frame rate information 86, the number of 3D video information 87, depth limitation information 100, and parallax limitation information 101. The OSD section of FIG. 23 records presence/absence of subtitles 106, subtitle font, color 107, subtitle display scheme 108, subtitle depth limitation 109, and subtitle data address 110.

The control information located in a certain region of the recording medium separately from the video information describes all information including the supplementary information 34 and 51 that are superimposed on the video information stream. By this, the control information is read first when the player/recorder is started so that various initializations can be made.

First, the video control information 23 is described as shown in FIG. 21. Like the supplementary information 51 superimposed in the video information of FIG. 14, it includes content information 64, time code 65, arrangement information 66, information 67 about video information, information 68 about audio information, and information 69 about OSD information. However, in the video control information 23 where a larger amount of information can be stored, it is possible to describe table information about all GOPs, like the GOP table 102, and so the contents of the information can be grasped in units of GOP video information without reproducing the video. The GOP table 102 is described like the table of FIG. 21, including logical addresses, and so data file identification information can be detected from a signal read from a given sector region, by utilizing the logical addresses. Then, on the basis of the detected data file identification information, the position of a data file recorded on the disk medium is identified. The data file corresponds to an encoded unit located at the position indicated by the position identification signal. Then, the data file is read on the basis of the identified position on the disk medium, and the video signal encoded in the unit in the read data file is decoded, and can thus be reproduced. Thus, for reproduction, the position where a certain video signal encoded in the unit is recorded can be readily and instantaneously specified at a desired point of time.

The supplementary information about video in the GOP table 102 includes 3D video information, and the same items as the items (32) to (43) described in the video stream can be described for each piece of GOP video information. Also, as shown in FIG. 23, the subtitle information describes the presence/absence of subtitles 106, subtitle font, color 107, subtitle display scheme 108, subtitle depth limitation 109, and subtitle data address 110, and thus the same information as the information (44) to (49) can be described as supplementary information about subtitles for each piece of GOP video information.

Also, as shown in FIG. 23, the video control information 23 can also describe sequence information for each piece of GOP video information. Thus, at the start of reproduction, a sector address is generated about a certain sector region where information about the order of data file reproduction is recorded, and the reproduction order information is read from the data read by data reading means, so as to detect the reproduction order information, and then the order of sector addresses are generated on the basis of the reproduction order information. It is thus possible to reproduce video signals recorded in sectors that are distributed on the recording medium. The sequence table information can also describe the supplementary information shown as (32) to (49).

Third Embodiment

Figure 24:
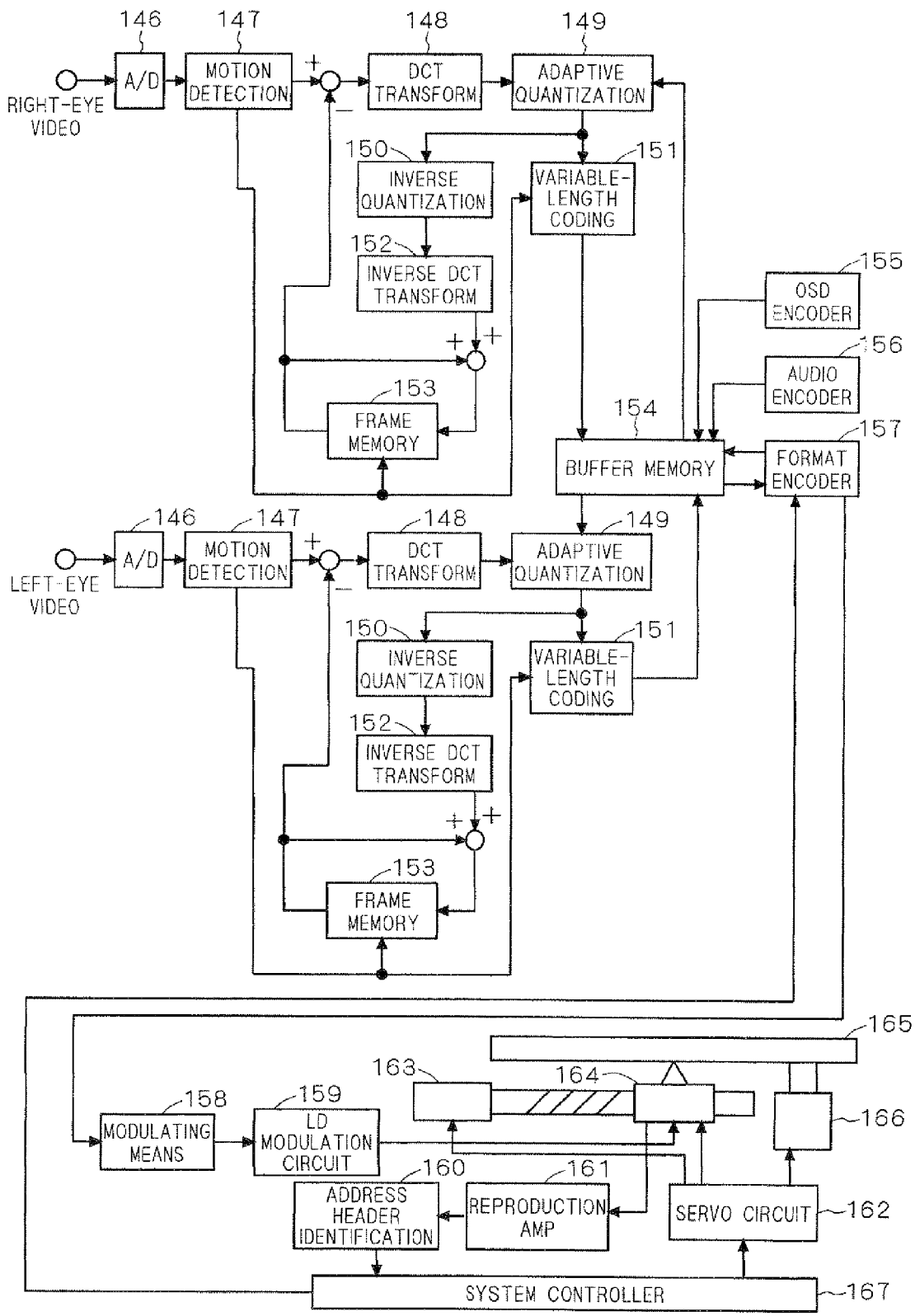
FIG. 24 is a block diagram of a stereoscopic video recording apparatus according to a third embodiment of the present invention.

Next, a third embodiment will be described. FIG. 24 is a block diagram of a stereoscopic video recording apparatus according to the third embodiment. The stereoscopic video recording apparatus shown in FIG. 24 includes AD converters 146 for digitizing video signals respectively for the right-eye and left-eye videos of stereoscopic video utilizing parallax information, motion vector detectors (motion detectors) 147 necessary for video compression in the temporal direction, DCT transform circuits 148 necessary for intra-compression, adaptive quantization circuits 149 necessary for intra-compression, and inverse quantization circuits 150 for local decoders. The stereoscopic video recording apparatus of FIG. 24 also includes variable-length coding circuits 151 necessary for intra-compression, inverse DCT transform circuits 152 for local decoders, frame memories 153 for local decoders, a buffer memory 154 for storing data after compressed, an OSD information encoder 155, an audio encoder 156, a format encoder 157, modulating means 158 for generating a signal to be written to an optical disk 165, and an LD modulation circuit 159. The stereoscopic video recording apparatus of FIG. 24 further includes an address header identification circuit 160 for extracting addresses for recording to the optical disk 165, a reproduction amp 161 for reproducing a signal from an optical head 164, a servo circuit 162 for controlling the optical head 164, a feed motor 163 and a rotary motor 166, and a system controller 167 for controlling and managing the sequence of the entire apparatus.

Figure 25:
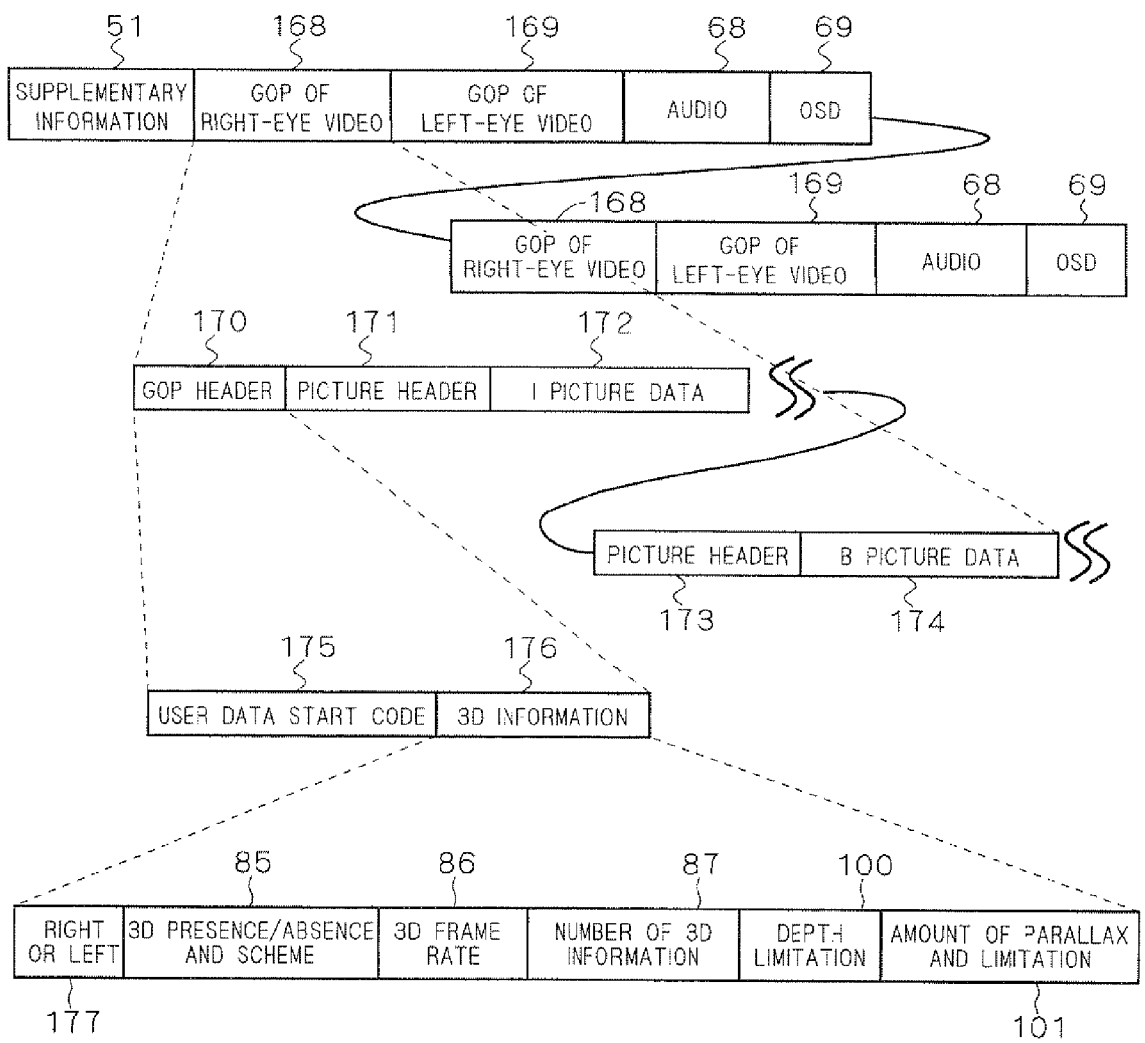
FIG. 25 is a diagram illustrating the structure of a video stream according to the third embodiment of the present invention.

FIG. 25 is a diagram illustrating the stream structure of a stereoscopic video signal generated on the basis of the stereoscopic video recording apparatus of FIG. 24. The stream structure of the stereoscopic video signal of FIG. 25 includes supplementary information 51, which is followed by repetitions of a right-eye video GOP 168, a left-eye video GOP 169, audio information 68, and OSD information 69. The right-eye GOP 168 of FIG. 25 includes a GOP header 170, picture headers 171 and 173, I picture data 172, and B picture data 174. Also, the GOP header 170 of FIG. 25 includes a user data start code 175 in the GOP header 170, and 3D video information 176 in the GOP header 170. Also, the 3D video information 176 of FIG. 25 includes information 177 indicating whether the pictures are for the left eye or the right eye, 3D video scheme and presence/absence information 85, 3D frame rate information 86, the number of 3D video information 87, depth limitation information 100, and parallax limitation information 101.

FIG. 26 illustrates a lower-order structure of the stereoscopic video signal stream generated on the basis of the stereoscopic video recording apparatus of FIG. 24. FIG. 26 shows the right-eye GOP 168 with transport stream packets 178 to 182, and the left-eye GOP 169 with transport stream packets 185 to 188. The data pieces 183 and 189 are the last data pieces respectively of the transport packets 182 and 188 where the last data pieces of the GOP video information are described, and padded portions 184 and 190 are attached respectively to the data 183 and 189.

Now, the stereoscopic video recording apparatus shown in FIG. 24 performs identical video compression for each of the left and right eyes, where the AD converter 146 digitizes right-eye pictures and the motion detector 147 extracts motion vectors on a macroblock-by-macroblock basis. Since the beginning of video data is intra-encoded, it is DCT-transformed in the DCT transform circuit 148, quantized in the adaptive quantization circuit 149, variable-length-coded in the variable-length coding circuit 151, and sent to the buffer memory. In this process, the video data after adaptive-quantized is processed in the local decoder formed of the inverse quantization circuit 150 and the inverse DCT transform circuit 152, and the original video signal is thus reconstructed and stored in the frame memory 153. Then, by making a comparison with motion-compensated pictures in the frame memory 153, the following pictures to be compressed in the temporal direction can be compressed by using difference information only. Such a compression scheme is a widely-used, basic scheme in compression methods like MPEG, H.264, etc.

In the configuration of FIG. 24, the right-eye videos and left-eye videos are input as independent video streams and encoded in separate encoder blocks. Accordingly, the configuration of FIG. 24 includes identical blocks arranged in parallel for the right eye and the left eye. However, the same processing can be achieved with a single encoder block, by providing a memory at the input to once store left-eye and right-eye videos, and processing them in the same encoder block at a doubled rate. The stereoscopic video information thus encoded is sent to the buffer memory 154, and provided with OSD information from the OSD encoder 155, audio information from the audio encoder 156, and supplementary information necessary for the format from the format encoder 157, and thus formed into a data format for recording to the optical disk 165 as a recording medium. The format encoder 157 also provides the supplementary information necessary for the recording of 3D video information according to the present invention, as well as Navi information and menu information necessary for conventional optical disk formats.

The video data in the format for recording to the optical disk is sent to the modulating means 158, and optically modulated and provided with error correcting code as information for physical writing to the optical disk 165. Then the LD modulation circuit 159 generates a signal for modulating the laser provided in the optical head 164. In this process, the servo circuit 162, for ensuring stable recording to the optical disk 165, controls the feed motor 163 for moving the optical head 164, the rotary motor 166 for rotating the disk 165, and the objective lens actuator in the optical head 164, to achieve tracking and focusing. During recording, it is necessary to read addresses on the optical disk 165, and a signal received at the optical head is photo-electrically converted to a fine signal, and the reproduction amp 161 reproduces the fine signal, and the address header identification circuit 160 generates address information. The address information is sequence-processed in the system controller 167 together with settings for activation of individual blocks, and processings for writing timing etc., especially requiring high-speed timing, are performed in dedicated hardware, and sequence setting portions requiring programming are performed in the CPU etc.

Now, the video stream generated by the stereoscopic video recording apparatus has a structure as illustrated in FIG. 25. First, generally compressed video data that includes temporally compressed pictures, such as MPEG, includes intra-compressed encoded pictures called GOP. For example, it is formed as a video block of about 15 pictures. Herein, there are two video blocks for the right eye and the left eye that utilize parallax information, and so the right-eye GOPs 168 and the left-eye GOPs 169 are sequentially arranged following the supplementary information 51 located at the beginning. In this example, one GOP is used for each of the right eye and the left eye, but a plurality of GOPs of the same number may be used in a range where video conditions are unchanged. Also, the supplementary information 51 is structured as described in the second embodiment, and a user data start code is newly defined in the GOP header portion, and 3D video information 176 may be described following it.

The 3D video information 176 first includes information (or a flag) 177 indicating whether it is for the left eye or the right eye, and further includes 3D video scheme presence/absence 85, 3D video frame rate 86, the number of 3D video information 87, depth information 100, and parallax limitation information 101, as described in the second embodiment. Also, as shown in FIG. 26, for the supplementary information 51, a private packet (TSP 1) 178 is provided at the transport packet layer, and it is separated and extracted in the transport packet decoder portion. Structuring the information as shown in FIG. 25 enables extraction of the same 3D information also at the MPEG data hierarchy level. When the reproducing apparatus and a TV are link-connected and 3D video settings are automatically made, or when the TV is switched in the course of reproduction, the supplementary information 51 is valid when the supplementary information extraction setting is valid on the TV side, and the 3D video information 176 is valid when stereoscopic video supplementary information at the MPEG layer is valid.

FIG. 25 describes the video stream in units of the MPEG information layer, and FIG. 26 describes it in units of transport packets that are one layer below. In FIG. 26, the video data in a block unit of the right-eye and left-eye GOPs 168 and 169 starts at the head of the transport packet 178, and it does not always fit an integer multiple of a transport packet at the end of the GOP video information. Accordingly, the remaining part of the last transport packet 182 is padded, and the padded data 184 is attached to the last data 183 to fill in information. Thus, the right-eye GOP 168 alone can be extracted by extracting the part from the transport packet 179 to the transport packet 182. The left-eye GOP 169 is processed in the same way as the right-eye GOP, and the left-eye video alone can be extracted by extracting the part from the transport packet 185 to the transport packet 188 including the padded data 190.

The stereoscopic video recording apparatus shown in FIG. 24 encodes the intact left-eye and right-eye videos. However, basically, right-eye videos and left-eye videos are visual information shifted by parallax, and therefore they are very closely correlated. Therefore, the amount of entire information can be compressed by using a configuration that records only the difference information about the left-eye videos in relation to the right-eye videos, for example. FIG. 27 is a block diagram of a stereoscopic video recording apparatus configured for this purpose. In the stereoscopic video recording apparatus of FIG. 27, the right-eye video block is structured for primary videos, and it adopts the same configuration as the video compression blocks shown in FIG. 24. However, for the left-eye videos, a difference is taken between the output of the motion detector 147 for the left eye and the output of the frame memory 153 for the right eye, so as to solely extract the difference information between the right-eye and left-eye videos. The difference information is processed in the DCT transform 148 and the adaptive quantizer 149 in the left-eye video line, and further processed in the variable-length coder 151, and then the difference information for the left eye is recorded in the buffer memory 154. The following procedures, to the writing to the optical disk, are performed in the same way as shown in FIG. 24. The example of FIG. 27 uses right-eye videos as primary videos and left-eye videos as secondary videos as difference, but the right-eye videos and the left-eye videos can of course be used in the opposite manner (left-eye videos can be used as primary videos and right-eye videos can be used as secondary videos as difference).

The stereoscopic video recording apparatus of FIG. 27 takes a difference between the left-eye and right-eye videos to further compress the amount of video information on one side, but the information can be further compressed since the video information is based on parallax information. FIGS. 28A and 28B are schematic diagrams illustrating the principles of parallactic images. FIG. 28A shows an object 126G on the front side at a depth position 126M, an object 126H on the depth side at a depth position 126L, a depth position (most forward) 126N to the eyes 126F, a viewing angle 126D for the object 126H, and a viewing angle 126E for the object 126G. FIG. 28B shows a left-eye video 126GA of the object 126G, a right-eye video 126GB of the object 126G, a parallax 126I between the left-eye video 126GA and the right-eye video 126GB, and same pixel points 126K in the left-eye and right-eye videos. Also, FIG. 28B shows a left-eye video 126HA of the object 126H, a right-eye video 126HB of the object 126H, a parallax 126J between the left-eye video 126HA and the right-eye video 126HB, and same pixel points 126L in the left-eye and right-eye videos.

Figure 29:
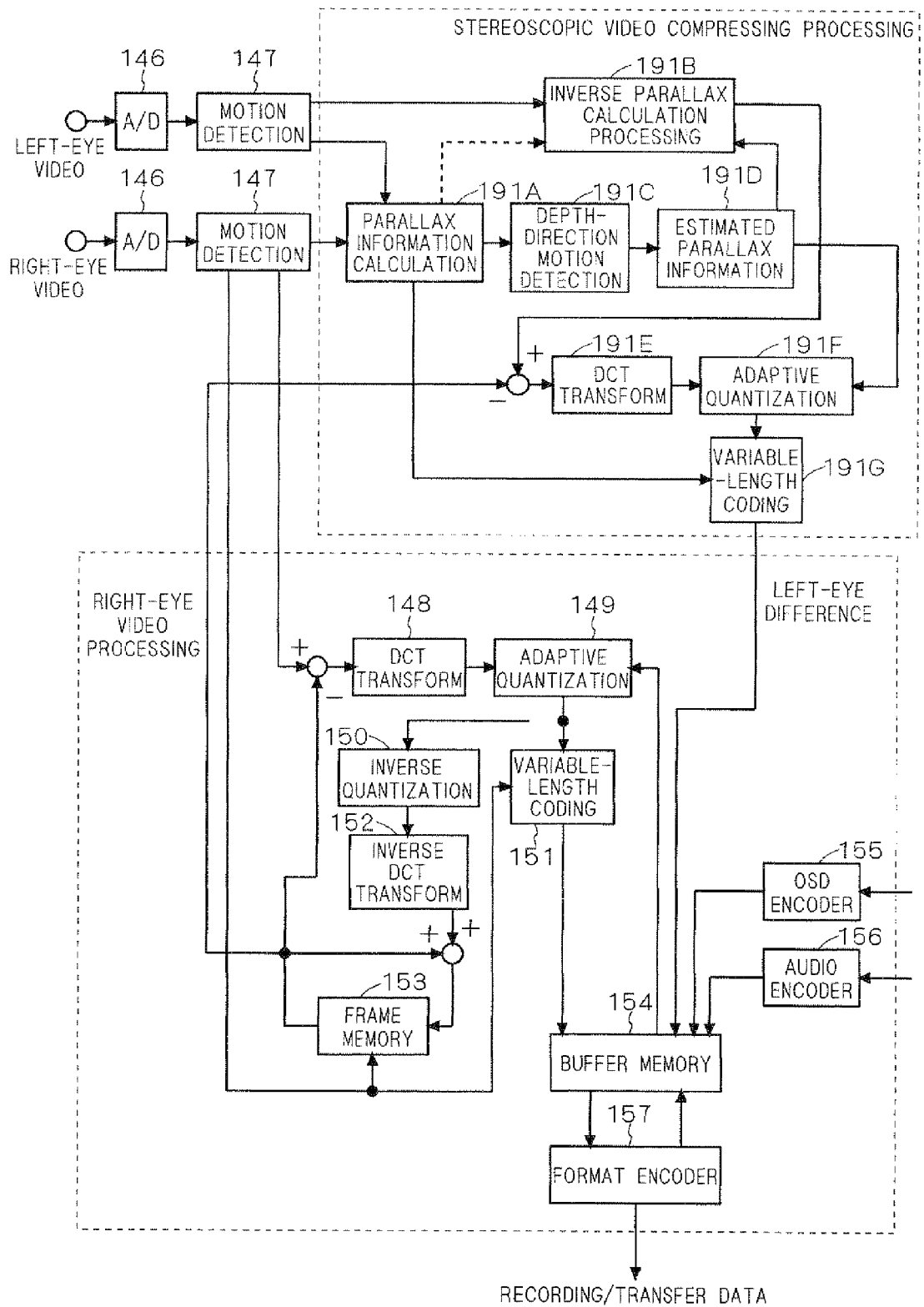
FIG. 29 is a block diagram of a stereoscopic video recording apparatus according to the third embodiment of the present invention.

FIG. 29 is a block diagram of a stereoscopic video recording apparatus for further compressing images on one side. The stereoscopic video recording apparatus shown in FIG. 29 includes a parallax information calculating circuit 191A for calculating the amount of parallax between right-eye and left-eye videos, a depth-direction motion detecting circuit 191C, and an estimated parallax information generating circuit 191D. Also, the stereoscopic video recording apparatus of FIG. 29 includes an inverse parallax calculating circuit 191B for converting-original left-eye videos to right-eye videos on the basis of the estimated parallax information, a DCT transform circuit 191E for performing DCT transform on the basis of the result of a comparison of a right-eye video with the right-eye video generated by the inverse parallax calculating circuit 191B, an adaptive quantization circuit 191F, and a variable-length coder 191G. The portion from the parallax information calculating circuit 191A to the variable-length coder 191G forms a block that performs stereoscopic video compression processing.

Figure 30:
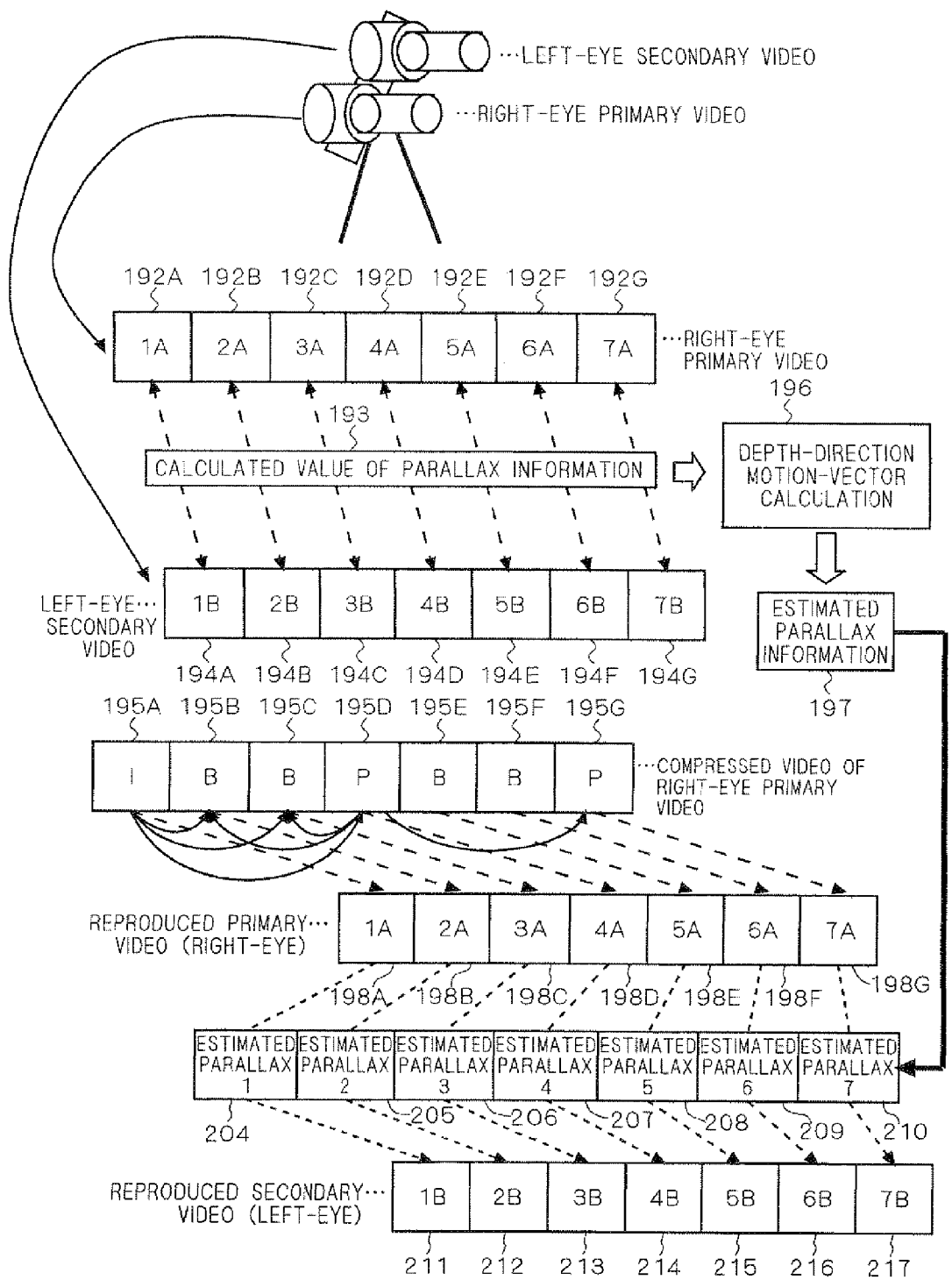
FIG. 30 is a schematic diagram illustrating a compression by image conversion with parallax information according to the third embodiment of the present invention.
Figure 31:
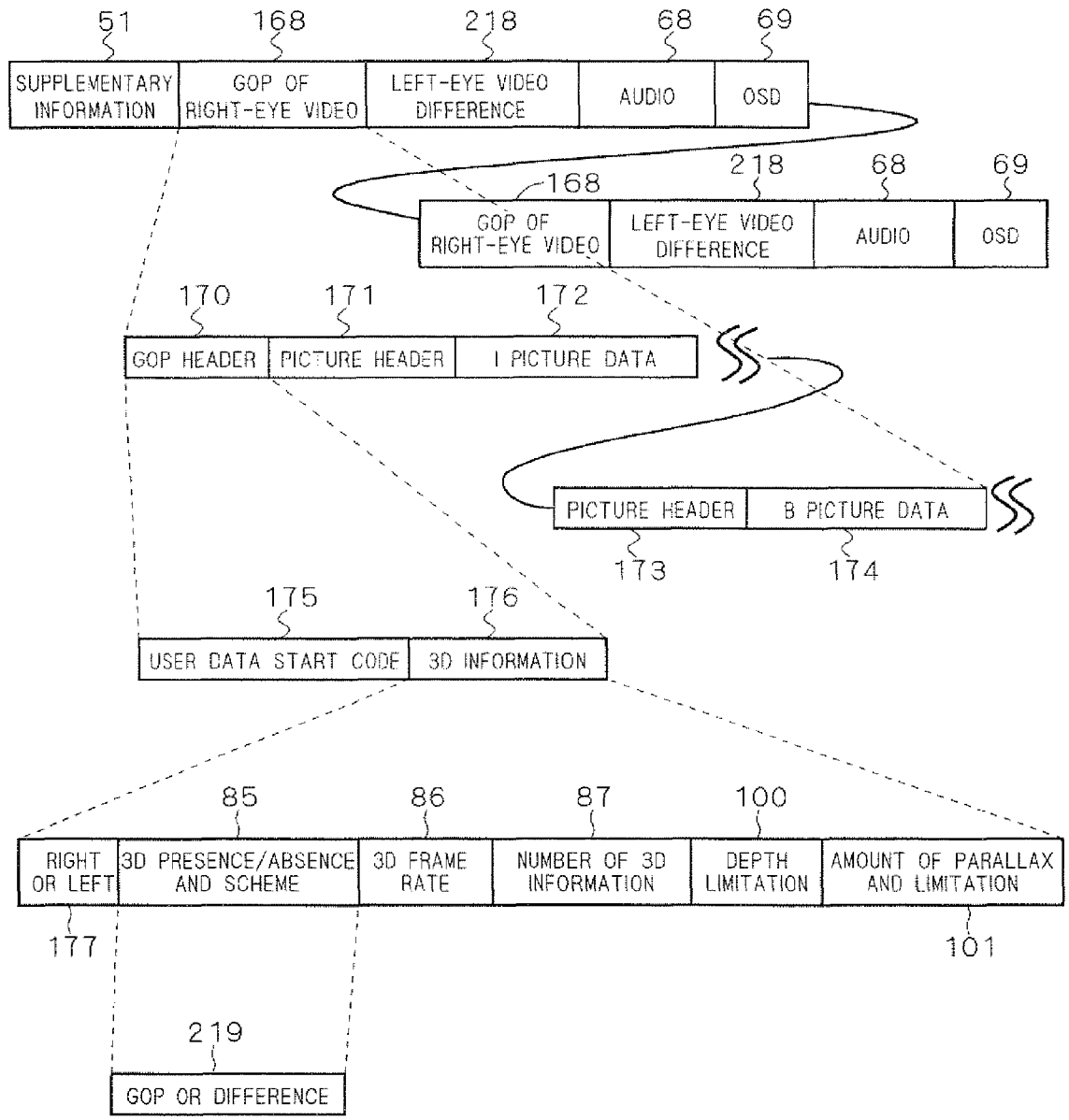
FIG. 31 is a diagram illustrating the structure of a video stream according to the third embodiment of the present invention.
Figure 32:
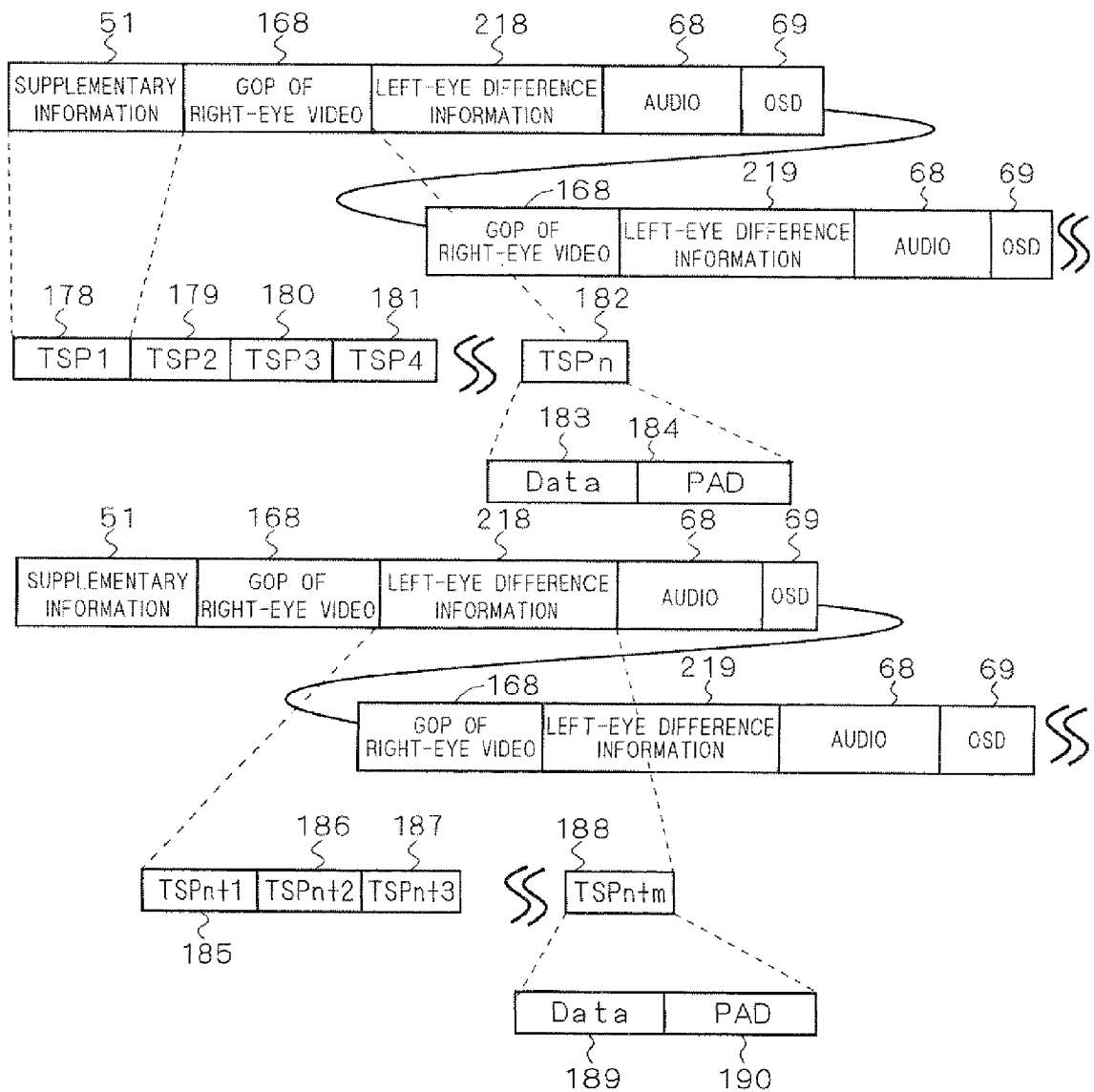
FIG. 32 is a diagram illustrating the structure of a video stream according to the third embodiment of the present invention.

FIG. 30 is a diagram illustrating the encoding and decoding of a video stream by the compression method of the stereoscopic video recording apparatus of FIG. 29. FIG. 30 shows right-eye videos 192A to 192G, parallax information calculated value 193 about the left-eye and right-eye videos, left-eye videos 194A to 194G, depth-direction motion vector calculated value 196, estimated parallax information 197, and compressed right-eye primary videos 195A to 195G. FIG. 30 also shows reproduced primary videos 198A to 198G based on the compressed right-eye primary videos 195A to 195G, estimated parallax information 204 to 210 respectively corresponding to the reproduced primary videos 198A to 198G, and reproduced secondary videos 211 to 217. FIG. 31 is a diagram illustrating the structure of a video stream generated by the compression method of the stereoscopic video recording apparatus shown in FIG. 27 or FIG. 29. The video stream structure shown in FIG. 31 is basically the same as that of FIG. 25, but it includes difference video information 218 in place of the left-eye GOPs 169, and supplementaryly includes information 219 in the 3D video scheme presence/absence 85 to indicate whether the information is GOP video information or difference information. FIG. 32 illustrates the stream structure at the transport level of the video stream generated by the compression method of the stereoscopic video recording apparatus of FIG. 29. FIG. 32 is basically the same as FIG. 26, but it includes difference video information 218 in place of the left-eye GOPs 169.

Now, FIG. 28A illustrates the stereoscopic direction with right-eye and left-eye videos utilizing parallax. In FIG. 28A, the parallactic angle seen from the eyes 126F appears different depending on the depth. Accordingly, in the right and left parallactic images shown in FIG. 28B, the object 126G on the near side is seen as being larger, and the left-eye video 126GA and the right-eye video 126GB are seen as being separated away, and the amount of parallax 126I is larger. On the other hand, the object 126H at a distance is seen as being smaller, and the left-eye video 126HA and the right-eye video 126HB are seen as being closer, and the amount of parallax 126J is smaller.

Accordingly, with information about the amount of parallax (126I or 126J) or with information about the parallactic angle (126D or 126E), it is possible, as shown in FIG. 28B, to estimate the right-eye video from the left-eye video (126K and 126L: image generation by conversion with parallax information). This estimation assumes that the brightness and color do not change depending on the angle of view, and therefore variations caused by turning-around of images, shades, etc., remain unpredictable by this estimation.

Now, in the stereoscopic video recording apparatus shown in FIG. 29, the parallactic angle is extracted on the basis of in-plane position information about objects that is obtained from the left-eye and right-eye motion detectors 147, and the parallax information calculating circuit 191A calculates parallax information on a macroblock-by-macroblock basis or a pixel-by-pixel basis. Also, for the compression in the temporal direction, the depth-direction motion detecting circuit 191C extracts motion vectors in the depth direction between pictures. The estimated parallax information generating circuit 191D generates estimated parallax information with the depth-direction motion information and the parallax information. Also, as mentioned above, when there is only the parallax information from an image on one side (described herein as a right-eye video), it is not possible to perfectly recover the image on the opposite side (described herein as a left-eye video), and therefore there remains unpredictable information, like variations caused by turning-around of images (e.g., a hidden portion becomes viewable).

Accordingly, in the stereoscopic video compression by the stereoscopic video recording apparatus shown in FIG. 29, the inverse parallax calculating circuit 191B first performs a local-decode reproduction of an image on the opposite side (described herein as the left-eye video), though not perfectly, by utilizing the estimated parallax information, and then a difference is obtained between it and the actually filmed image that has been compressed (the image in the frame memory 153 of the local decoder). The difference information is about the un-reproducible portion caused by variations due to turning-around of images as mentioned above, and it is possible to cover the portion that cannot be perfectly reproduced with the parallax information, in the compressed stream that utilizes parallax information. Also, though not shown, when depth-direction motion vectors are extracted, the amount of variation of parallax is also utilized as information. Thus, the depth-direction motion vectors can be utilized to increase the compression efficiency, by using an inverse quantization circuit, an inverse DCT transform circuit, and a frame memory, like an ordinary local decoder for information compression.

Now, FIG. 30 shows the image data in units of pictures. In FIG. 30, the right-eye primary videos 192A to 192G are extracted from the right-eye camera, and the left-eye secondary videos 194A to 194G are extracted from the left-eye camera. Then, the parallax information calculating circuit 191A of FIG. 29 calculates the parallax information 193 from the right-eye primary videos 192A to 192G and the left-eye secondary videos 194A to 194G. The depth-direction motion vector calculation 191C extracts the depth-direction motion-vector calculated value 196 from variations of the parallax information 193 between pictures, and the estimated parallax information 197 is generated. The estimated parallax information 197 itself may be on a macroblock-by-macroblock basis or a pixel-by-pixel basis.

On the other hand, in the reproduction of the images, the right-eye primary videos 192A to 192G are in the form of the compressed right-eye primary videos 195A to 195G that are encoded by the video compression. Specifically, the compressed right-eye primary videos include an intra-compressed I picture 195A, P pictures 195D and 195G compressed in the temporal direction with in-plane motion vectors, and B pictures 195B, 195C, 195E, and 195F. The compressed right-eye primary videos are reproduced into the reproduced right-eye primary videos 198A to 198G by a common compressed-video-decompressing circuit. Then, the reproduced secondary videos (left-eye videos) 211 to 217 are restored on the basis of: the reproduced primary videos (right-eye videos) 198A to 198G; the estimated parallax information 204 to 210 about individual pictures; and difference information about individual pictures that are inverse-quantized and inverse-DCT-transformed. The image portions restored from the difference information work to complement the portions that cannot be reproduced with the estimated parallax information, caused by turning-around of images and the like.

FIG. 31 illustrates the video stream using the video compression by the stereoscopic video recording apparatus of FIG. 29 or FIG. 27, and it is necessarily provided as data in GOP video information units. This is because the right-eye videos are originally in units of GOP video information, and it is necessary to match the unit level of the images since the differencely-compressed data for the left eye utilizes the right-eye videos. Now, the GOP header 170 in the right-eye GOP 168 includes supplementary information related to the stereoscopic video, like those described with FIG. 25. However, as shown in FIG. 31, for the left-eye videos, it is necessary to describe the information 219 in the 3D video scheme presence/absence 85 to indicate whether it is GOP video information or difference information, so as to indicate whether it is compressed information that utilizes the estimated parallax information 197 shown in FIG. 29, or differencely-compressed information as shown in FIG. 27, or information that is not compressed as stereoscopic images as shown in FIG. 24. FIG. 32 illustrates the stream structure at the transport packet level, where the end of the GOP video data is padded in a transport packet in a manner as shown in FIG. 26, and the end of the stereoscopically compressed video data, too, is padded in a transport packet. The description above assumes the right-eye videos as primary videos and the left-eye videos as secondary videos that are compressed in the stereoscopic direction, but there is no problem at all when the images are processed in the opposite relation. Also, the video stream may include a mixture of right-eye videos as primary videos and left-eye videos as secondary videos, and left-eye videos as primary videos and right-eye videos as secondary videos. When such a mixture is permitted by standards, it is necessary to describe identification information indicating which constitutes primary videos and which constitutes secondary videos.

Figure 34:
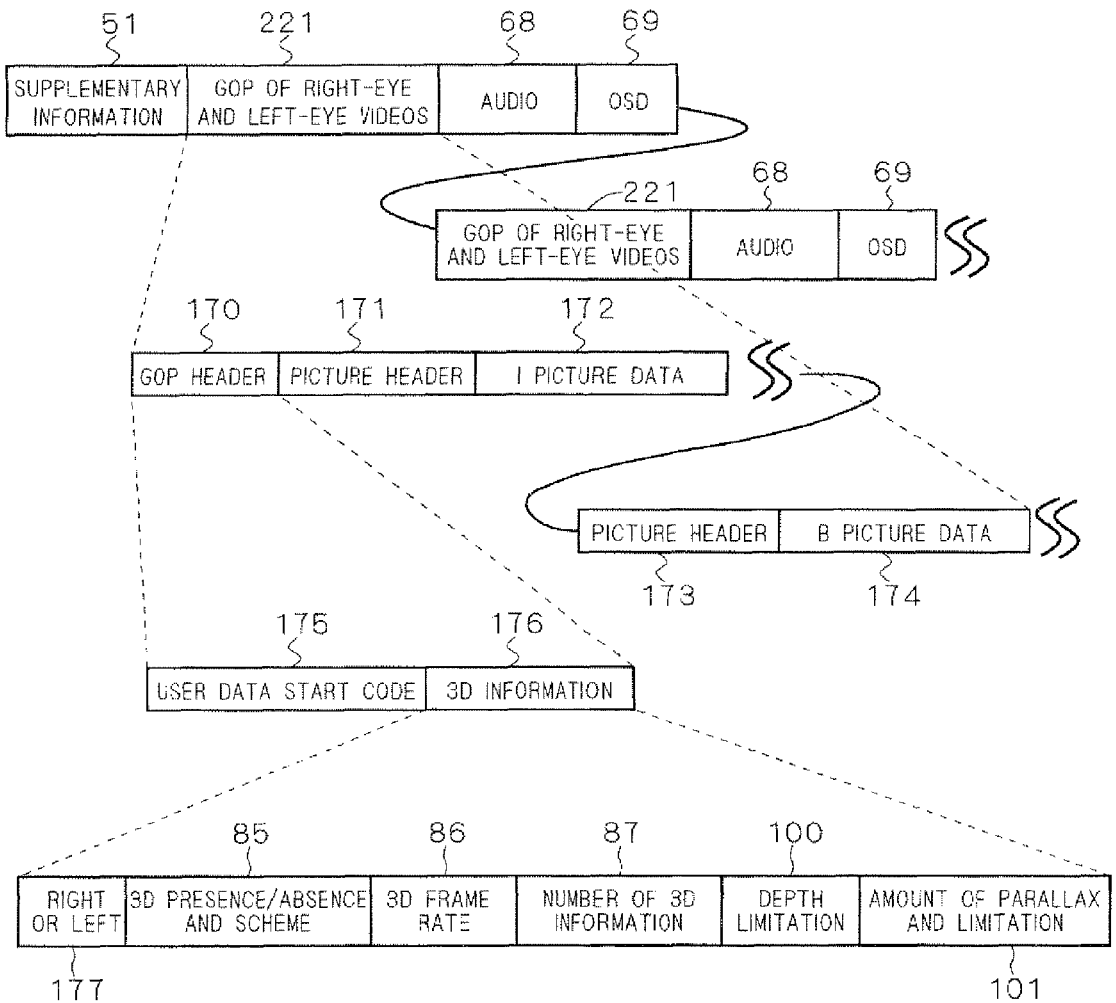
FIG. 34 is a diagram illustrating the structure of a video stream according to the third embodiment of the present invention.
Figure 35:
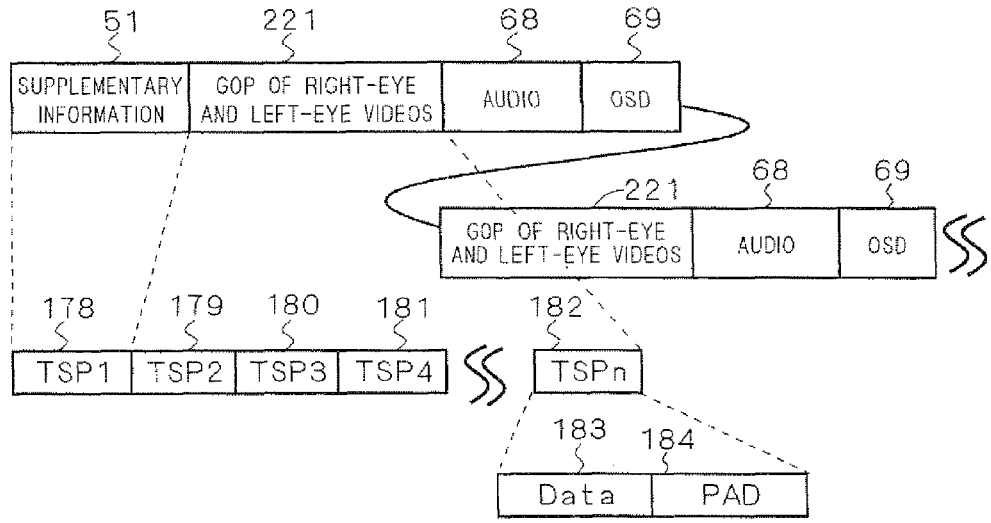
FIG. 35 is a diagram illustrating the structure of a video stream according to the third embodiment of the present invention.

It is also possible to more simply construct a video stream with stereoscopic images for the left eye and the right eye. For example, the stereoscopic video recording apparatus shown in FIG. 33 includes a synthesizing circuit 220 as a video constructing block for simply constructing a video stream. FIG. 34 illustrates the structure of a video stream by the stereoscopic video recording apparatus shown in FIG. 33, where a left-eye and right-eye GOP 221 forms a single GOP video information unit. FIG. 35 illustrates the structure at the transport packet level of the video stream by the stereoscopic video recording apparatus shown in FIG. 33.

Figure 33:
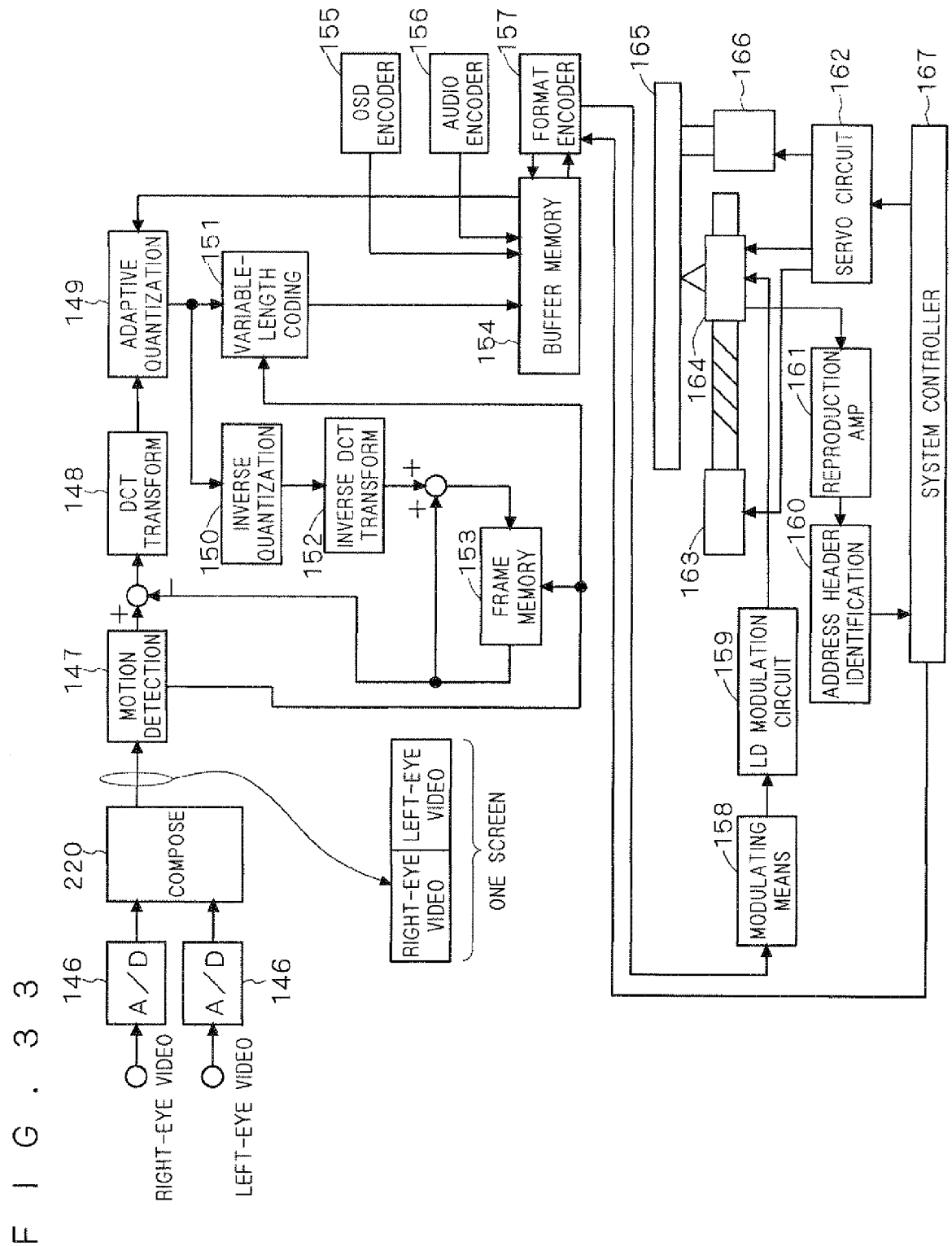
FIG. 33 is a block diagram of a stereoscopic video recording apparatus according to the third embodiment of the present invention.

Now, as shown in FIG. 33, the input parallactic images for the left eye and the right eye are once input to the synthesizing circuit 220, and inserted into one picture as two vertically-elongate images. In this process, the pixels of the images are not simply thinned in image lines, but are filtered and compressed in the horizontal direction, and then synthesized into a left-eye and right-eye picture. Thus, each picture is composed of two vertically-elongate images for the left eye and the right eye, and then formed into a stream by a common video compression scheme. In this case, too, in the video stream shown in FIG. 34, it is necessary that the supplementary information 51 or the 3D information region 176 in the GOP header 170 describe that the video information is compressed in the horizontal direction, so that it is not intactly reproduced in an ordinary TV. In the case of the video stream structure shown in FIG. 34, as in those shown in FIGS. 26 and 32, the padded data 184 for filling in information is attached to the last data 183 of the transport packet at the end of the GOP video information at the transport packet level. The invention has described stereoscopic video recording apparatuses and stereoscopic video recording methods for recording on an optical disk, but it is needless to say that entirely the same effects are obtained when a hard disk is used as a recording medium.

Fourth Embodiment

Figure 36:
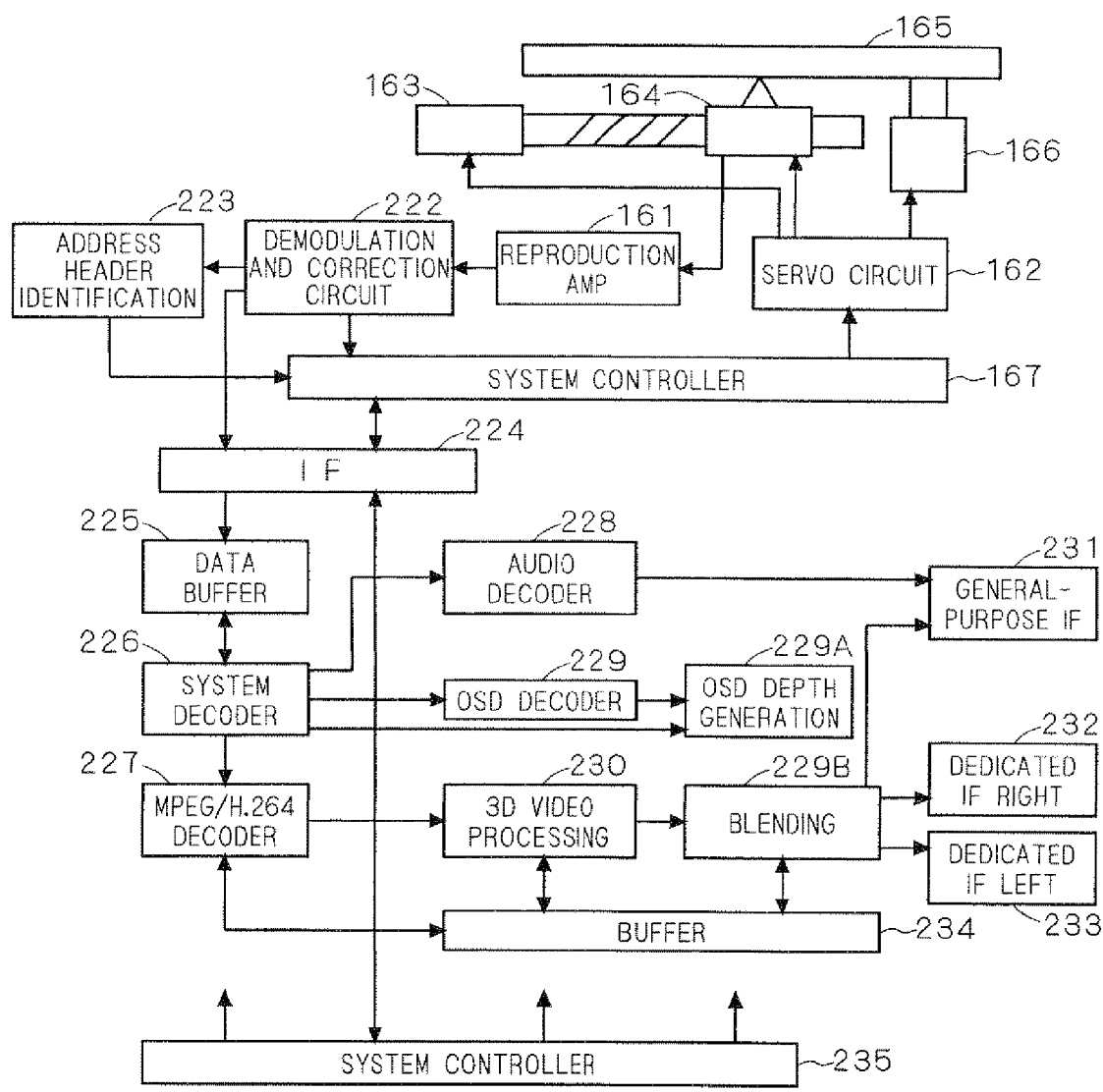
FIG. 36 is a block diagram of a stereoscopic video reproducing apparatus according to a fourth embodiment of the present invention.

Next, a fourth embodiment will be described referring the drawings. This embodiment describes stereoscopic video reproducing apparatuses, while the third embodiment has described stereoscopic video recording apparatuses. FIG. 36 is a block diagram of a stereoscopic video reproducing apparatus according to this embodiment. The stereoscopic video reproducing apparatus of FIG. 36 includes a demodulation and correction circuit 222, an address header identification circuit 223, an IF (interface) 224 for connecting the optical disk drive block and the back-end as a video audio processing block, and a data buffer 225 for once storing data from the optical disk drive block. The stereoscopic video reproducing apparatus of FIG. 36 also includes a system decoder 226 for separating streams of video data, audio data, etc., an MPEG H264 decoder 227 for decompressing compressed images, an audio decoder 228, an OSD decoder 229 for display of subtitles etc., and an OSD information depth generating circuit 229A. The stereoscopic video reproducing apparatus of FIG. 36 further includes a 3D video processing circuit 230, a blending circuit 229B for superimposing the OSD information on images, a general-purpose IF 231 for external connection, a dedicated right-eye IF 232, a dedicated left-eye IF 233, a buffer circuit 234, and a system controller 235 for the entire back-end.

FIG. 37 is a block diagram illustrating a block for decoding left-eye videos from stereoscopically compressed images, as described in the third embodiment. The apparatus shown in FIG. 37 includes a system decoder 236 for extracting parallax information and depth motion vector information from the video stream, an MPEG H264 decoder 237 for decoding a video stream compressed such as MPEG and H264, parallax information 238, motion vector information 239, a parallax information calculating circuit 240, and a left-eye video reproducing circuit 241. The parallax information 238, motion vector information 239, parallax information calculating circuit 240, and left-eye video reproducing circuit 241 form a 3D video processing circuit 230.

Now, in the stereoscopic video reproducing apparatus shown in FIG. 36, first, the demodulation and correction circuit 222 in the optical disk drive reproduces video audio data and supplementary data that are described on an optical disk 165. In this process, a servo circuit 162 operates such that the reproduction signal from the optical head 164 is continuously extracted with high quality, and the address header identification circuit 223 operates such that access can be instantaneously made to certain addresses. The data reproduced by the optical disk drive is once input to the data buffer circuit 225 through the IF circuit 224, and then input to the system decoder 226. The system decoder 226 separates the stream into video, audio, etc., and the audio information is input to the audio decoder 228, the OSD information is input to the OSD decoder 229, and the video information is input to the MPEG H264 decoder 227.

In the OSD depth generating circuit 229A, OSD information is generated as OSD information having depth, on the basis of supplementary information obtained from the system decoder 226. The video stream decoded in the MPEG H264 decoder 227 is processed as 3D video information in the 3D video processing circuit 230, and blended in the blending circuit 229B with the OSD images having depth, and it can be outputted from the general-purpose IF, such as HDMI, when the transfer rate is low, or the left-eye videos can be outputted from the dedicated left-eye IF 233 and the right-eye videos from the dedicated right-eye IF 232.

When images on one side are further compressed by using parallax information, as described in the third embodiment, the 3D video processing 230 of the stereoscopic video reproducing apparatus is configured as shown in FIG. 37. In FIG. 37, on the basis of the depth motion vector 239 and the parallax information 238 as compressed left-eye video information extracted by the system decoder 236, the parallax information calculating circuit 240 performs a parallax information calculation on a pixel-by-pixel basis or a macroblock-by-macroblock basis, so as to generate conversion coefficients for generating left-eye videos from right-eye videos. By using the conversion coefficients, the left-eye video reproducing circuit 241 reproduces left-eye videos on the basis of the right-eye videos generated by the MPEG H264 decoder. When the compressed left-eye videos are compressed only with parallax information, the processing only involves re-conversion based on the output of the parallax information calculating circuit 240. On the other hand, in the case of compressed information subjected to DCT transform and adaptive quantization in a manner as described with the stereoscopic video recording apparatus of FIG. 33, it is necessary to provide inverse quantization and inverse transform circuits in the left-eye video reproducing circuit 241.

Figure 38A:
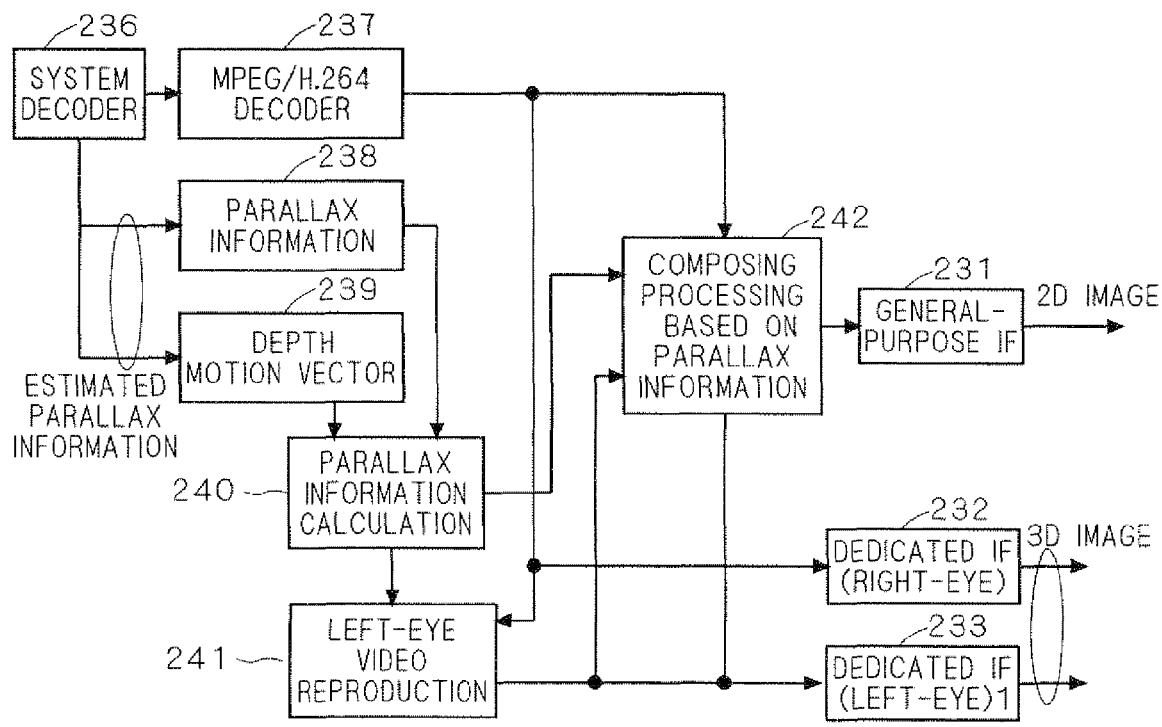
FIGS. 38A and 38B are diagrams illustrating a stereoscopic video reproducing apparatus according to the fourth embodiment of the present invention.
Figure 38B:
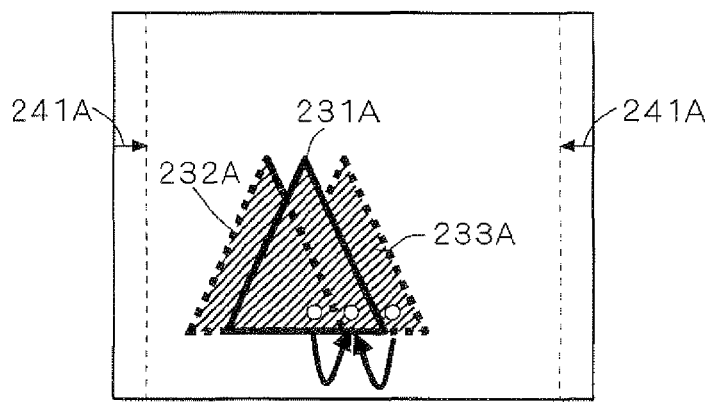

Next, a stereoscopic reproducing apparatus will be described which reproduces 2D images, not stereoscopic, from left-eye and right-eye stereoscopic images. FIG. 38A is a block diagram of the stereoscopic reproducing apparatus for reproducing 2D images. The apparatus of FIG. 38A includes a synthesizing circuit 242 based on parallax information. FIG. 38B is a diagram schematically illustrating an image constructed by the synthesizing circuit 242, where a left-eye video 232A and a right-eye video 233A are synthesized into a 2D image 231A. Now, common display apparatuses, such as TVs, are not always 3D-compatible, or they are more often 2D-compatible. Accordingly, it is desired that a medium that records only 3D images can be reproduced also two-dimensionally. The simplest method for this purpose is to reproduce 2D images by displaying right-eye videos or left-eye videos only. For example, when a TV is ready only for 2D, it is automatically detected in the link connection processing between the player and the TV, and the images on one side are continuously reproduced.

However, this method is problematic because an image having a depth close to the eyes (an image that appears protruding) involves a large amount of parallax, and then the position is shifted to the left or right as shown by the left-eye video 232A or the right-eye video 233A shown in FIG. 38B. Accordingly, it is possible to reproduce a natural 2D image by synthesizing left-eye and right-eye videos by using parallax information and reproducing an image in the middle position as shown by the 2D image 231A. However, the areas near both ends of the screen cannot be calculated when the parallax is large, and the areas 241A of the image (both ends of the screen) will be "cut", unless the original image is filmed such that the left-eye video is wide to the left and the right-eye video is wide to the right.

Figure 39A:
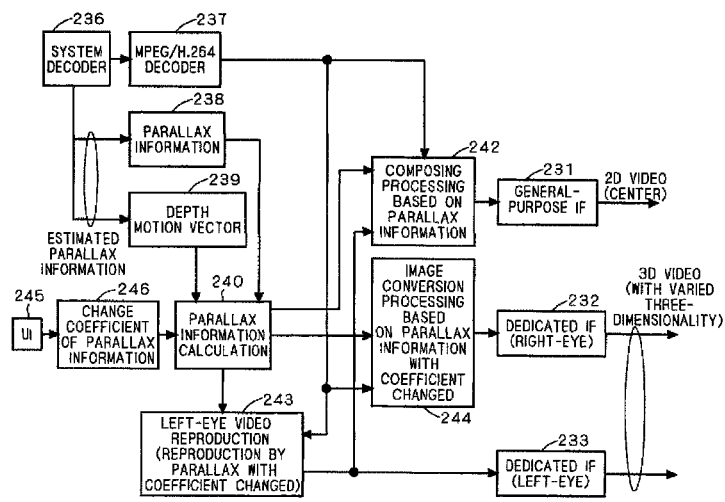
FIGS. 39A to 39D are diagrams illustrating a stereoscopic video reproducing apparatus according to the fourth embodiment of the present invention.
Figure 39B:
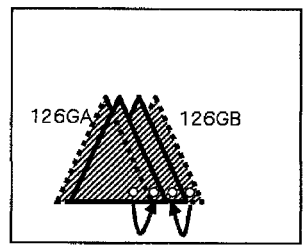
Figure 39C:
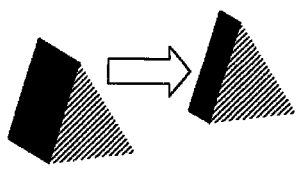
Figure 39D:
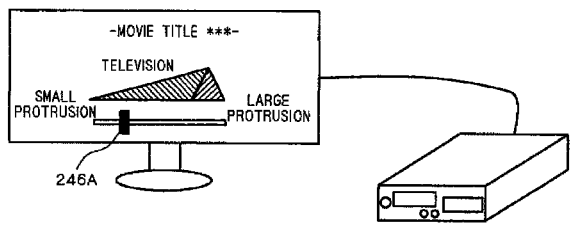

Furthermore, a large amount of protrusion (a high degree of three-dimensionality) might cause increased eye fatigue or an increased "surprising" impression as described in the second embodiment. To prevent this, FIG. 39A shows a block diagram of a stereoscopic video reproducing apparatus that is capable of varying the amount of protrusion. The apparatus of FIG. 39A includes a left-eye video reproducing circuit 243 using coefficient-varied parallax, a right-eye video converting circuit 244 using coefficient-varied parallax, a user interface 245 for the varying of the amount of protrusion, and a parallax information coefficient varying portion 246. FIG. 39B is a diagram illustrating the variation of the amount of protrusion by the stereoscopic video reproducing apparatus. Also, FIG. 39C is a diagram illustrating the effect obtained by varying the amount of protrusion by the circuits of FIG. 39A. FIG. 39D illustrates an OSD bar 246A for varying the amount of protrusion, which is displayed on a display apparatus connected to the stereoscopic video reproducing apparatus.

In a scheme in which images on one side are compressed with parallax information, as described with the stereoscopic video recording apparatus of FIG. 29, parallax information that is directly related to the amount of protrusion is linked on a pixel-by-pixel basis or a macroblock-by-macroblock basis. Accordingly, when an instruction for varying the amount of protrusion is given from the user, the instruction is input to the user interface 245 by using the OSD display of the OSD bar 246A on the TV screen as shown in FIG. 39D, for example. Then, the parallax information coefficient varying portion 246 determines a conversion coefficient to determine to what degree the amount of protrusion should be attenuated. This conversion coefficient determines the amount of the parallax calculation in the parallax information calculating circuit 240. Then, the left-eye videos are reproduced by the left-eye video reproducing circuit 243 on the basis of the coefficient-varied parallax, and the right-eye videos are converted by the image converting circuit 244 on the basis of the coefficient-varied parallax information, whereby the amount of parallax between the left-eye videos and right-eye videos is converted to be smaller in such a manner that, as shown in FIG. 39B, the left-eye video 126GA and the right-eye video 126GB are converted from the broken lines to the solid lines. As a result, the stereoscopic images obtained from the outputs of the dedicated IFs 232 and 233 are reproduced with a reduced amount of protrusion as shown by the stereoscopic triangular object of FIG. 39C.

Figure 40:
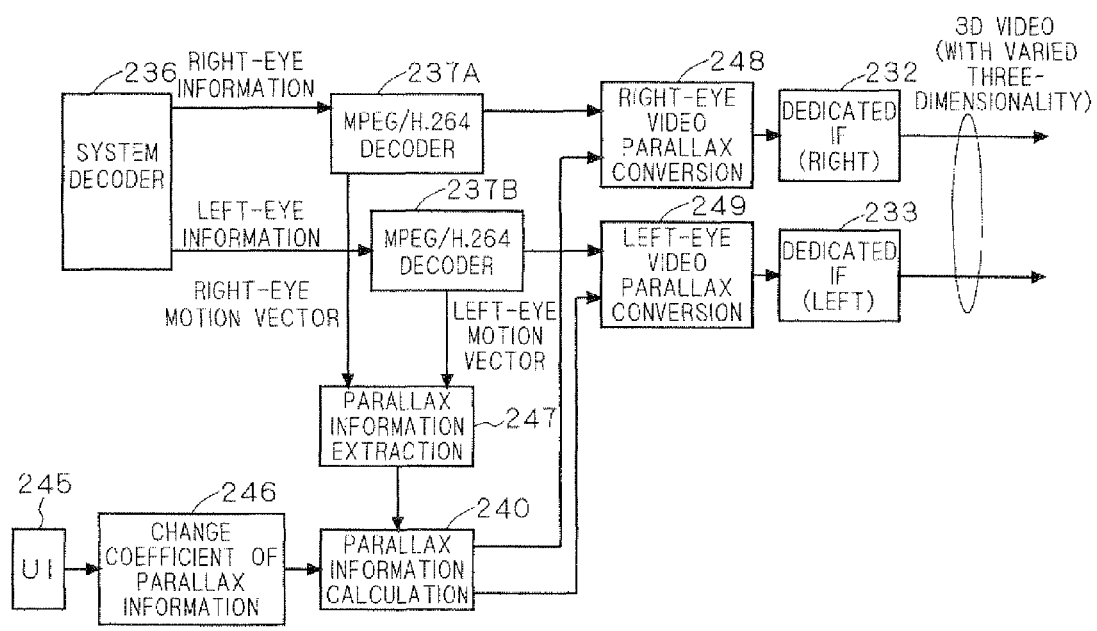
FIG. 40 is a diagram illustrating a stereoscopic video reproducing apparatus according to the fourth embodiment of the present invention.

The stereoscopic video reproducing apparatus of FIG. 39A converts the amount of protrusion by using parallax information, when the parallax information is recorded on the video stream. However, parallax information may be absent. Accordingly, the stereoscopic video reproducing apparatus shown in FIG. 40 is configured so that the amount of protrusion can be controlled even when parallax information is not recorded in the video stream. The stereoscopic video reproducing apparatus of FIG. 40 includes MPEG H264 decoders 237A and 237B respectively for left-eye videos and right-eye videos, a parallax information extracting portion 247, a right-eye video parallax converting portion 248, and a left-eye video parallax converting portion 249. In the stereoscopic video reproducing apparatus shown in FIG. 40, the parallax information extracting portion 247 newly detects parallax information from the decoded left-eye and right-eye videos. In this case, as in the apparatus of FIG. 39A, new parallax information is generated in the parallax information calculating portion 240, through the processing in the user interface 245 and the parallax information coefficient varying portion 246, and it is supplied to the right-eye video parallax converting portion 248 and the left-eye video parallax converting portion 249.

This embodiment has described apparatuses and methods for reproducing stereoscopic video information recorded on an optical disk, but it is needless to say that entirely the same effects are obtained when a hard disk is used as a recording medium.

Fifth Embodiment

In the fifth embodiment, when flat video and stereoscopic video of the above first to fourth embodiments are present in a mixed manner, audio for viewing flat image and audio for viewing stereoscopic image are also arranged separately, so that the viewer can see more realistic video and can listen to more realistic audio. In the below explanation, a detailed description about the flat video and the stereoscopic video is omitted. However, they can be embodied by combining the embodiments of the flat video and the stereoscopic video according to the first to fourth embodiments.

FIG. 41 schematically shows a system for listening to pseudo 5.1 ch surround audio. FIG. 41 shows a sound source 250 actually recorded in a studio, a virtual person 251 to which sound from the sound source 250 is transmitted during recording in the studio, a tympanum section 252 which is a microphone used during recording in the studio and is arranged on the virtual person, a transfer function 253 from the sound source used during recording in the studio to the tympanum section arranged on the virtual person, a disk 254 recording an audio signal recorded in the studio, an inverse system 255 for performing surround reproduction of the recorded audio signal, a speaker 256 in an audio reproducing room, and a user 257 who is listening to the sound.

Figure 42:
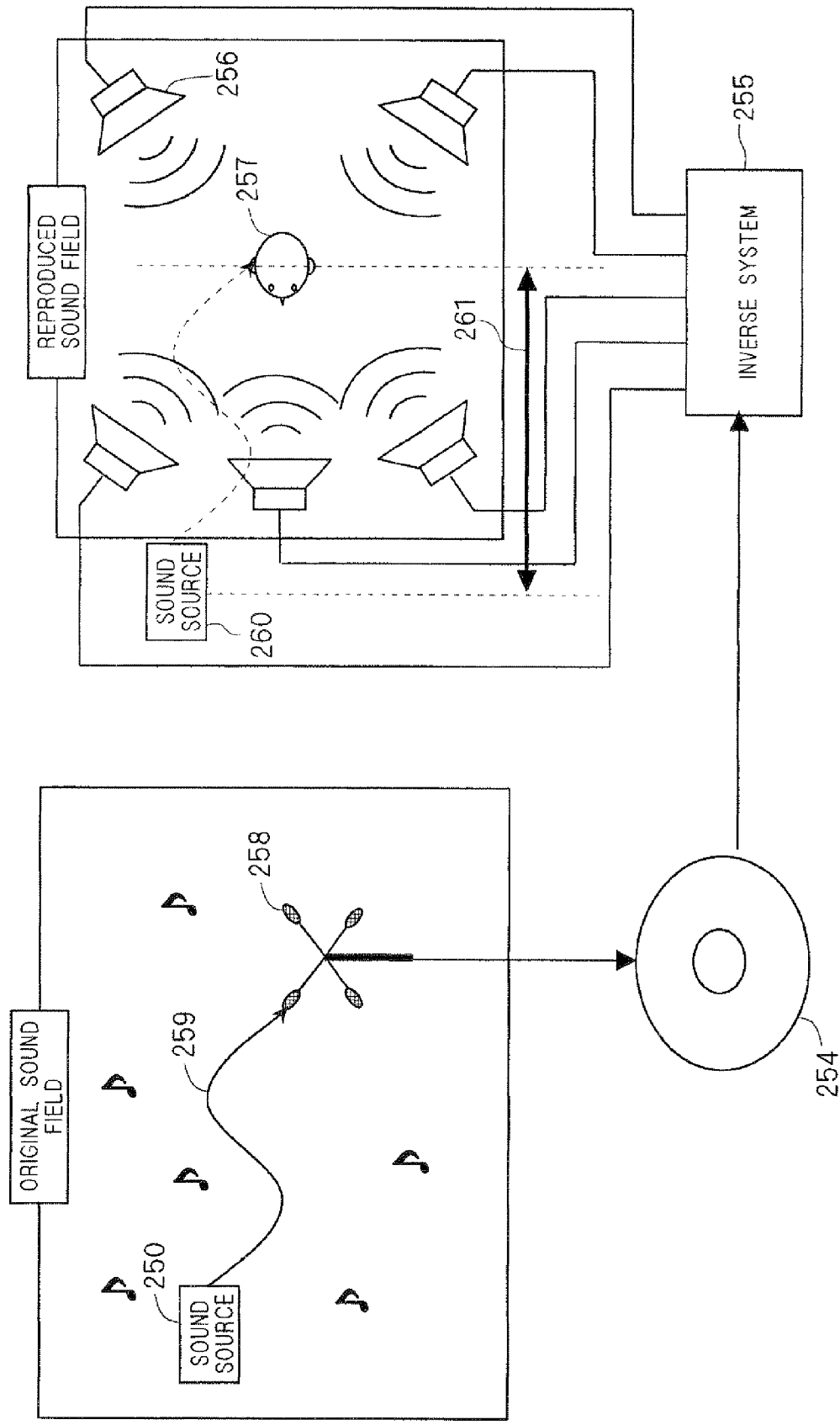
FIG. 42 is a diagram for illustrating the principle of virtual surround according to the fifth embodiment of the present invention.

FIG. 42 schematically shows a system for allowing full-scale listening of 5.1 ch surround audio. FIG. 42 shows the sound source 250 actually recorded in a studio, a surround microphone 258 used during recording in the studio, a transfer function 259 from the sound source used during recording in the studio to the virtual microphone, the disk 254 recording an audio signal recorded in the studio, the inverse system 255 for performing surround reproduction of the recorded audio signal, the speaker 256 in the audio reproducing room, the user 257 who is listening to the sound, a virtual sound source 260 for reproducing a reproduced sound field, and a sound source position 261 in a depth direction.

Figure 43:
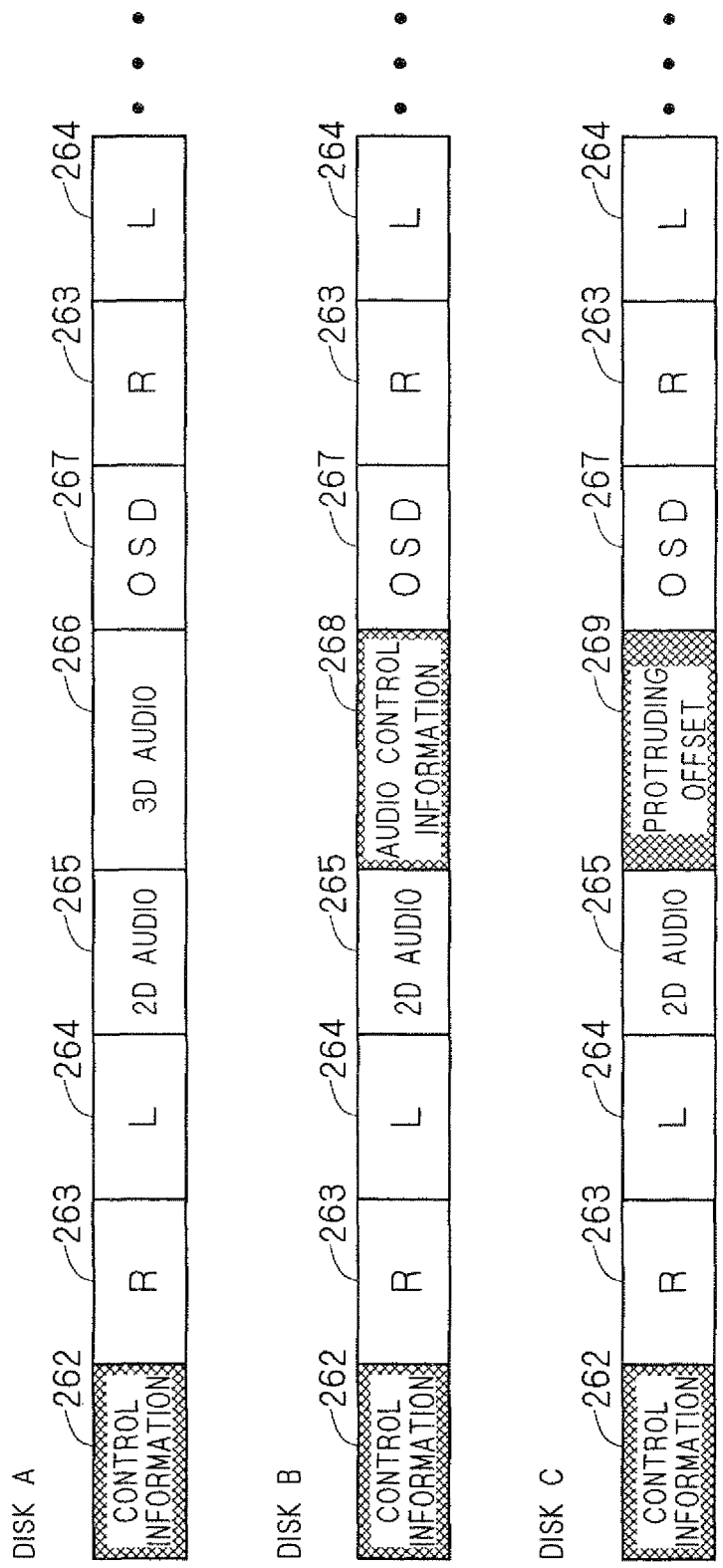
FIG. 43 is a diagram for illustrating a data structure in a disk according to the fifth embodiment and a sixth embodiment of the present invention.

FIG. 43 shows a signal format used in a disk storing stereoscopic video and audio or in a network distribution and the like of stereoscopic video and audio information. A disk A shows a signal format previously arranged with audio information storage area for three-dimensional video, which is arranged separately from ordinary audio information for two-dimensional video.

FIG. 43 shows control information 262 about, e.g., video and sound, right-eye videos 263, left-eye videos 264, an audio information area 265 for two-dimensional reproduction, an audio information area 266 for three-dimensional reproduction, and an OSD information area 267.

Figure 44:
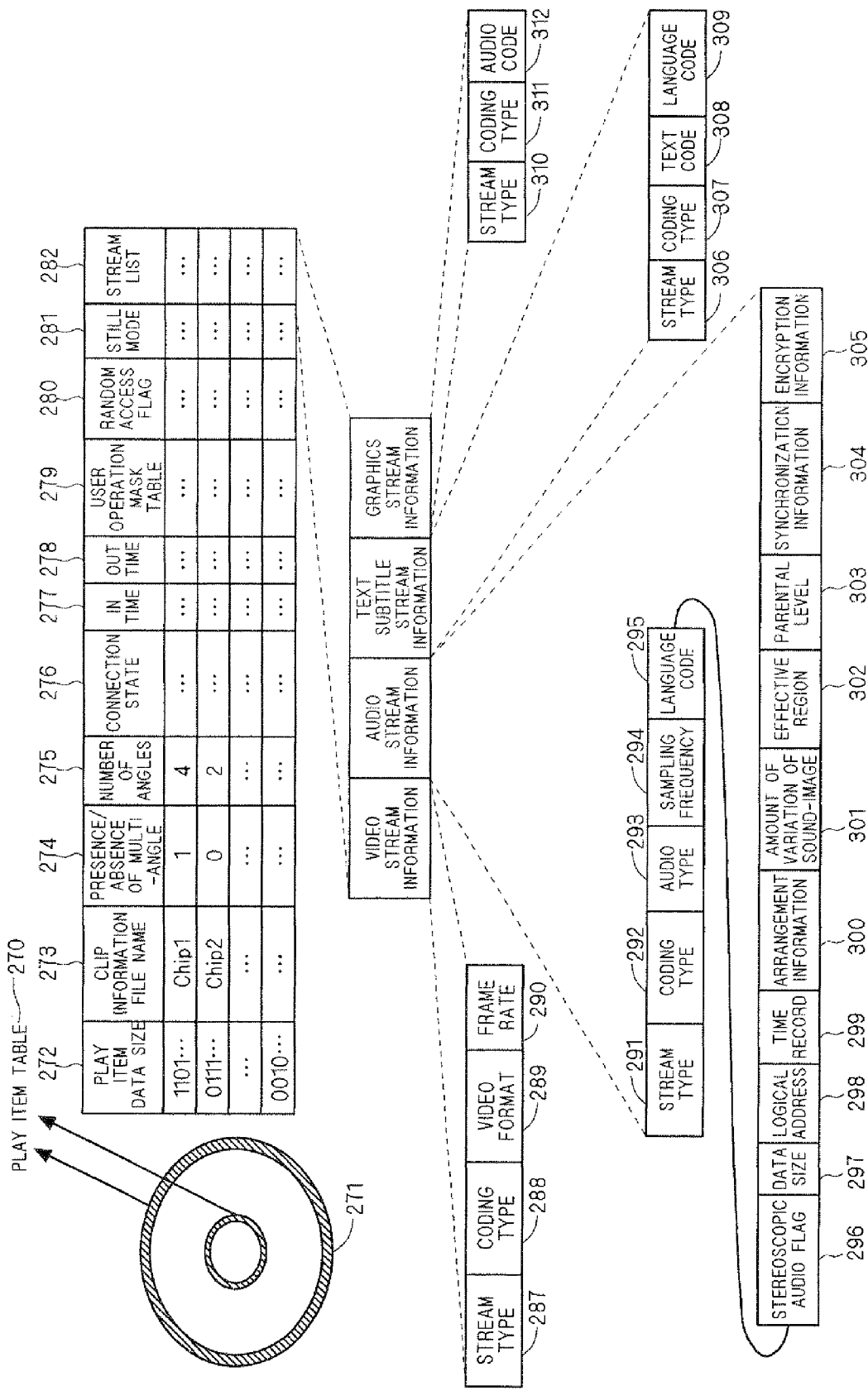
FIG. 44 is a diagram for illustrating the structure of a play item table according to the fifth embodiment of the present invention.

FIG. 44 shows an area for storing the control information about video and audio and a video and audio data table in the control information on a disk storing stereoscopic video and audio. FIG. 44 shows a play item table 270 describing the control information about video and audio, a disk 271, a play item data size 272, a file name 273 of clip information for managing information about streams of, e.g., video and audio, presence/absence of multi-angle 274, the number of angles 275, a connection state 276 between an IN time of a current play item and an OUT time of a previous play item, an IN time 277 serving as the starting time of the current play item, an OUT time 278 serving as the end time of the current play item, a user operation master table 279 representing restriction state of user operation, a random access flag 280 representing restriction state of random access performed by user operation, a still mode 281 representing whether still display is to be executed or not, a stream list 282, video stream information 283 serving as information in the stream list 282, an audio stream information 284, text subtitle stream information 285, graphic stream information 286, a stream type of video stream 287 serving as information in the video stream information 283, a coding type of the video stream 288, a video format of video stream 289, a frame rate of video stream 290, a stream type of audio stream 291 serving as information in the audio stream information 284, a coding type of audio stream 292, an audio type of audio stream 293, a sampling frequency of audio stream 294, a language code of audio stream 295, a stereoscopic audio flag 296 indicating audio information only for stereoscopic viewing, a file size of audio information 297, a logical address 298, a time record 299 representing reproduction time information, arrangement information 300 about arrangement on a medium, an information description section 301 about the magnitude of the amount of sound-image variation in the stereoscopic direction, a region code 302 indicating whether reproduction is allowed or not, a parental level 303, synchronization information 304 with a corresponding video, encryption information 305, a stream type of text subtitle stream 306 serving as information in the text subtitle stream information 285, a coding type of text subtitle stream 307, a text code of text subtitle stream 308, a language code of text subtitle stream 309, a stream type of graphics stream 310 serving as information in the graphics stream information 286, a coding type of graphics stream 311, and a language code of graphics stream 312.

Figure 45:
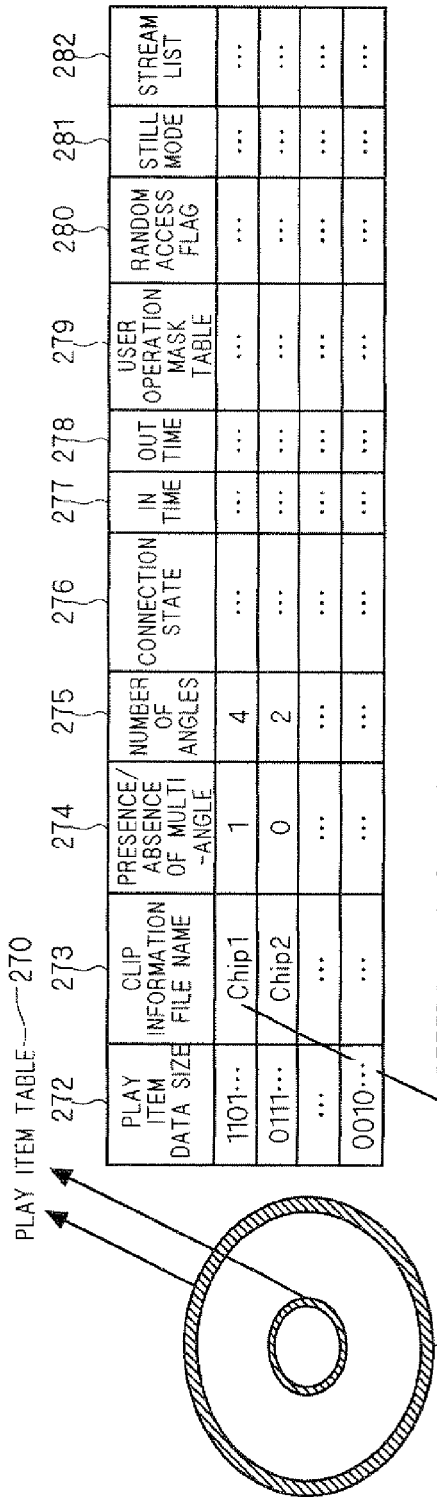
FIG. 45 is a diagram for illustrating the structure of a clip information file according to the fifth embodiment of the present invention.

FIG. 45 shows an area for storing the control information about video and audio and a video and audio data table in the control information on a disk storing stereoscopic video and audio. FIG. 45 shows the play item table 270 describing the control information about video and audio, a clip information file 313 referenced based on the file name 273 of clip information for managing information about streams of, e.g., video and audio, in the play item table 270, a clip information data size 314, a clip stream type 315 indicating a type of stream information related to the clip information file, a type 316 of an application using the clip information, a data rate 317 of the transport stream of a stream related to the clip information, the number of packets 318 in the stream related to the clip information, and a transport stream type 319 of the stream related to the clip information file.

Now, FIG. 41 shows the principle of virtual surround. In FIG. 41, a sound wave from the sound source 250 passes through a space in a room and an ear hole, i.e., a structure of the head of a human, and reaches the tympanum. Now, a transfer function 253 of the sound signal from the sound source to the tympanum is defined, and the recorded audio information is multiplied by this inverse characteristic, so that during actual listening, the user can experience realistic sensation as if the user is listening to the audio during recording. This kind of method is called transaural system, and in a case of headphones, it is called binaural system. In this case, however, the realistic sensation is reduced when the listening position is different from the recording position or the transfer function of the space of recording is different from the transfer function of the space of reproduction. On the other hand, surround audio is reproduced using a plurality of microphones in FIG. 42. In FIG. 42, for example, the same sound field used during recording can be reproduced in the same region as the region constituted by the microphone. For example, the microphone has the same structure as that of the surround microphone 258. In the example of FIG. 42, four channels of audio are recorded. In this case, the sound field can also be reproduced in the same manner by defining the transfer function 259 of the boundary region in the recording space during recording and multiplying the recorded audio information by this inverse characteristic. In the example of FIG. 42, however, a wider range can be reproduced.

In the present invention, for example, it is assumed that a screen or a TV is arranged in front of the viewer, and the user views the stereoscopic video. Accordingly, in the case of the stereoscopic video, the images also moves in the depth direction and the protruding direction, so that a high degree of realistic sensation is provided to the viewer. However, in many cases, the visual expression in the depth direction and the protruding direction is different between the conventional two-dimensional image and the three-dimensional image. Even when the producer intentionally emphasizing the protruding sensation by moving a central character and objects in the depth direction and the protruding direction, and even when a visual expression such as a zoom-up technique for an ordinary two-dimensional image is used to get closer to the viewer, it is needless to say that the user feels that the amount of movement in the depth direction and the protruding direction is emphasized in the stereoscopic video. Therefore, when see from the user, the user feels that the moving sensation in the depth direction and the protruding direction is different between 2D video and 3D video. In the current audio recording, however, although the realistic sensation is improved by making use of surround processing, the stereoscopic sense that the viewer sensuously feels in the two-dimensional video is merely represented as sound-image in the depth direction and the protruding direction, and the current audio recording is not made according to the sensation arising in viewing the three-dimensional image In view of these circumstances, in the present invention, not only surround audio for viewing flat video but also new surround audio for 3D is prepared during recording, and this is added to the stereoscopic video format, so that realistic audio reproduction is performed when viewing stereoscopic video. More specifically, surround audio extraction means for viewing flat video and surround audio extraction means for viewing stereoscopic video are respectively arranged, so that surround audio information during stereoscopic video reproduction includes both of surround audio for viewing flat video and surround audio for viewing stereoscopic video, and any one of them can be selected and reproduced.

Further, video and audio maybe arranged in the video and audio signal format on the disk A as shown in FIG. 43. When the two-dimensional video is seen, the arrangement information 300 written in the control information 262 on disk A of FIG. 43 or the play item table 270 of FIG. 44 is read, or the arrangement information 300 written in the clip information file of FIG. 45 is read, so that only the two-dimensional video and audio are reproduced, and the section for 3D is skipped. Therefore, the memory load can be reduced during reproduction. Alternatively, in a case where the memory has some free space, audio information having a relatively small amount of data may be all read, and only the two-dimensional section may be extracted and decoded. On the other hand, when the three-dimensional video is viewed, both of the right-eye video and the left-eye video are read, and only the audio information for 3D is extracted and decoded, so that a more realistic reproduction can be achieved. The memory load during reproduction can be reduced by skipping the 2D section at this occasion. However, when the memory has some free space, the audio information may be all read because it has a relatively small amount of data, and only the two-dimensional section may be extracted and decoded. In this example, the control information and the supplementary information are arranged that are suitable for the case where audio information for stereoscopic video is prepared. However, when only the same audio as that for conventional flat video is prepared, the audio information has the same content as that of the second embodiment. It should be noted that the details have already been explained in the previous embodiments and are therefore omitted.

Further, when the flag 296 indicating audio information for viewing stereoscopic images is written to the play item table 270 of FIG. 44, the clip information file 313 of FIG. 45, or the control information area 262 of FIG. 43, a decoder can know whether this data include audio data for stereoscopic video, and can perform necessary selection and extraction processing with the arrangement information 300 on a medium. When a file size 297 of the audio information for stereoscopic viewing is written, the memory area is allocated in advance. When reproduction time information 299 is written, the following is enabled: the reproduction time can be confirmed; a time search is enabled (skip and rewind according to time); and times of video and audio can be synchronized with the synchronization information 304 with video. When the type 292 of audio compression format is written, decode processing performed on the apparatus side can be switched. When the region code 302 indicating whether reproduction is allowed or not is written, this stereoscopic audio reproduction is prohibited in a region where this stereoscopic audio viewing is not licensed, and viewing is enabled upon switching the reproduction to a normal two-dimensional reproduction. When only the same audio as that for conventional flat video is prepared, the audio information has the same content as that of the second embodiment.

Still further, there is also a method for storing the above supplementary information as a file in a reproduction list format as data about the reproduction time information actually handled by the user, and further separately arranging an information table in units of GOP or in units of integral multiples of GOP for converting time information into address information in order to identify an address position of a file storing on an actual medium. In this case, user's operation includes firstly accessing the above reproduction list of time information and accessing again the information table in units of GOP or in units of integral multiples of GOP from this reproduction list, thus being able to obtain an address on an actual medium and retrieve desired data from the medium.

When stereoscopic video and audio are provided as a storage medium such as an optical disk, information about stereoscopic audio data can be written in the control information area in a particular region of the disk as shown in FIG. 44. In contrast, when stereoscopic video and audio are distributed and viewed as a service such as network distribution and a broadcast program such as terrestrial digital broadcast, the above supplementary information needs to be put into the video data if possible. In this case, the stereoscopic audio flag 296 indicating audio information only for stereoscopic viewing, the file size 297 of audio information only for stereoscopic viewing, the reproduction time information 299, the type of audio compression format 292, the arrangement information 300 about arrangement on the medium, the synchronization information 304 with the corresponding video, the region code 302 indicating whether reproduction is allowed or not, and the like are distributed upon being written in units of GOP or in units of integral multiples of GOP to the region written in the section of the control information area 262 of FIG. 43 or a new file region, i.e., another information recording region.

In the above-described case, the 3D audio signal is arranged separately from the 2D audio signal. However, when the sound-image in which the depth direction and the protruding direction are emphasized is arranged for 3D, second audio data for 3D viewing may also be stored as a file. The second audio data for 3D viewing includes somewhat less amount of variation of this image in the depth direction and the protruding direction with respect to the viewer and a somewhat less speed thereof. In other words, the surround audio for stereoscopic viewing includes a plurality of pieces of audio data for 3D viewing including somewhat less amount of variation in the depth direction and the protruding direction with respect to the viewer and a somewhat less speed thereof. In a case of stereoscopic video and audio viewing, when the variation in the depth direction and the protruding direction is excessively too large, and the stereoscopic video is too realistic, there is a possibility to damage the health of children and elderly people as described in the case of the stereoscopic video according to the first embodiment. Therefore, these people should be provided with audio in which the variation, the speed, and the acceleration is small in the depth direction and the protruding direction and the speed and the acceleration is small and the variation is gentle.

Further, it is possible to set stepwise the variation in the depth direction and the protruding direction and the degree of emphasis on realistic sensations such as the speed and the acceleration, namely, it is possible to write third and fourth files serving as recording regions for a plurality of surround audios for stereoscopic viewing in which the degree of variation of sound-image localization with respect to the viewer is different, in addition to the recording region for the surround audio for viewing flat video, so that a parental level, according to which viewing is allowed only when the user makes a selection and inputs a password during viewing, may be written and set in order to secure viewing safety when the user listens to the surround audio. The parental level may be recorded in the supplementary information region.

For example, this parental level may be set separately for video and audio. However, it is desirable to combine this parental level with the parental level setting for stereoscopic viewing of stereoscopic video of the video described in the first embodiment, and set this parental level from the one having the excessively highest realistic sensation of video and audio and stereoscopic video. The total parental level setting including video and audio may be set as follows. For example, it is assumed that the parental level of video and audio is represented in three levels, i.e., large, middle, and small. When any one of video and audio includes large, the total parental level is large. When any one of video and audio or the largest one of video and audio is middle, the total parental level is middle. When all of video and audio are small, the total parental level is small. In this manner, the total parental levels are all set to safer sides, and therefore, the influence exerted on human body can be reduced to the minimum. In other words, the total parental level is set as the parental level for the entire video and audio when this content is selected.

Sixth Embodiment

Subsequently, the improvement of audio realistic sensation when dedicated audio for stereoscopic viewing is not prepared in advance will be described. As stated in the fifth embodiment, the embodiments can also be carried out in combination with the first to fourth embodiments.

Figure 46:
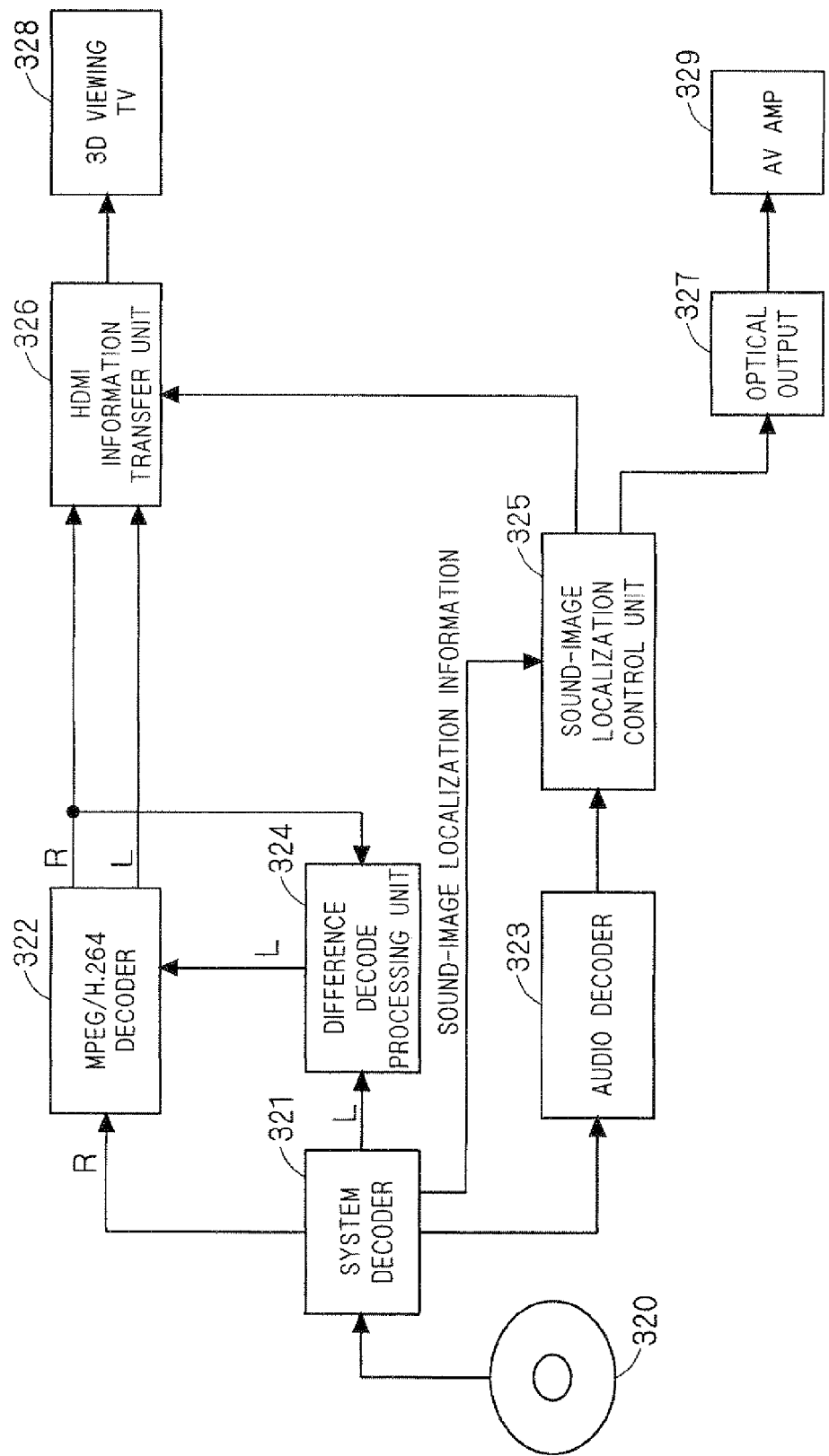
FIG. 46 is a block diagram for illustrating a stereoscopic video and audio reproducing apparatus according to the sixth embodiment of the present invention.

A disk B of FIG. 43 previously defines information about a position at which stereoscopic sound-image localization is to be brought with respect to the depth direction and the protruding direction of the object of audio generating source and the portion of the face of the person included in the video signal. Numeral 268 on the disk B of FIG. 43 is depth direction sound-image localization information. FIG. 46 is a depth sound-image localization variation unit (a circuit for varying a sound source generating position in the depth direction or the protruding direction when the screen is viewed from the viewer) for varying depth direction sound-image localization in the surround audio processing based on the above depth direction sound-image localization information The disk B of FIG. 43 is a video and audio signal format having the depth direction sound-image localization information 268. A disk C of FIG. 43 is a video and audio signal format having arrangement information 269 in the depth direction and the protruding direction of OSD.

The disk B of FIG. 43 includes ordinary 2D video viewing audio information attached with depth direction sound-image supplementary information. The disk B of FIG. 43 has a 2D reproduction audio information area 265 and a depth direction sound-image supplementary information 268. The disk C of FIG. 43 is for three-dimensional display with OSD information having an offset amount in the depth direction. The disk C of FIG. 43 includes an OSD information area 267 and an OSD information depth direction offset amount 269.

Figure 47:
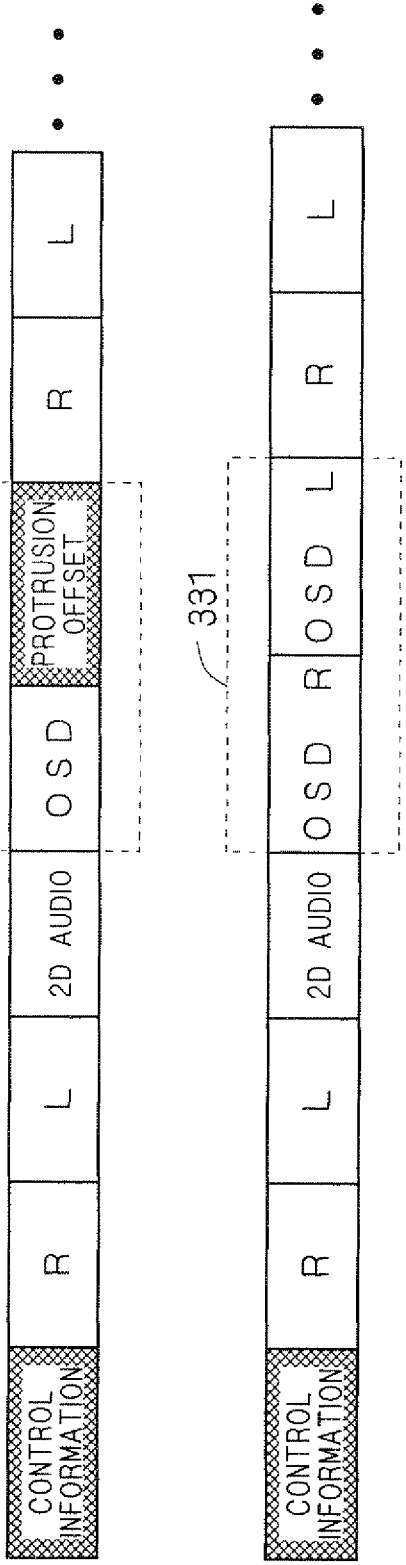
FIG. 47 is a diagram for illustrating the stereoscopic representation of OSD according to the sixth embodiment of the present invention.
Figure 48:
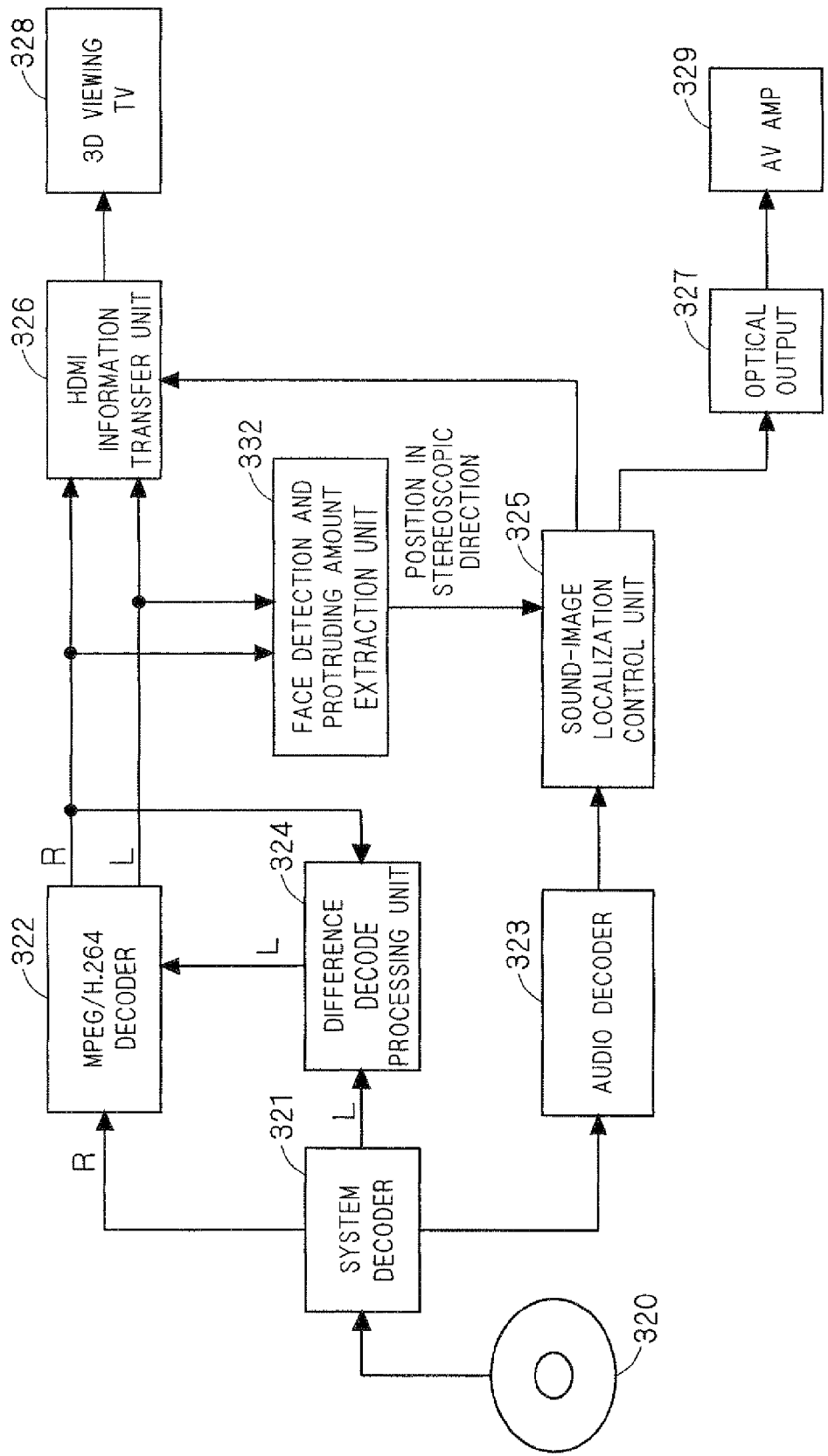
FIG. 48 is a block diagram for illustrating the stereoscopic video and audio reproducing apparatus according to the sixth embodiment of the present invention.

FIG. 47 shows a method for stereoscopic representation of OSD information. FIG. 48 shows a method 330 for writing the amount of offset in the depth direction with respect to reference OSD information and a method for adopting the OSD information itself as stereoscopic data 331.

In normal stereoscopic movies and the like, arranging a new audio exclusively for 3D increases the burden placed on content producers. Therefore, it is considered that the viewer sees 3D video while listening to the normal 2D reproduction audio signal in many cases except special cases. However, it has been desired to achieve a method allowing the viewer to enjoy highly realistic audio while reducing the burden placed on content producers, because in 5.1 ch surround and 7.1 ch surround audios, there are speakers on the back of the viewer as described in FIG. 41 and the depth direction sound-image localization can be more clearly changed.

Now, the section of the numeral 268 in the video signal format on the disk B of FIG. 43 includes only the depth direction sound-image localization information, which includes a relative amount representing how much the depth direction sound-image localization should be changed from the original 2D viewing audio information or absolute positional information of the depth direction sound-image localization in the viewing space. Accordingly, a depth sound-image localization varying unit 325 of FIG. 46 changes the depth sound-image localization.

In this case, a content producer creates only a difference representing how much the depth sound-image localization of the already produced 2D audio information should be varied during 3D viewing. This is because it is sufficient to define, based on this result, the relative amount representing how much the depth direction sound-image localization should be changed from the original 2D viewing audio information or the absolute positional information of the depth direction sound-image localization in the viewing space. In this case, it is needless to say that new recording operation for stereoscopic viewing is not necessary.

In this case, not only the forward and backward sound-image localization is changed with respect to the screen adjusted for the stereoscopic video, but also information for giving right/left and upward/downward sound-image localization variation and the magnitude thereof are described as supplementary information if it is required in terms of content producer's video and audio expressions, so that supplementary information extraction means and sound-image localization variation means vary the sound-image localization of surround audio, based on which the sound-image localization can be varied in all directions. Further, in the actual signal processing performed in the player, sound-image localization is varied by, for example, a DSP (digital signal processor) performing surround processing on the basis of sound-image localization variation previously written on a medium, but during the sound-image localization is varied, the amount of variation of sound-image variation can be emphasized or reduced by performing operation by multiplying the amount of variation of sound-image variation by a predetermined coefficient of sound-image localization variation information recorded in a medium in advance.

In this case, for example, when processing for reducing the amount of variation of sound-image localization is performed, the signal processing circuit can alleviate the situation in which the realistic sensation set by the above parental level is too strong, so that, for example, children and elderly people can view and listen to video. In other words, the parental level setting is changed by varying the amount of protrusion of video and the magnitude of sound-image localization of audio, so that the sound-image localization appropriately for the viewer can be achieved.

Further, when the user listens to previously recorded audio information for viewing stereoscopic video or audio information for viewing stereoscopic video on the basis of the supplementary information for varying the sound-image localization, the most dangerous level of either of the parental level setting information in the audio and video information and the parental level setting information of the stereoscopic video can be adopted as the parental level for the entire video and audio at the time of selection of this content, and viewing restriction appropriate for the above viewers can be placed according to the thus adopted parental level. When the audio information for viewing stereoscopic video based on the supplementary information for varying the sound-image localization is recorded again, the parental level setting can be changed at the same time as the recording of the audio information in which the amount of variation of the sound-image localization is increased or reduced.

Still further, when this is combined with the signal processing circuit for varying the amount of protrusion of stereoscopic video described in the fourth embodiment, and the viewing safety can be improved in both of video and audio by varying the realistic sensations of both video and audio. Depending on cases, realistic sensation may be emphasized for viewing.

In FIG. 46, for example, a 3D video signal input from an optical disk 320 is separated by a system decoder 321 into a video signal, an audio signal, and sound-image localization information. The right-eye video of the video signal is output to an MPEG/H.264 decoder 322. The left-eye video of the video signal is output to a difference decode processing unit 324. The audio signal is output to an audio decoder 323. The sound-image localization information is output to a sound-image localization control unit 325. The right-eye video serving as reference is decompressed by the MPEG/H.264 decoder 322. The left-eye video is made of difference information from the right-eye video, and therefore, the left-eye video is reproduced by the MPEG/H.264 decoder 322 on the basis of the signal decompressed by the difference decode processing unit 324. Therefore, as described in the first to fourth embodiments, the video information of the right-eye video of the stereoscopic video and the video information of the left-eye video of the stereoscopic video are arranged alternately. Any one of the right-eye video and the left-eye video is flat video. The video information of the other one of the right-eye video and the left-eye video that is needed to view stereoscopic video is generated as the video information of the other eye generated using both of the flat video information and the stereoscopic video information. In this case, a group of surround audio signals relating to the right-eye video and the left-eye video according to the sixth embodiment can also be arranged and recorded.

The sound-image localization varying unit 325 uses the received sound-image localization information to control the sound-image localization of the received audio signal, and outputs the sound-image localization to an HDMI information transfer unit 326 or an optical output unit 327. The HDMI information transfer unit 326 outputs the received signal to a TV for viewing 3D.

Still further, the block diagram of FIG. 50 shows a method for more easily varying the sound-image localization in the depth direction or the protruding direction in a case where even the sound-image localization information in the depth direction or the protruding direction is not indicated. More specifically, the sound-image localization in the depth direction or the protruding direction is varied on the basis of the positional information 269 of subtitles in the depth direction and the protruding direction as indicated in the disk C of FIG. 43. In general, subtitles, OSD information and the like are give as still image information such as text information and bitmaps. Accordingly, there may be stereoscopic direction arrangement information representing which depth direction and protruding direction this text and bitmap information should be displayed during stereoscopic viewing. In this case, a more realistic sensation can be increased by varying the sound-image localization in the depth direction or the protruding direction in proportional to this information. It should be noted that the method for determining what kind of variation should be applied to the sound-image localization of the 2D audio in the depth direction or the protruding direction includes a method for causing the variation to be in proportional to the stereoscopic direction arrangement information. Further, the above method includes a method for adding an offset multiplied by a constant coefficient based on the stereoscopic direction arrangement information of the OSD to the depth direction sound-image localization of the original 2D audio, and a method for multiplying the arrangement information by itself and adding it with respect to the stereoscopic direction of the OSD when the influence of the arrangement information in the stereoscopic direction of the OSD is to be emphasized.

Still further, when the display position of the OSD information such as subtitle information moves together with the depth or protruding position of the audio generating source (main character or object emitting sound) in the stereoscopic video as described in the first embodiment, the following steps may be performed: thus adding information for specifying the stereoscopic direction arrangement of the OSD; causing stereoscopic direction position extraction means to extract added sound-image localization variation information changing together with the depth or protruding position of the OSD; and causing sound-image localization variation means to vary the depth or protruding direction sound-image localization, so that the sound-image localization can be indirectly moved together with the depth or protruding position of the audio generating source (main character or object emitting sound) in the stereoscopic video.

In FIG. 50, for example, the 3D video signal input from the optical disk 320 is separated by the system decoder 321 into a video signal, an audio signal, and an OSD signal. The right-eye video of the video signal is output to the MPEG/H.264 decoder 322. The left-eye video of the video signal is output to the difference decode processing unit 324. The audio signal is output to the audio decoder 323. The OSD signal is output to an OSD decoder 333. The right-eye video serving as reference is decoded by the MPEG/H.264 decoder 322 into the video information that can be displayed. The left-eye video is made of difference information from the right-eye video, and therefore, the left-eye video is reproduced by the MPEG/H.264 decoder 322 on the basis of the signal decompressed by the difference decode processing unit 324. The OSD decoder 333 outputs the decompressed subtitle information to an video/OSD composing unit 334, and calculates the amount of protrusion of subtitles and output the information about the amount protrusion of subtitles to the sound-image localization control unit 325. The video/OSD composing unit 334 composes the received video signal and the OSD signal, and outputs the composed signal to the HDMI information transfer unit 326. The sound-image localization control unit 325 uses the information about the amount of protrusion of subtitles to control the sound-image localization of the received audio signal, and outputs the sound-image localization to the HDMI information transfer unit 326 or an optical output unit 327. The HDMI information transfer unit 326 outputs the received signal to the TV for viewing 3D.

Still further, in a case where there is not arrangement information with respect to the stereoscopic direction in the OSD, or a case where a more accurate depth direction sound-image localization is to be reproduced according to, e.g., the arrangement of person in a video content, a method using face detection processing may be used as performed by the stereoscopic video and audio reproducing apparatus of FIG. 48 and the stereoscopic video and audio reproducing apparatus of FIG. 49. The face detection processing has already been equipped in digital cameras, and the face detection processing can detect the portion of the face of a person and identify the eyes, the nose, the mouth, and the like, thus allowing video expressions to be elaborated. For example, the stereoscopic video and audio reproducing apparatus of FIG. 48 and the stereoscopic video and audio reproducing apparatus of FIG. 49 include the optical disk 320 having stereoscopic video and audio data, a system decoder 321, the MPEG/H.264 decoder 322, the difference decode processing unit 324, the audio decoder 323, the sound-image localization control unit 325, the HDMI information transfer unit 326, the optical output unit 327, a 3D viewing TV 328, an AV amplifier 329, and a face detection/protruding amount extraction unit 332.

Now, in FIG. 48, the 3D video signal input from the optical disk 320 is separated by the system decoder 321 into a video signal and an audio signal. The right-eye video of the video signal is output to the MPEG/H.264 decoder 322. The left-eye video of the video signal is output to the difference decode processing unit 324. The audio signal is output to the audio decoder 323. The right-eye video serving as reference is decoded by the MPEG/H.264 decoder 322. The left-eye video is made of difference information from the right-eye video, and therefore, the left-eye video is reproduced by the MPEG/H.264 decoder 322 on the basis of the signal decompressed by the difference decode processing unit 324.

At this occasion, the face detection/protruding amount extraction unit 332 first detects the facial portion of a person in the right-eye video, and detects the face of the person in the left-eye video. Subsequently, this both of right and left face detection information, especially the position of the face within the screen, is compared with each other, so that the extraction means calculates the amount of parallax and extracts the amount of depth or protrusion. The amount of sound-image localization variation and the depth direction sound-image localization which are obtained here are input to the sound-image localization control unit 325, and the sound-image is controlled. Therefore, for example, in a scene in which a person approaches this side, the sound-image localization variation means can change the depth direction sound-image localization in such a manner to gradually approach the viewer position, thus improving realistic sensation. Further, when the amount of sound-image variation is extracted, not only stereoscopic video information and audio information but also the sound-image localization variation information may be added and recorded.

Alternatively, the face detection algorithm may include the steps of extracting the mouth portion instead of extracting the entire face, calculating the amount of parallax, and extracting the amount of depth or protrusion, thus obtaining a more accurate depth direction sound-image localization.

In FIG. 49, only the right-eye video is input to the face detection/protruding amount extraction unit 332, which performs face detection in the right-eye video and returns the face detection information to the MPEG/H.264 decoder 322. Then, the MPEG/H.264 decoder calculates the depth direction sound-image localization information, on the basis of the face detection information and the amount of depth or protrusion extracted from the amount of parallax between right-eye and left-eye videos, and outputs the depth direction sound-image localization information to the sound-image localization control unit 325. The sound-image localization control unit 325 uses the received depth direction sound-image localization information to control the sound-image localization of the received audio signal.

When there are a plurality of persons, whether the mouth is moving or not is determined, the depth direction sound-image localization may be varied based on the depth or protruding position of the person whose mouth is moving. In this case, a person who is not speaking is disregarded, and therefore, more accurate operation can be achieved.

In a case where the depth direction sound-image localization is varied with consideration paid to the realistic sensation in advance as in movie contents, an offset applied to the depth direction sound-image localization in this face detection may make displacement from the reality on the contrary. What kind of variation should be applied may be determined in proportion to the amount of depth or protrusion of the face with respect to the stereoscopic direction. Alternatively, there are methods such as a method for adding an offset multiplied by a constant coefficient based on the amount of depth or protrusion to the depth direction sound-image localization of the original 2D audio, and a method for multiplying by itself the amount of depth or protrusion of the face detection and adding it when the influence of the amount of depth or protrusion of the face detection is to be emphasized.

Alternatively, when the face detection detects nothing (there is no person in the screen), the original 2D audio video is reproduced as it is, so that only the realistic sensation about the voice of the person is increased, and unnecessary erroneous operation can be avoided. In this case, the variation processing of sound-image localization operates only in a scene in which the person appears in the stereoscopic video, thus further increasing the realistic sensation.

While the invention has been shown and described in detail, the foregoing description is in all aspects illustrative and not restrictive. It is therefore understood that numerous modifications and variations can be devised without departing from the scope of the invention.

What is claimed is:

1. A non-transitory computer-readable medium on which is stored a computer program which, when executed, causes a computer to perform a process comprising:
    recording, to a recording medium, surround audio information; and
    recording, to said recording medium, video content including a stereoscopic video comprising a left-eye video and a right-eye video utilizing parallax video, said video content being constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video content includes a flat video constituted by only one of the left-eye video and the right-eye video and a stereoscopic video using both of the left-eye video and the right-eye video, which are present in a mixed manner in said digital video information, wherein supplementary information is recorded on said recording medium to produce varied sound-image localizations of a same surround audio in a depth or protruding direction from a screen for a plurality of corresponding stereoscopic viewing modes for viewing the same video content according to different parallax values during listening of the surround audio information related to stereoscopic video information of the stereoscopic video, and wherein the same recorded left-eye video, the same recorded right-eye video, and the same surround audio are used for viewing the same video content in each of the plurality of stereoscopic viewing modes with the corresponding sound-image localization.

2. A stereoscopic video and audio recording method comprising:

recording, to a recording medium, surround audio information; and recording, to said recording medium, video content including a stereoscopic video comprising a left-eye video and a right-eye video utilizing parallax video, said video content being constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video content includes a flat video constituted by only one of the left-eye video and the right-eye video and a stereoscopic video using both of the left-eye video and the right-eye video, which are present in a mixed manner in said digital video information, wherein both of a surround audio for viewing the flat video and a surround audio for stereoscopic viewing are recorded on the surround audio information related to stereoscopic video information of the stereoscopic video, wherein supplementary information for varying the sound-image localization of the surround audio for stereoscopic viewing, and wherein the sound-image localization of the surround audio for stereoscopic viewing is varied, apart from choosing between different stereoscopic viewing modes, according to supplementary information to correspond to different sensations of realism when viewing the same video content such that, when the surround audio for stereoscopic viewing is recorded again, the amount of variation of the sound-image localization is increased or reduced by multiplying said supplementary information by a predetermined coefficient.

3. A stereoscopic video and audio recording method comprising:

recording, to a recording medium, surround audio information; and recording, to said recording medium, video content including a stereoscopic video comprising a left-eye video and a right-eye video utilizing parallax video, said video content being constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video content includes a flat video constituted by only one of the left-eye video and the right-eye video and a stereoscopic video using both of the left-eye video and the right-eye video, which are present in a mixed manner in said digital video information, wherein a surround audio for viewing the flat video and a plurality of surround audios for stereoscopic viewing that are different in the degree of variation of sound-image localization with respect to a viewer are recorded on the surround audio information related to stereoscopic video information of said stereoscopic video, wherein the sound-image localization of a recorded surround audio for stereoscopic viewing is varied, apart from choosing between different stereoscopic viewing modes, according to supplementary information to correspond to different sensations of realism when viewing the same video content such that, when the surround audio for stereoscopic viewing is recorded again, the amount of variation of the sound-image localization is increased or reduced by multiplying said supplementary information by a predetermined coefficient.

4. A stereoscopic video and audio recording method comprising:

recording, to a recording medium, surround audio information; and recording, to said recording medium, video content including a stereoscopic video comprising a left-eye video and a right-eye video utilizing parallax video, said video content being constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video content includes a flat video constituted by only one of the left-eye video and the right-eye video and a stereoscopic video using both of the left-eye video and the right-eye video, which are present in a mixed manner in said digital video information, wherein supplementary information is recorded on said recording medium to vary sound-image localization in a depth or protruding direction from a screen of a surround audio for stereoscopic viewing during listening of the surround audio related to stereoscopic video information of the stereoscopic video, such variances in the sound-image localization of the surround audio according to the supplementary information corresponding to different sensations of realism when viewing the same stereoscopic video content, and wherein the sound-image localization is varied, apart from choosing between different stereoscopic viewing modes, according to said supplementary information such that, when the surround audio for stereoscopic viewing is recorded again, the amount of variation of the sound-image localization is increased or reduced by multiplying said supplementary information by a predetermined coefficient.

5. A stereoscopic video and audio recording method for recording, to a recording medium, surround audio information and a stereoscopic video including a left-eye video and a right-eye video utilizing parallax video, wherein video content that contains stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video content includes a flat video constituted by only one of the left-eye video and the right-eye video and a stereoscopic video using both of the left-eye video and the right-eye video, which are present in a mixed manner in said digital video information, and wherein the method comprises:

setting OSD information related to the video information, adding information for identifying a position of OSD in the stereoscopic direction to said OSD information, extracting sound-image localization variation information of a surround audio for stereoscopic viewing in synchronization with the OSD display position in the stereoscopic direction, adding supplementary information for varying the sound-image localization according to the extracted sound-image localization variation information to the stereoscopic video information and the surround audio information, attaching the supplementary information, wherein the sound-image localization variation of the surround audio for stereoscopic viewing is varied, apart from choosing between different stereoscopic viewing modes, according to the supplementary information to correspond to different sensations of realism when viewing the same video content such that, when the surround audio for stereoscopic viewing is recorded again, the amount of variation of the sound-image localization is increased or reduced by multiplying said supplementary information by a predetermined coefficient.

6. A stereoscopic video and audio recording method for recording, to a recording medium, surround audio information and a stereoscopic video including a left-eye video and a right-eye video utilizing parallax video, wherein video content that contains stereoscopic video is constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time, wherein said video content includes a flat video constituted by only one of the left-eye video and the right-eye video and a stereoscopic video using both of the left-eye video and the right-eye video, which are present in a mixed manner in said digital video information, and wherein the method comprises:

detecting a face in the left-eye video and the right-eye video when the video information includes the face of a person, extracting positional information of the face in a depth or protruding direction from a screen of the face calculated from the right and left face detection information, extracting an amount of variation of sound-image localization of a surround audio in the depth or protruding direction from the screen on the basis of said position information of the face, adding supplementary information for varying the sound-image localization according to the sound-image localization variation information to the stereoscopic video information and the surround audio information, and attaching the supplementary information, wherein the sound-image localization variation of the surround audio for stereoscopic viewing is varied, apart from choosing between different stereoscopic viewing modes, according to the supplementary information to correspond to different sensations of realism when viewing the same video content such that, when the surround audio for stereoscopic viewing is recorded again, the amount of variation of the sound-image localization is increased or reduced by multiplying said supplementary information by a predetermined coefficient.

7. The stereoscopic video and audio recording method according to claim 6, wherein when the video information includes the face of a person, the positional information of the face in the projecting direction is determined based on detection of a position of a mouth in said face detection.

8. The stereoscopic video and audio recording method according to claim 3, wherein when a viewer views previously recorded audio information for viewing stereoscopic video or audio information for viewing stereoscopic video based on supplementary information for varying the sound-image localization, the most dangerous level of both of parental level setting information of the audio information for viewing the stereoscopic video and parental setting information of the stereoscopic video is written to said supplementary information as a total parental level of the entire the video and the audio at a time of selection of this content, thus serving as viewing restriction on the content.

9. The stereoscopic video and audio recording method according to claim 2, wherein when the surround audio information for viewing stereoscopic video based on said supplementary information for varying the sound-image localization is re-recorded, a parental level setting is changed at the same time as the recording of the audio information in which the amount of variation of the sound-image localization is increased or reduced.

10. The stereoscopic video and audio reproducing method according to claim 2, wherein:

said video content is recorded on said recording medium in such a manner that flat video information and stereoscopic video information are recorded in units of said digital video information or an integral multiple of said digital video information in a mixed manner, said flat video information and said stereoscopic video information, when selectively reproduced by a reproducing apparatus, being reproduced as said flat video and said stereoscopic video, respectively;

said right-eye video of the stereoscopic video and said left-eye video of the stereoscopic video are arranged alternately;

said flat video comprises any one of said right-eye video and said left-eye video;

the video information of the other of said right-eye video and said left-eye video needed to view the stereoscopic video is generated using both of the flat video information and the stereoscopic video information; and said surround audio information group related to the right-eye video and the left-eye video is also arranged and recorded.

11. A stereoscopic video and audio recording apparatus comprising:
   a controller programmed to control equipment within said apparatus to perform a process comprising:
      recording, to a recording medium, surround audio information; and
      recording, to said recording medium, a stereoscopic video comprising a left-eye video and a right-eye video utilizing parallax video, said video content being constituted by digital video information including an I picture that is data-compressed within a frame, a P picture that is data-compressed with motion compensation from said I picture in a preceding direction in time, and a B picture that is data-compressed with motion compensation from said I picture or P picture in a preceding/following direction in time,
wherein said video content includes a flat video constituted by only one of the left-eye video and the right-eye video and a stereoscopic video using both of the left-eye video and the right-eye video, which are present in a mixed manner in said digital video information,
wherein supplementary information is recorded on said recording medium to produce varied sound-image localizations of a same surround audio in a depth or protruding direction from a screen for a plurality of corresponding stereoscopic viewing modes for viewing the same video content according to different parallax values during listening of the surround audio information related to stereoscopic video information of the stereoscopic video, and
wherein the same recorded left-eye video, the same recorded right-eye video, and the same surround audio are used for viewing the same video content in each of the plurality of stereoscopic viewing modes with the corresponding sound-image localization.

\* \* \* \* \*